(12) United States Patent
Zhang et al.

(10) Patent No.: US 12,038,563 B2
(45) Date of Patent: Jul. 16, 2024

(54) OPTICAL IMAGING LENS ASSEMBLY

(71) Applicant: ZHEJIANG SUNNY OPTICS CO., LTD., Zhejiang (CN)

(72) Inventors: Jiaying Zhang, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 550 days.

(21) Appl. No.: 17/316,735

(22) Filed: May 11, 2021

(65) Prior Publication Data

US 2021/0373293 A1 Dec. 2, 2021

(30) Foreign Application Priority Data

May 26, 2020 (CN) .......................... 202010454282.8

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .... G02B 13/0045; G02B 13/06; G02B 13/18; G02B 9/64; G02B 27/0025

USPC .......................................................... 359/708
See application file for complete search history.

(56) References Cited

U.S. PATENT DOCUMENTS

| | | | | |
|---|---|---|---|---|
| 2019/0346663 A1* | 11/2019 | Tang | ......................... | G02B 9/64 |
| 2020/0241257 A1* | 7/2020 | Yang | ................... | G02B 13/0045 |
| 2020/0249434 A1* | 8/2020 | Lin | ......................... | G02B 13/18 |
| 2020/0400921 A1* | 12/2020 | Huang | ..................... | G02B 9/64 |
| 2021/0033826 A1* | 2/2021 | Huang | ................. | G02B 13/0045 |
| 2021/0041674 A1* | 2/2021 | Kuo | .................... | G02B 27/0025 |
| 2021/0063698 A1* | 3/2021 | Lyu | ..................... | G02B 13/0045 |

* cited by examiner

*Primary Examiner* — William R Alexander
(74) *Attorney, Agent, or Firm* — Samson G. Yu

(57) ABSTRACT

The disclosure provides an optical imaging lens assembly, which sequentially includes from an object side to an image side along an optical axis: a first lens, a second lens, a third lens, a fourth lens, a fifth lens, a sixth lens and a seventh lens, wherein the fifth lens has a negative refractive power; an object-side surface of the sixth lens is a concave surface, and an image-side surface of the sixth lens is a convex surface; a maximum field of view FOV of the optical imaging lens assembly satisfies 100°<FOV<120°; ImgH is a half the diagonal length of an effective pixel region on an imaging surface of the optical imaging lens assembly, and ImgH satisfies ImgH>4.5 mm; and a total effective focal length f of the optical imaging lens assembly and an Entrance Pupil Diameter (EPD) of the optical imaging lens assembly satisfy f/EPD<2.

19 Claims, 25 Drawing Sheets lateral color curve longitudinal aberration curve astigmatism curve longitudinal aberration curve astigmatism curve longitudinal aberration curve astigmatism curve lateral color curve

OPTICAL IMAGING LENS ASSEMBLY

CROSS-REFERENCE TO RELATED PRESENT INVENTION(S)

The disclosure claims priority to and the benefit of Chinese Patent Present invention No. 202010454282.8, filed in the China National Intellectual Property Administration (CNIPA) on 26 May 2020, which is incorporated herein by reference in its entirety.

TECHNICAL FIELD

The disclosure relates to the field of optical elements, and more particularly to an optical imaging lens assembly.

BACKGROUND

With the rapid development of portable intelligent electronic devices such as mobile phones and extensive application of camera modules therein, users have increasingly tended to use mobile phones instead of conventional intelligent cameras. Although conventional intelligent cameras are still high in performance, camera functions of portable intelligent electronic devices are also constantly improved and perfected.

At present, a multi-lens mode is usually adopted for camera modules of mainstream mobile phones on the market. For example, a mode of combining an ultrathin and large-image-surface lens, a wide-angle lens and a telephoto lens is adopted. In this mode, each lens achieves a characteristic of one aspect and is matched with the other lenses for imaging. For example, the wide-angle lens has the characteristics of relatively large field of view and relatively great depth of field. However, due to a limit of a relative illumination, an imaging surface of the wide-angle lens is usually small, furthermore, an imaging range is small, and less image information may be collected. Under a normal condition, another large-image-surface lens is always required to be matched.

For satisfying a miniaturization requirement and an imaging requirement, an optical imaging lens assembly capable of considering a wide angle and a large image surface is required.

SUMMARY

The disclosure provides an optical imaging lens assembly applicable to a portable electronic product and capable of at least overcoming or partially overcoming at least one shortcoming in a conventional art.

Some embodiments of the disclosure provide an optical imaging lens assembly, which sequentially includes from an object side to an image side along an optical axis: a first lens, a second lens, a third lens, a fourth lens, a fifth lens, a sixth lens and a seventh lens, wherein the fifth lens has a negative refractive power; an object-side surface of the sixth lens may be a concave surface, and an image-side surface of the sixth lens may be a convex surface; a maximum field of view FOV of the optical imaging lens assembly may satisfy $100°<FOV<120°$; ImgH is a half the diagonal length of an effective pixel region on an imaging surface of the optical imaging lens assembly, and ImgH may satisfy $ImgH>4.5$ mm; and a total effective focal length f of the optical imaging lens assembly and an Entrance Pupil Diameter (EPD) of the optical imaging lens assembly may satisfy $f/EPD<2$.

In an implementation mode, an object-side surface of the first lens to an image-side surface of the seventh lens include at least one aspheric mirror surface.

In an implementation mode, the total effective focal length f of the optical imaging lens assembly and an effective focal length f7 of the seventh lens may satisfy $-1<f7/f<0$.

In an implementation mode, an effective focal length f4 of the fourth lens and the total effective focal length f of the optical imaging lens assembly may satisfy $0.3<f/f4<1.3$.

In an implementation mode, an effective focal length f5 of the fifth lens and an effective focal length f6 of the sixth lens may satisfy $0.3<(f5+f6)/(f5-f6)<0.8$.

In an implementation mode, a combined focal length f123 of the first lens, the second lens and the third lens and a combined focal length f67 of the sixth lens and the seventh lens may satisfy $0<f67/f123<1.0$.

In an implementation mode, an edge thickness ET3 of the third lens and a center thickness CT3 of the third lens on the optical axis may satisfy $0.3<ET3/CT3<0.8$.

In an implementation mode, an edge thickness ET5 of the fifth lens and a center thickness CT5 of the fifth lens on the optical axis may satisfy $0.3<CT5/ET5<0.8$.

In an implementation mode, an edge thickness ET2 of the second lens, an edge thickness ET6 of the sixth lens and an edge thickness ET7 of the seventh lens may satisfy $0.3<(ET2+ET6)/ET7<0.8$.

In an implementation mode, a maximum effective radius DT12 of an image-side surface of the first lens and a maximum effective radius DT61 of the object-side surface of the sixth lens may satisfy $0.5<DT12/DT61<1.0$.

In an implementation mode, an on-axis distance SAG41 from an intersection point of an object-side surface of the fourth lens and the optical axis to an effective radius vertex of the object-side surface of the fourth lens, an on-axis distance SAG62 from an intersection point of the image-side surface of the sixth lens and the optical axis to an effective radius vertex of the image-side surface of the sixth lens and an on-axis distance SAG71 from an intersection point of an object-side surface of the seventh lens and the optical axis to an effective radius vertex of the object-side surface of the seventh lens may satisfy $0.3<(SAG41+SAG71)/SAG62<0.8$.

In an implementation mode, a curvature radius R3 of an object-side surface of the second lens and a curvature radius R4 of an image-side surface of the second lens may satisfy $0.3<R3/R4<1.3$.

In an implementation mode, an object-side surface of the second lens may be a convex surface, and an image-side surface of the second lens may be a concave surface.

In an implementation mode, a curvature radius R6 of an image-side surface of the third lens and a curvature radius R8 of an image-side surface of the fourth lens may satisfy $0.3<R6/(R6+R8)<1.0$.

In an implementation mode, an image-side surface of the third lens may be a convex surface, and an image-side surface of the fourth lens may be a convex surface.

In an implementation mode, a curvature radius R11 of the object-side surface of the sixth lens and a curvature radius R12 of the image-side surface of the sixth lens may satisfy $0.5<(R11-R12)/(R11+R12)<1.0$.

In an implementation mode, the sixth lens may have a positive refractive power.

In an implementation mode, a curvature radius R13 of an object-side surface of the seventh lens and a curvature radius R14 of an image-side surface of the seventh lens may satisfy $0.3<(R13-R14)/(R13+R14)<0.8$.

In an implementation mode, the seventh lens may have a negative refractive power, an object-side surface of the seventh lens may be a convex surface, and an image-side surface of the seventh lens may be a concave surface.

In an implementation mode, a center thickness CT1 of the first lens on the optical axis, a center thickness CT4 of the fourth lens on the optical axis and a center thickness CT6 of the sixth lens on the optical axis may satisfy $0.7<(CT1+CT4)/CT6<1.2$.

In an implementation mode, a center thickness CT7 of the seventh lens on the optical axis and a sum $\Sigma AT$ of spacing distances of any two adjacent lenses in the first lens to the seventh lens on the optical axis may satisfy $0.3<CT7/\Sigma AT<0.8$.

Some other embodiments of the disclosure also provide an optical imaging lens assembly, which sequentially includes from an object side to an image side along an optical axis: a first lens, a second lens, a third lens, a fourth lens, a fifth lens, a sixth lens and a seventh lens, wherein an object-side surface of the sixth lens may be a concave surface, and an image-side surface of the sixth lens may be a convex surface; a maximum field of view FOV of the optical imaging lens assembly may satisfy $100°<FOV<120°$; ImgH is a half the diagonal length of an effective pixel region on an imaging surface of the optical imaging lens assembly, and ImgH may satisfy $ImgH>4.5$ mm; a total effective focal length f of the optical imaging lens assembly and an Entrance Pupil Diameter (EPD) of the optical imaging lens assembly may satisfy $f/EPD<2$; and the total effective focal length f of the optical imaging lens assembly and an effective focal length f7 of the seventh lens may satisfy $-1<f7/f<0$.

In an implementation mode, an effective focal length f4 of the fourth lens and the total effective focal length f of the optical imaging lens assembly may satisfy $0.3<f/f4<1.3$.

In an implementation mode, an effective focal length f5 of the fifth lens and an effective focal length f6 of the sixth lens may satisfy $0.3<(f5+f6)/(f5-f6)<0.8$.

In an implementation mode, the fifth lens may have a negative refractive power.

In an implementation mode, a combined focal length f123 of the first lens, the second lens and the third lens and a combined focal length f67 of the sixth lens and the seventh lens may satisfy $0<f67/f123<1.0$.

In an implementation mode, an edge thickness ET3 of the third lens and a center thickness CT3 of the third lens on the optical axis may satisfy $0.3<ET3/CT3<0.8$.

In an implementation mode, an edge thickness ET5 of the fifth lens and a center thickness CT5 of the fifth lens on the optical axis may satisfy $0.3<CT5/ET5<0.8$.

In an implementation mode, an edge thickness ET2 of the second lens, an edge thickness ET6 of the sixth lens and an edge thickness ET7 of the seventh lens may satisfy $0.3<(ET2+ET6)/ET7<0.8$.

In an implementation mode, a maximum effective radius DT12 of an image-side surface of the first lens and a maximum effective radius DT61 of the object-side surface of the sixth lens may satisfy $0.5<DT12/DT61<1.0$.

In an implementation mode, an on-axis distance SAG41 from an intersection point of an object-side surface of the fourth lens and the optical axis to an effective radius vertex of the object-side surface of the fourth lens, an on-axis distance SAG62 from an intersection point of the image-side surface of the sixth lens and the optical axis to an effective radius vertex of the image-side surface of the sixth lens and an on-axis distance SAG71 from an intersection point of an object-side surface of the seventh lens and the optical axis to an effective radius vertex of the object-side surface of the seventh lens may satisfy $0.3<(SAG41+SAG71)/SAG62<0.8$.

In an implementation mode, a curvature radius R3 of an object-side surface of the second lens and a curvature radius R4 of an image-side surface of the second lens may satisfy $0.3<R3/R4<1.3$.

In an implementation mode, an object-side surface of the second lens may be a convex surface, and an image-side surface of the second lens may be a concave surface.

In an implementation mode, a curvature radius R6 of an image-side surface of the third lens and a curvature radius R8 of an image-side surface of the fourth lens may satisfy $0.3<R6/(R6+R8)<1.0$.

In an implementation mode, an image-side surface of the third lens may be a convex surface, and an image-side surface of the fourth lens is a convex surface.

In an implementation mode, a curvature radius R11 of the object-side surface of the sixth lens and a curvature radius R12 of the image-side surface of the sixth lens may satisfy $0.5<(R11-R12)/(R11+R12)<1.0$.

In an implementation mode, the sixth lens may have a positive refractive power.

In an implementation mode, a curvature radius R13 of an object-side surface of the seventh lens and a curvature radius R14 of an image-side surface of the seventh lens may satisfy $0.3<(R13-R14)/(R13+R14)<0.8$.

In an implementation mode, the seventh lens may have a negative refractive power, an object-side surface of the seventh lens may be a convex surface, and an image-side surface of the seventh lens may be a concave surface.

In an implementation mode, a center thickness CT1 of the first lens on the optical axis, a center thickness CT4 of the fourth lens on the optical axis and a center thickness CT6 of the sixth lens on the optical axis may satisfy $0.7<(CT1+CT4)/CT6<1.2$.

In an implementation mode, a center thickness CT7 of the seventh lens on the optical axis and a sum $\Sigma AT$ of spacing distances of any two adjacent lenses in the first lens to the seventh lens on the optical axis may satisfy $0.3<CT7/\Sigma AT<0.8$.

According to the disclosure, the seven lenses are adopted, and the refractive power and surface types of each lens, the center thickness of each lens, on-axis spacing distances between the lenses and the like are reasonably configured to achieve at least one beneficial effect of wide angle, large image surface, large aperture, high image quality and the like of the optical imaging lens assembly.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
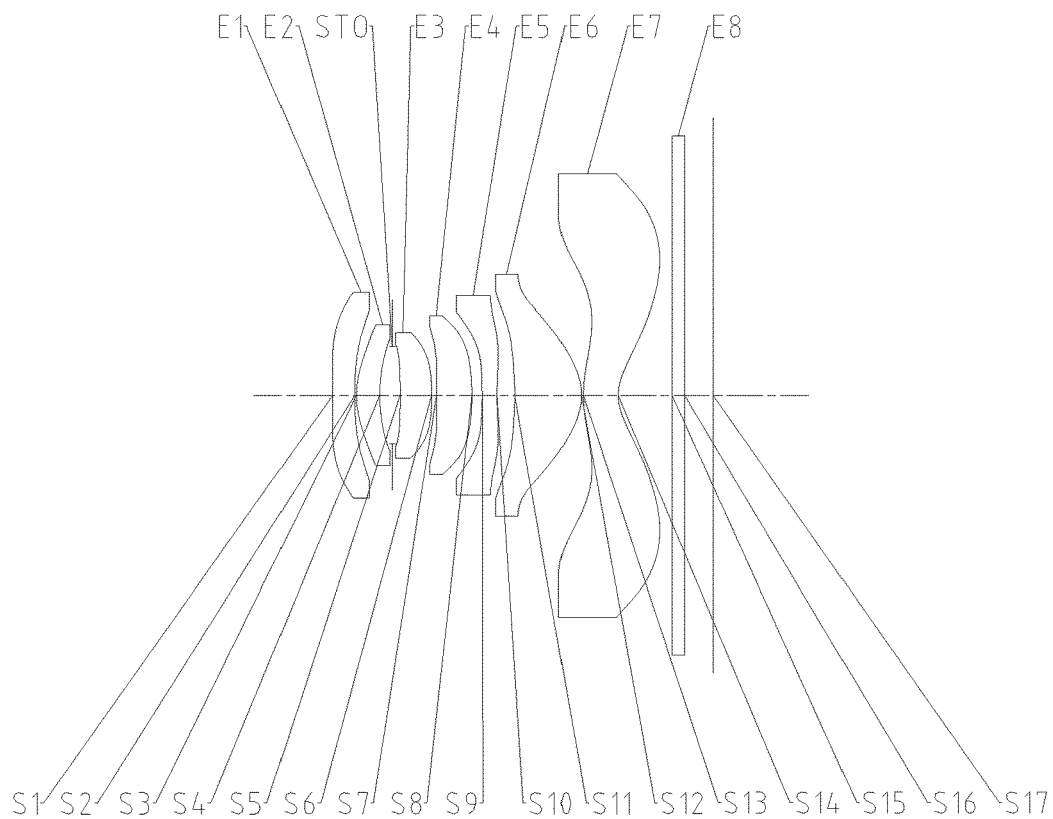
FIG. 1 shows a structural schematic diagram of an optical imaging lens assembly according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to the exemplary embodiment of the disclosure may include, for example, seven lenses with refractive power, i.e., a first lens, a second lens, a third lens, a fourth lens, a fifth lens, a sixth lens and a seventh lens. The seven lenses are sequentially arranged from an object side to an image side along an optical axis. In the first lens to the seventh lens, there may be an air space between any two adjacent lenses.

In an exemplary embodiment, an object-side surface of the second lens may be a convex surface, and an image-side surface of the second lens may be a concave surface. The second lens with concave-convex structure helps to support a larger maximum field of view FOV of the optical imaging lens assembly, may also converge light better and is favorable for improving an aberration of the optical imaging lens assembly.

In an exemplary embodiment, an image-side surface of the third lens may be a convex surface, and an image-side surface of the fourth lens may be a convex surface. Controlling the third lens and the fourth lens to have such surface types to help to support a larger maximum field of view FOV of the optical imaging lens assembly, may also converge the light better and is favorable for improving the aberration of the optical imaging lens assembly.

In an exemplary embodiment, the fifth lens may have a negative refractive power. Through the fifth lens with the negative refractive power, a maximum field of view FOV of the optical imaging lens assembly may be improved, meanwhile, imaged light may be converged better, and the image quality of the optical imaging lens assembly is further improved.

In an exemplary embodiment, an object-side surface of the sixth lens may be a concave surface, and an image-side surface of the sixth lens may be a convex surface. The sixth lens with the concave and convex surface types helps to converge the imaged light better and may also improve a spherical aberration of the optical imaging lens assembly and prevent excessive divergence of light in an edge field of view to endow the optical imaging lens assembly with a higher coma correction capability.

In an exemplary embodiment, the sixth lens may have a positive refractive power. The sixth lens with the positive refractive power may ensure that the optical imaging lens assembly supports a larger imaging surface, namely a larger imaging surface may be obtained under the same maximum field of view FOV, and is further favorable for improving the imaging definition.

In an exemplary embodiment, the seventh lens may have a negative refractive power. Exemplarily, an object-side surface of the seventh lens may be a convex surface, and an image-side surface of the seventh lens may be a concave surface. Surface types and refractive power of the seventh lens may be set to ensure that the optical imaging lens assembly supports a larger maximum field of view FOV and the optical imaging lens assembly has the characteristic of large image surface to further facilitate improvement of the imaging definition, also converge the light better and facilitate improvement of a field curvature of the optical imaging lens assembly.

In an exemplary embodiment, the first lens has a positive refractive power or a negative refractive power; the second lens has a positive refractive power or a negative refractive power; the third lens has a positive refractive power or a negative refractive power; and the fourth lens has a positive refractive power or a negative refractive power.

In an exemplary embodiment, the optical imaging lens assembly of the disclosure may satisfy a conditional expression $100°<FOV<120°$, wherein FOV is a maximum field of view of the optical imaging lens assembly. The maximum field of view of the optical imaging lens assembly is restricted to be $100°$ to $120°$ to help the optical imaging lens assembly to achieve an imaging effect of large field of view. More specifically, FOV may satisfy $108°<FOV<112°$.

In an exemplary embodiment, the optical imaging lens assembly of the disclosure may satisfy a conditional expression $ImgH>4.5$ mm, wherein ImgH is a half the diagonal length of an effective pixel region on an imaging surface of the optical imaging lens assembly. Satisfying $ImgH>4.5$ mm helps the optical imaging lens assembly to achieve the characteristic of large image surface to enlarge an imaging range of the optical imaging lens assembly. More specifically, ImgH may satisfy $ImgH>4.6$ mm.

In an exemplary embodiment, the optical imaging lens assembly of the disclosure may satisfy a conditional expression $f/EPD<2$, wherein f is a total effective focal length of the optical imaging lens assembly, and EPD is an Entrance Pupil Diameter of the optical imaging lens assembly. Satisfying $f/EPD<2$ may ensure the characteristic of large aperture of the optical imaging lens assembly. More specifically, f and EPD may satisfy $f/EPD \leq 1.95$.

Exemplarily, the optical imaging lens assembly of the disclosure may satisfy the conditional expressions $ImgH>4.5$ mm and $f/EPD<2$. The optical imaging lens assembly has the characteristic of large aperture, and may collect more graphic information and is relatively high in imaging quality.

In an exemplary embodiment, the optical imaging lens assembly of the disclosure may satisfy a conditional expression $-1<f7/f<0$, wherein f is the total effective focal length of the optical imaging lens assembly, and f7 is an effective focal length of the seventh lens. $-1<f7/f<0$ is satisfied, so that the effective focal length of the optical imaging lens assembly may be configured reasonably, and off-axis aberration balancing of the optical imaging lens assembly is facilitated. More specifically, f and f7 satisfy $-0.80<f7/f<-0.60$.

In an exemplary embodiment, the optical imaging lens assembly of the disclosure may satisfy a conditional expression $0.3<f/f4<1.3$, wherein f is the total effective focal length of the optical imaging lens assembly, and f4 is an effective focal length of the fourth lens. A ratio of the effective focal length of the fourth lens to the total effective focal length may be controlled in this range to help to control a range of the effective focal length of the fourth lens to further control a refractive power contribution rate of the fourth lens and help to balance a high-order spherical aberration generated by the optical imaging lens assembly. More specifically, f4 and f may satisfy $0.46<f/f4<0.95$.

In an exemplary embodiment, the optical imaging lens assembly of the disclosure may satisfy a conditional expression $0.3<(f5+f6)/(f5-f6)<0.8$, wherein f5 is an effective focal length of the fifth lens, and f6 is an effective focal length of the sixth lens. $0.3<(f5+f6)/(f5-f6)<0.8$ is controlled, so that the effective focal lengths of the fifth lens and the sixth lens may be configured reasonably, a deflection angle of light may further be reduced, and improvement of the imaging quality of the optical imaging lens assembly is further facilitated. More specifically, f5 and f6 may satisfy $0.43<(f5+f6)/(f5-f6)<0.55$.

In an exemplary embodiment, the optical imaging lens assembly of the disclosure may satisfy a conditional expression $0<f67/f123<1.0$, wherein f123 is a combined focal length of the first lens, the second lens and the third lens, and f67 is a combined focal length of the sixth lens and the seventh lens. A ratio of the combined focal length of the sixth lens and the seventh lens to the combined focal length of the first lens, the second lens and the third lens may be controlled in this range to achieve high imaging quality of the optical imaging lens assembly and control and restrict the field curvature of the optical imaging lens assembly in a certain range reasonably. Specifically, f123 and f67 may satisfy $0.05<f67/f123<0.65$.

In an exemplary embodiment, the optical imaging lens assembly of the disclosure may satisfy a conditional expression $0.3<ET3/CT3<0.8$, wherein ET3 is an edge thickness of the third lens, and CT3 is a center thickness of the third lens on the optical axis. A ratio of the edge thickness of the third lens to the center thickness thereof may be controlled in this range to regulate and control a distortion of the optical imaging lens assembly reasonably. Moreover, in a machining process, the third lens is high in machinability. More specifically, ET3 and CT3 may satisfy 0.45<ET3/CT3<0.60.

In an exemplary embodiment, the optical imaging lens assembly of the disclosure may satisfy a conditional expression 0.3<CT5/ET5<0.8, wherein ET5 is an edge thickness of the fifth lens, and CT3 is a center thickness of the fifth lens on the optical axis. A ratio of the center thickness to edge thickness of the fifth lens may be controlled in this range to regulate the distortion of the optical imaging lens assembly in a certain range and also help to reduce the error sensitivity of the fifth lens during manufacturing. More specifically, ET5 and CT5 may satisfy 0.42<CT5/ET5<0.52.

In an exemplary embodiment, the optical imaging lens assembly of the disclosure may satisfy a conditional expression 0.3<(ET2+ET6)/ET7<0.8, wherein ET2 is an edge thickness of the second lens, ET6 is an edge thickness of the sixth lens, and ET7 is an edge thickness of the seventh lens. Satisfying 0.3<(ET2+ET6)/ET7<0.8 is favorable for improving the manufacturability of the optical imaging lens assembly and reducing difficulties in forming and manufacturing of each lens. More specifically, ET2, ET6 and ET7 may satisfy 0.50<(ET2+ET6)/ET7<0.63.

In an exemplary embodiment, the optical imaging lens assembly of the disclosure may satisfy a conditional expression 0.5<DT12/DT61<1.0, wherein DT12 is a maximum effective radius of an image-side surface of the first lens, and DT61 is a maximum effective radius of the object-side surface of the sixth lens. A ratio of the maximum effective radius of the image-side surface of the first lens to the maximum effective radius of the object-side surface of the sixth lens may be controlled in this range to control the spherical aberration of the optical imaging lens assembly effectively and endow the lens with high machinability. More specifically, DT12 and DT61 may satisfy 0.75<DT12/DT61<0.85.

In an exemplary embodiment, the optical imaging lens assembly of the disclosure may satisfy a conditional expression 0.3<(SAG41+SAG71)/SAG62<0.8, wherein SAG41 is an on-axis distance from an intersection point of an object-side surface of the fourth lens and the optical axis to an effective radius vertex of the object-side surface of the fourth lens, SAG62 is an on-axis distance from an intersection point of the image-side surface of the sixth lens and the optical axis to an effective radius vertex of the image-side surface of the sixth lens, and SAG71 is an on-axis distance from an intersection point of the object-side surface of the seventh lens and the optical axis to an effective radius vertex of the object-side surface of the seventh lens. Satisfying 0.3<(SAG41+SAG71)/SAG62<0.8 is favorable for regulating the field curvature of the optical imaging lens assembly, may improve ghost images between the fourth lens and the sixth lens well, and in addition, may also reduce difficulties in machining of each lens and ensure higher assembling stability of the optical imaging lens assembly. More specifically, SAG41, SAG62 and SAG71 may satisfy 0.40<(SAG41+SAG71)/SAG62<0.53.

In an exemplary embodiment, the optical imaging lens assembly of the disclosure may satisfy a conditional expression 0.3<R3/R4<1.3, wherein R3 is a curvature radius of the object-side surface of the second lens, and R4 is a curvature radius of the image-side surface of the second lens. A ratio of the curvature radii of the object-side surface and image-side surface of the second lens may be controlled in this range to ensure that a light angle of the edge field of view is in a reasonable range and reduce the sensitivity of the optical imaging lens assembly effectively. More specifically, R3 and R4 may satisfy 0.50<R3/R4<1.10. Exemplarily, the object-side surface of the second lens is a convex surface, and the image-side surface of the second lens is a concave surface.

In an exemplary embodiment, the optical imaging lens assembly of the disclosure may satisfy a conditional expression 0.3<R6/(R6+R8)<1.0, wherein R6 is a curvature radius of the image-side surface of the third lens, and R8 is a curvature radius of the image-side surface of the fourth lens. 0.3<R6/(R6+R8)<1.0 is satisfied, so that contributions of the third lens and the fourth lens to a fifth-order spherical aberration of the optical imaging lens assembly may be controlled effectively to further compensate a third-order spherical aberration of the optical imaging lens assembly to achieve high on-axis imaging quality of the optical imaging lens assembly. More specifically, R6 and R8 may satisfy 0.45<R6/(R6+R8)<0.88. Exemplarily, the image-side surface of the third lens is a convex surface, and the image-side surface of the fourth lens is a convex surface.

In an exemplary embodiment, the optical imaging lens assembly of the disclosure may satisfy a conditional expression 0.5<(R11−R12)/(R11+R12)<1.0, wherein R11 is a curvature radius of the object-side surface of the sixth lens, and R12 is a curvature radius of the image-side surface of the sixth lens. 0.5<(R11−R12)/(R11+R12)<1.0 is satisfied, so that a refraction angle of an imaged beam at the sixth lens may be controlled effectively, and the optical imaging lens assembly is endowed with high machinability. More specifically, R11 and R12 may satisfy 0.60<(R11−R12)/(R11+R12)<0.81. Exemplarily, the object-side surface of the sixth lens is a concave surface, and the image-side surface of the sixth lens is a convex surface.

In an exemplary embodiment, the optical imaging lens assembly of the disclosure may satisfy a conditional expression 0.3<(R13−R14)/(R13+R14)<0.8, wherein R13 is a curvature radius of the object-side surface of the seventh lens, and R14 is a curvature radius of the image-side surface of the seventh lens. 0.3<(R13−R14)/(R13+R14)<0.8 is satisfied, so that comas in an on-axis field of view and an off-axis field of view are relatively small, and furthermore, the optical imaging lens assembly is high in imaging quality. More specifically, R13 and R14 may satisfy 0.45<(R13−R14)/(R13+R14)<0.56. Exemplarily, the object-side surface of the seventh lens is a convex surface, and the image-side surface of the seventh lens is a concave surface.

In an exemplary embodiment, the optical imaging lens assembly of the disclosure may satisfy a conditional expression 0.7<(CT1+CT4)/CT6<1.2, wherein CT1 is a center thickness of the first lens on the optical axis, CT4 is a center thickness of the fourth lens on the optical axis, and CT6 is a center thickness of the sixth lens on the optical axis. 0.7<(CT1+CT4)/CT6<1.2 is satisfied, so that the distortion of the optical imaging lens assembly may be regulated and controlled reasonably to finally ensure that the distortion of the optical imaging lens assembly is in a certain range. More specifically, CT1, T4 and CT6 may satisfy 0.83<(CT1+CT4)/CT6<1.00.

In an exemplary embodiment, the optical imaging lens assembly of the disclosure may satisfy a conditional expression 0.3<CT7/ΣAT<0.8, wherein CT7 is a center thickness of the seventh lens on the optical axis, and ΣAT is a sum of spacing distances of any two adjacent lenses in the first lens to the seventh lens on the optical axis. Exemplarily, ΣAT=T12+T23+T34+T45+T56+T67, wherein T12 is a spacing distance between the first lens and the second lens on the optical axis, and T23 to T67 are understood in the same manner. 0.3<CT7/ΣAT<0.8 is satisfied, so that the distortion of the optical imaging lens assembly may be controlled reasonably to achieve good distortion performance of the optical imaging lens assembly. More specifically, CT7 and ΣAT may satisfy 0.55<CT7/ΣAT<0.66.

In an exemplary embodiment, the optical imaging lens assembly may further include at least one diaphragm. The diaphragm may be arranged at a proper position as required, for example, arranged between the second lens and the third lens. Optionally, the optical imaging lens assembly may further include an optical filter configured to correct the chromatic aberration and/or a protective glass configured to protect a photosensitive element on the imaging surface.

The optical imaging lens assembly according to the embodiment of the disclosure may adopt seven lenses, for example, the abovementioned seven. The refractive power and surface types of each lens, the center thickness of each lens, on-axis spacing distances between the lenses and the like are reasonably configured to effectively reduce the size of the optical imaging lens assembly, reduce the sensitivity of the optical imaging lens assembly, improve the machinability of the optical imaging lens assembly and ensure that the optical imaging lens assembly is more favorable for production and machining and applicable to a portable electronic product. Meanwhile, the optical imaging lens assembly of the disclosure also has the high optical performance of wide angle, large image surface, large aperture, high image quality and the like.

In an implementation mode of the disclosure, at least one of mirror surfaces of each lens is an aspheric mirror surface, namely at least one of the object-side surface of the first lens to an image-side surface of the seventh lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With adoption of the aspheric lens, aberrations during imaging may be eliminated as much as possible, thereby improving the imaging quality. Optionally, at least one of the object-side surface and image-side surface of each lens in the first lens, the second lens, the third lens, the fourth lens, the fifth lens, the sixth lens and the seventh lens is an aspheric mirror surface. Optionally, both the object-side surface and the image-side surface of each lens in the first lens, the second lens, the third lens, the fourth lens, the fifth lens, the sixth lens and the seventh lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation mode with seven lenses as an example, the optical imaging lens assembly is not limited to seven lenses. If necessary, the optical imaging lens assembly may further include another number of lenses.

Specific embodiments applied to the optical imaging lens assembly of the abovementioned implementation mode will further be described below with reference to the drawings.

Embodiment 1

An optical imaging lens assembly according to Embodiment 1 of the disclosure will be described below with reference to FIGS. 1-2D. FIG. 1 shows a structural schematic diagram of an optical imaging lens assembly according to Embodiment 1 of the disclosure.

As shown in FIG. 1, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, a seventh lens E7 and an optical filter E8.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

Table 1 shows a basic parameter table of the optical imaging lens assembly of Embodiment 1, and the units of the curvature radius, the thickness/distance and the focal length are all millimeters (mm).

TABLE 1

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| S1 | Aspheric | −7.7872 | 0.3700 | 1.55 | 56.1 | −7.41 | −93.4160 |
| S2 | Aspheric | 8.5573 | 0.0300 | | | | −46.7298 |
| S3 | Aspheric | 1.5715 | 0.3904 | 1.55 | 56.1 | 6.11 | −4.1674 |
| S4 | Aspheric | 2.7120 | 0.2103 | | | | −14.1746 |
| STO | Spherical | Infinite | 0.1339 | | | | |
| S5 | Aspheric | −23.3485 | 0.5289 | 1.55 | 56.1 | 10.73 | 99.0000 |
| S6 | Aspheric | −4.7207 | 0.0849 | | | | 0.0000 |
| S7 | Aspheric | 19.0840 | 0.5938 | 1.55 | 56.1 | 5.29 | 0.0000 |
| S8 | Aspheric | −3.3628 | 0.1744 | | | | 2.9725 |

TABLE 1-continued

| Surface number | Surface type | Curvature radius | Thickness/ distance | Material Refractive index | Abbe number | Focal length | Conic coefficient |
|---|---|---|---|---|---|---|---|
| S9 | Aspheric | −8.2380 | 0.2500 | 1.67 | 19.2 | −5.21 | −99.0000 |
| S10 | Aspheric | 6.2594 | 0.2966 | | | | −97.4390 |
| S11 | Aspheric | −5.9938 | 1.1192 | 1.55 | 56.1 | 1.91 | −58.2489 |
| S12 | Aspheric | −0.9481 | 0.0300 | | | | −4.3744 |
| S13 | Aspheric | 2.1846 | 0.5851 | 1.54 | 55.9 | −2.35 | −9.7973 |
| S14 | Aspheric | 0.7248 | 0.9113 | | | | −3.6104 |
| S15 | Spherical | Infinite | 0.2100 | 1.52 | 64.2 | | |
| S16 | Spherical | Infinite | 0.4812 | | | | |
| S17 | Spherical | Infinite | | | | | |

In Embodiment 1, a value of a total effective focal length f of the optical imaging lens assembly is 3.24 mm, a value of an on-axis distance TTL from the object-side surface S1 of the first lens E1 to the imaging surface S17 is 6.40 mm, ImgH is a half the diagonal length of an effective pixel region on the imaging surface S17, and a value of ImgH is 5.64 mm, and a value of a maximum field of view FOV is 109.3°.

In Embodiment 1, both the object-side surface and the image-side surface of any lens in the first lens E1 to the seventh lens E7 are aspheric surfaces, and the surface type x of each aspheric lens may be defined through, but not limited to, the following aspheric surface formula:

$$x = \frac{ch^2}{1 + \sqrt{1 - (k+1)c^2h^2}} + \sum A_i h^i, \quad (1)$$

wherein x is a a vector height of a distance between the aspheric surface and a vertex of the aspheric surface when the aspheric surface is located at a position with the height h along the optical axis direction; c is a paraxial curvature of the aspheric surface, c=1/R (namely, the paraxial curvature c is a reciprocal of the curvature radius R in Table 1 above); k is a conic coefficient; and Ai is a correction coefficient of the i-th order of the aspheric surface. Table 2 shows high-order coefficients A4, A6, A8, A10, A12, A14, A16, A18, A20, A22 and A24 applied to each of the aspheric mirror surfaces S1-S14 in Embodiment 1.

TABLE 2

| Surface number | A4 | A6 | A8 | A10 | A12 | A14 |
|---|---|---|---|---|---|---|
| S1 | 4.7147E−01 | −4.5965E−02 | 1.1669E−02 | −4.7914E−03 | 8.3351E−04 | −5.9722E−04 |
| S2 | 1.6180E−01 | −2.4953E−02 | 3.0318E−03 | −9.2598E−04 | 3.1484E−04 | −1.5273E−04 |
| S3 | −1.6075E−02 | 6.5302E−04 | 2.4766E−03 | 7.1876E−04 | 9.2784E−05 | 4.1169E−05 |
| S4 | 3.1356E−02 | 8.0923E−04 | 1.0595E−03 | 2.2546E−04 | 6.8020E−05 | 2.6204E−05 |
| S5 | −4.6900E−02 | −3.7755E−03 | −3.0452E−04 | 1.2479E−05 | 1.6975E−04 | 3.9785E−06 |
| S6 | −2.0958E−01 | 2.0781E−03 | 1.9999E−05 | −6.6776E−05 | 3.6744E−04 | −6.4741E−05 |
| S7 | −1.8224E−01 | 2.1008E−02 | 4.9422E−03 | 5.4149E−04 | 6.7958E−04 | −3.2749E−04 |
| S8 | −1.2912E−01 | −3.5711E−02 | 1.1517E−02 | 2.0095E−04 | 2.7153E−03 | 3.4161E−04 |
| S9 | −3.6564E−01 | 2.8907E−02 | 8.4431E−03 | −6.2956E−03 | 1.5190E−03 | −4.5222E−04 |
| S10 | −2.8831E−01 | 6.2061E−02 | 4.3692E−03 | −6.8177E−03 | 1.6277E−03 | −4.5850E−04 |
| S11 | −1.9248E−01 | 9.3058E−03 | 1.7704E−02 | −9.8679E−04 | −2.9536E−03 | 5.5696E−04 |
| S12 | −4.0628E−01 | 2.0953E−01 | −1.3388E−02 | 4.7932E−04 | −1.1009E−02 | 2.5265E−03 |
| S13 | −1.5862E+00 | 4.1511E−01 | −2.9981E−02 | −1.2342E−02 | −8.8191E−06 | −1.0482E−04 |
| S14 | −2.2463E+00 | 2.5393E−01 | −7.5390E−02 | 3.8535E−02 | −5.9617E−03 | 3.3762E−03 |

| Surface number | A16 | A18 | A20 | A22 | A24 |
|---|---|---|---|---|---|
| S1 | 6.6783E−05 | −7.4786E−05 | 2.5054E−05 | 0.0000E+00 | 0.0000E+00 |
| S2 | −2.5016E−05 | 1.9073E−05 | 1.2332E−05 | 0.0000E+00 | 0.0000E+00 |
| S3 | −3.7028E−05 | 7.4557E−06 | 1.7556E−06 | 0.0000E+00 | 0.0000E+00 |
| S4 | 1.3820E−06 | −3.8614E−07 | −7.8284E−07 | 0.0000E+00 | 0.0000E+00 |
| S5 | −4.5256E−06 | −1.2542E−06 | −1.9698E−06 | 0.0000E+00 | 0.0000E+00 |
| S6 | −9.2483E−06 | −4.0978E−05 | −1.7847E−06 | −8.3050E−06 | 2.3529E−06 |
| S7 | −7.3892E−05 | −1.6843E−05 | 2.3814E−05 | 0.0000E+00 | 0.0000E+00 |
| S8 | 2.2457E−05 | 1.6349E−05 | 1.0586E−05 | 0.0000E+00 | 0.0000E+00 |
| S9 | −4.5013E−04 | 1.2768E−04 | 7.3894E−05 | 0.0000E+00 | 0.0000E+00 |
| S10 | −1.6926E−04 | 2.9535E−04 | 1.5603E−05 | 0.0000E+00 | 0.0000E+00 |
| S11 | −2.2089E−04 | 6.5477E−05 | 1.5541E−04 | 0.0000E+00 | 0.0000E+00 |
| S12 | 8.4024E−04 | 3.4763E−04 | −4.2909E−04 | 0.0000E+00 | 0.0000E+00 |
| S13 | 5.4811E−04 | 6.5077E−04 | −5.8369E−04 | 0.0000E+00 | 0.0000E+00 |
| S14 | −8.2963E−04 | 5.9502E−05 | −3.7488E−04 | 0.0000E+00 | 0.0000E+00 |

Figure 2A:
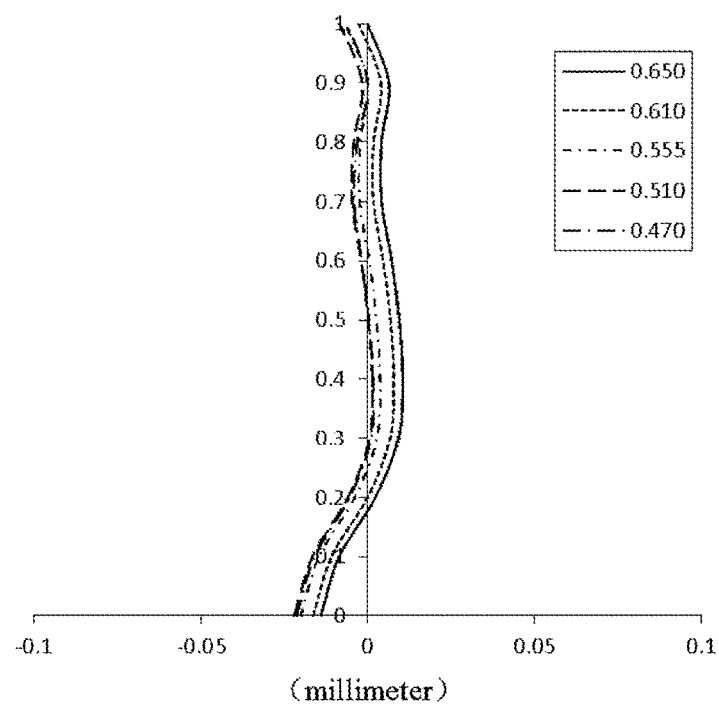
FIGS. 2A-2D show a longitudinal aberration curve, an astigmatism curve, a distortion curve and a lateral color curve of an optical imaging lens assembly according to Embodiment 1 respectively.
Figure 2B:
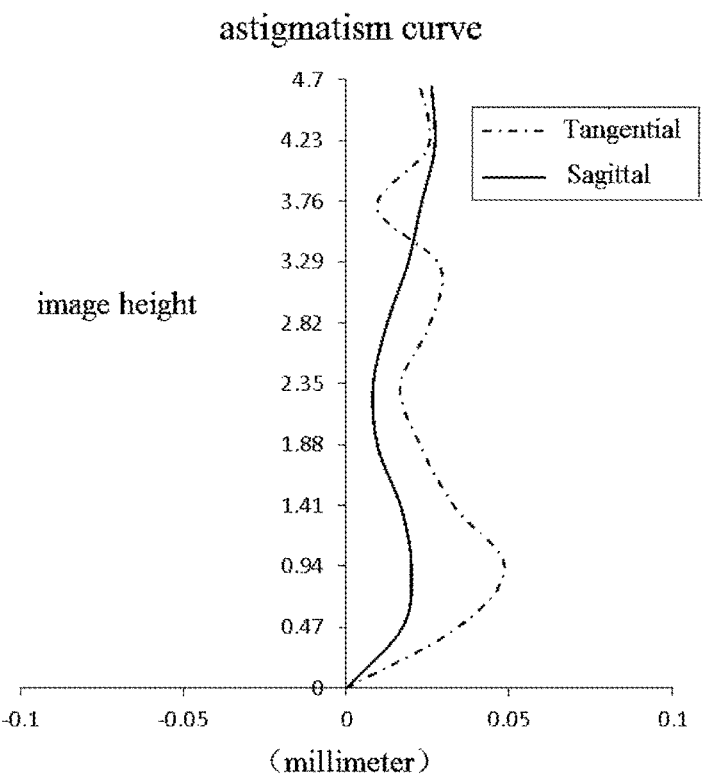
Figure 2C:
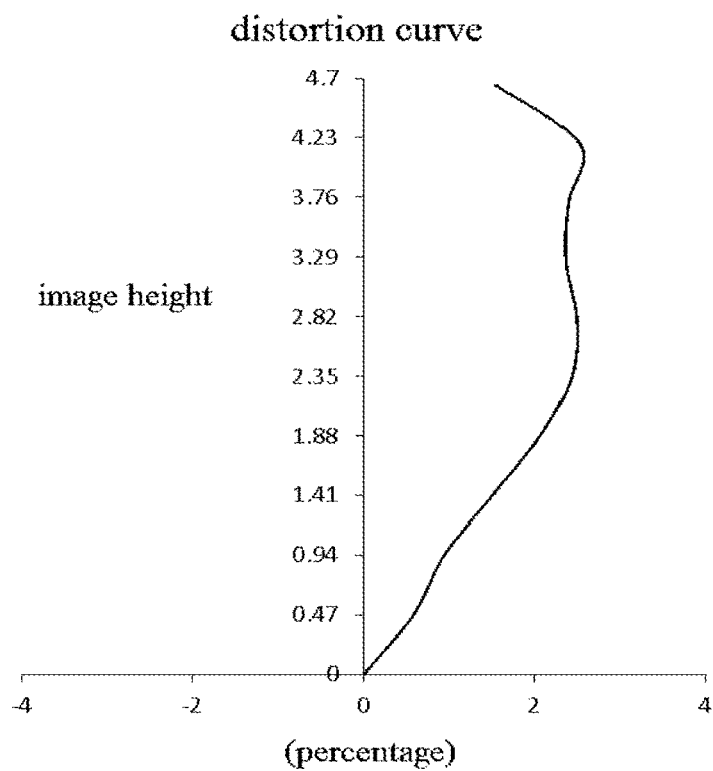
Figure 2D:
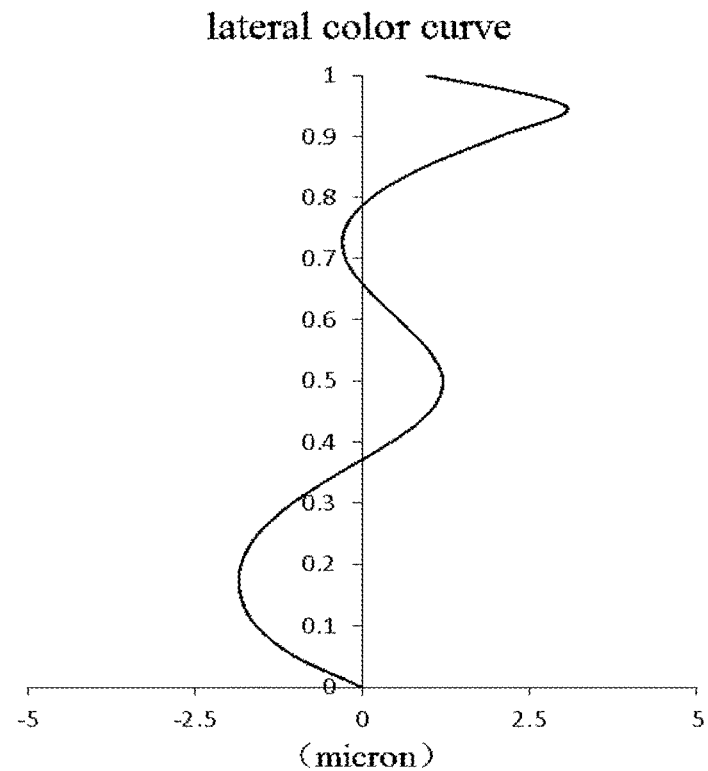

FIG. 2A shows a longitudinal aberration curve of the optical imaging lens assembly according to Embodiment 1 to represent deviation of a convergence focal point after light with different wavelengths passes through the lens. FIG. 2B shows an astigmatism curve of the optical imaging lens assembly according to Embodiment 1 to represent a curvature of tangential image surface and a curvature of sagittal image surface. FIG. 2C shows a distortion curve of the optical imaging lens assembly according to Embodiment 1 to represent distortion values corresponding to different image heights. FIG. 2D shows a lateral color curve of the optical imaging lens assembly according to Embodiment 1 to represent deviation of different image heights on the imaging surface after the light passes through the lens. According to FIGS. 2A-2D, it can be seen that the optical imaging lens assembly provided in Embodiment 1 may achieve good imaging quality.

Embodiment 2

Figure 3:
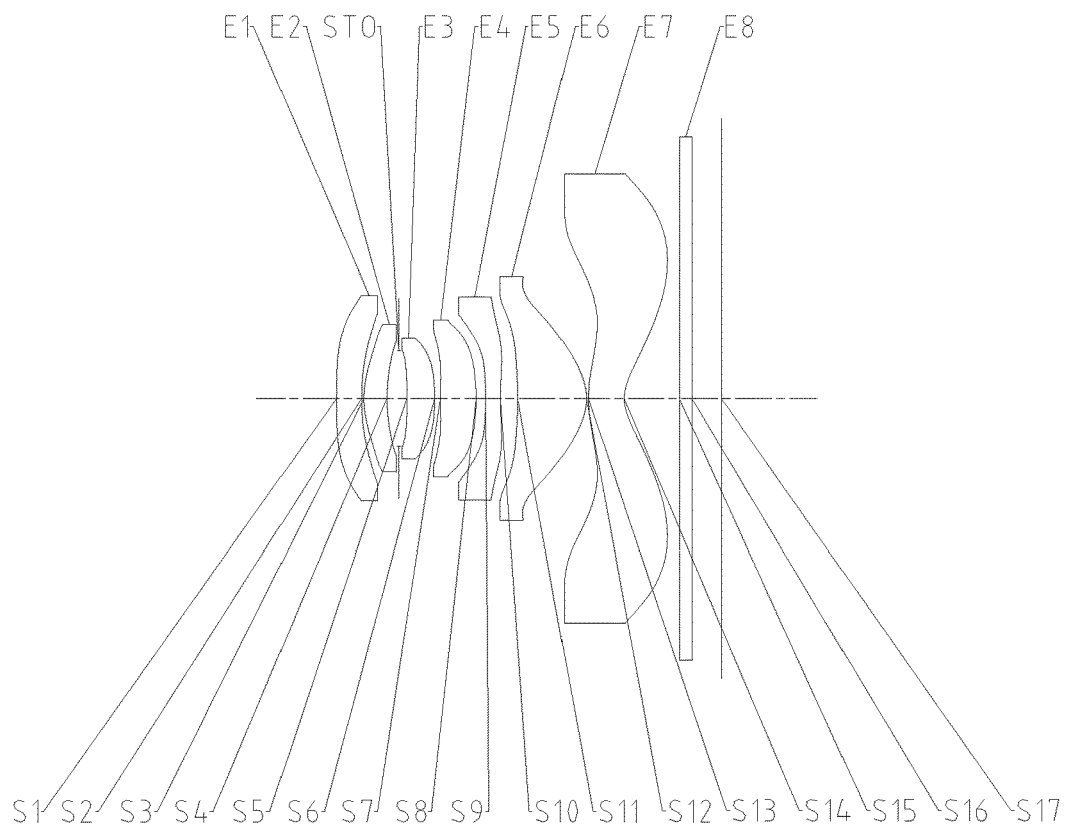
FIG. 3 shows a structural schematic diagram of an optical imaging lens assembly according to Embodiment 2 of the disclosure.

An optical imaging lens assembly according to Embodiment 2 of the disclosure will be described below with reference to FIGS. 3-4D. In the embodiment and the following embodiments, parts of descriptions similar to those about embodiment are omitted for simplicity. FIG. 3 shows a structural schematic diagram of an optical imaging lens assembly according to Embodiment 2 of the disclosure.

As shown in FIG. 3, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, a seventh lens E7 and an optical filter E8.

The first lens E1 has a negative refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In Embodiment 2, a value of a total effective focal length f of the optical imaging lens assembly is 3.23 mm, a value of an on-axis distance TTL from the object-side surface S1 of the first lens E1 to the imaging surface S17 is 6.40 mm, ImgH is a half the diagonal length of an effective pixel region on the imaging surface S17, and a value of ImgH is 4.65 mm, and a value of a maximum field of view FOV is 109.6°.

Table 3 shows a basic parameter table of the optical imaging lens assembly of Embodiment 2, and the units of the curvature radius, the thickness/distance and the focal length are all millimeters (mm). Table 4 shows high-order coefficients applied to each aspheric mirror surface in Embodiment 2. A surface type of each aspheric surface may be defined by the formula (1) given in Embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | 400.0000 | 0.4142 | 1.55 | 56.1 | −8.18 | −99.0000 |
| S2 | Aspheric | 4.4172 | 0.0386 | | | | −54.8971 |
| S3 | Aspheric | 1.7052 | 0.3842 | 1.55 | 56.1 | 6.51 | −5.1025 |
| S4 | Aspheric | 3.0169 | 0.2012 | | | | −18.1213 |
| STO | Spherical | Infinite | 0.1317 | | | | |
| S5 | Aspheric | −19.7487 | 0.4620 | 1.55 | 56.1 | 12.29 | 99.0000 |
| S6 | Aspheric | −5.0491 | 0.0971 | | | | 0.0000 |
| S7 | Aspheric | 17.3859 | 0.5932 | 1.55 | 56.1 | 5.31 | 0.0000 |
| S8 | Aspheric | −3.4347 | 0.1576 | | | | 3.1652 |
| S9 | Aspheric | −7.0013 | 0.2500 | 1.67 | 19.2 | −4.86 | −97.5246 |
| S10 | Aspheric | 6.3032 | 0.2826 | | | | −97.4390 |
| S11 | Aspheric | −8.4569 | 1.1425 | 1.55 | 56.1 | 1.79 | −71.5237 |
| S12 | Aspheric | −0.9176 | 0.0300 | | | | −4.4151 |
| S13 | Aspheric | 2.3448 | 0.5953 | 1.54 | 55.9 | −2.21 | −9.4631 |
| S14 | Aspheric | 0.7173 | 0.9200 | | | | −3.7015 |
| S15 | Spherical | Infinite | 0.2100 | 1.52 | 64.2 | | |
| S16 | Spherical | Infinite | 0.4900 | | | | |
| S17 | Spherical | Infinite | | | | | |

TABLE 4

| Surface number | A4 | A6 | A8 | A10 | A12 | A14 |
|---|---|---|---|---|---|---|
| S1 | 4.5096E−01 | −4.0129E−02 | 4.7475E−03 | −5.1117E−03 | −4.1862E−04 | −5.9323E−04 |
| S2 | 1.5448E−01 | −2.8363E−02 | 5.1211E−03 | −1.2136E−03 | 1.2243E−04 | −7.9897E−05 |

TABLE 4-continued

| | | | | | | |
|---|---|---|---|---|---|---|
| S3 | −2.9591E−02 | 1.6557E−03 | 3.3525E−03 | 2.6238E−04 | −9.4624E−05 | 1.2169E−04 |
| S4 | 2.7471E−02 | 8.3672E−04 | 1.3042E−03 | 5.4998E−05 | 2.5348E−05 | −1.7359E−06 |
| S5 | −4.9966E−02 | −3.8092E−03 | −4.3049E−04 | −5.7789E−05 | −1.1000E−05 | −5.7676E−07 |
| S6 | −2.0803E−01 | −2.0026E−04 | −8.2785E−04 | −4.0102E−04 | 2.1421E−04 | −4.9341E−05 |
| S7 | −1.8111E−01 | 2.0282E−02 | 5.1867E−03 | 8.1223E−04 | 8.8319E−04 | −2.1578E−04 |
| S8 | −1.3400E−01 | −3.7731E−02 | 1.3500E−02 | −1.5407E−04 | 3.1566E−03 | 7.5143E−04 |
| S9 | −3.6490E−01 | 2.8824E−02 | 9.4781E−03 | −7.1766E−03 | 1.6079E−03 | −3.8860E−04 |
| S10 | −3.2168E−01 | 6.0335E−02 | 1.9101E−03 | −6.4118E−03 | 1.9967E−03 | −2.9984E−04 |
| S11 | −2.0118E−01 | 9.0381E−03 | 2.1768E−02 | 1.1411E−03 | −1.9036E−03 | 6.8492E−04 |
| S12 | −4.1664E−01 | 2.1637E−01 | −3.5952E−03 | 3.2846E−03 | −1.1262E−02 | 2.2685E−03 |
| S13 | −1.5697E+00 | 4.0660E−01 | −2.3959E−02 | −1.7179E−02 | 2.3728E−03 | −1.6647E−03 |
| S14 | −2.2107E+00 | 2.3794E−01 | −6.4887E−02 | 3.3367E−02 | −2.4347E−03 | 1.0901E−03 |

| Surface number | A16 | A18 | A20 | A22 | A24 |
|---|---|---|---|---|---|
| S1 | −5.2230E−05 | −3.9466E−05 | 2.1889E−05 | 0.0000E+00 | 0.0000E+00 |
| S2 | −8.4708E−05 | 2.6720E−05 | −1.5612E−05 | 0.0000E+00 | 0.0000E+00 |
| S3 | −4.4496E−05 | 1.4612E−05 | −7.3179E−06 | 0.0000E+00 | 0.0000E+00 |
| S4 | −1.5584E−05 | −1.1645E−05 | −2.5270E−06 | 0.0000E+00 | 0.0000E+00 |
| S5 | −4.8010E−06 | −9.8433E−07 | −1.3099E−06 | 0.0000E+00 | 0.0000E+00 |
| S6 | 7.2227E−07 | −1.6809E−05 | 1.0477E−05 | 5.6798E−07 | 4.8880E−06 |
| S7 | −1.0902E−04 | −3.6495E−05 | 1.5036E−05 | 0.0000E+00 | 0.0000E+00 |
| S8 | 2.8714E−04 | 5.5309E−05 | 3.2961E−05 | 0.0000E+00 | 0.0000E+00 |
| S9 | −3.3954E−04 | 4.7215E−05 | 5.5375E−05 | 0.0000E+00 | 0.0000E+00 |
| S10 | −1.5540E−04 | 1.7986E−04 | −3.6869E−05 | 0.0000E+00 | 0.0000E+00 |
| S11 | −3.5592E−04 | 1.1424E−05 | 1.8933E−05 | 0.0000E+00 | 0.0000E+00 |
| S12 | 6.5539E−04 | 5.2098E−04 | −4.0097E−04 | 0.0000E+00 | 0.0000E+00 |
| S13 | 1.1884E−03 | 5.0421E−04 | −8.2154E−04 | 0.0000E+00 | 0.0000E+00 |
| S14 | −3.7987E−04 | −5.8153E−04 | −2.4536E−04 | 0.0000E+00 | 0.0000E+00 |

Figure 4A:
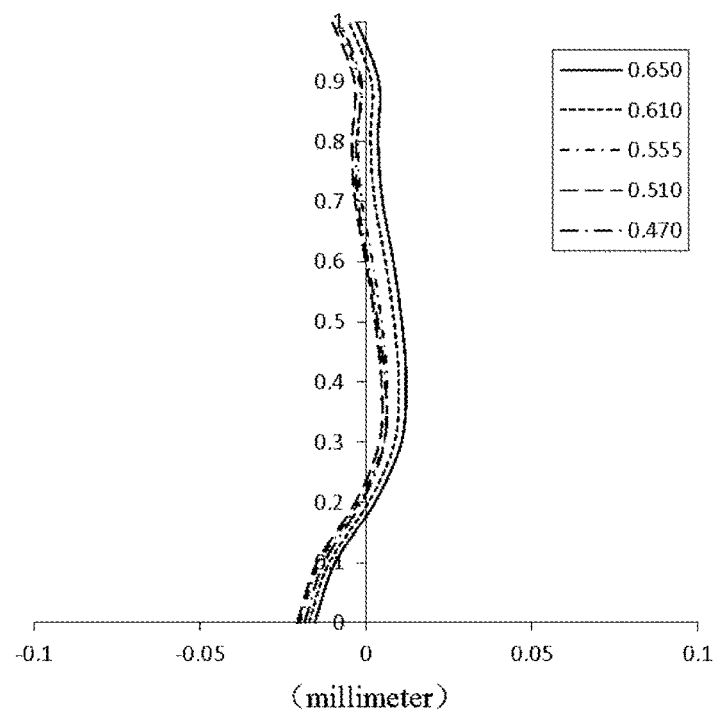
FIGS. 4A-4D show a longitudinal aberration curve, an astigmatism curve, a distortion curve and a lateral color curve of an optical imaging lens assembly according to Embodiment 2 respectively.
Figure 4B:
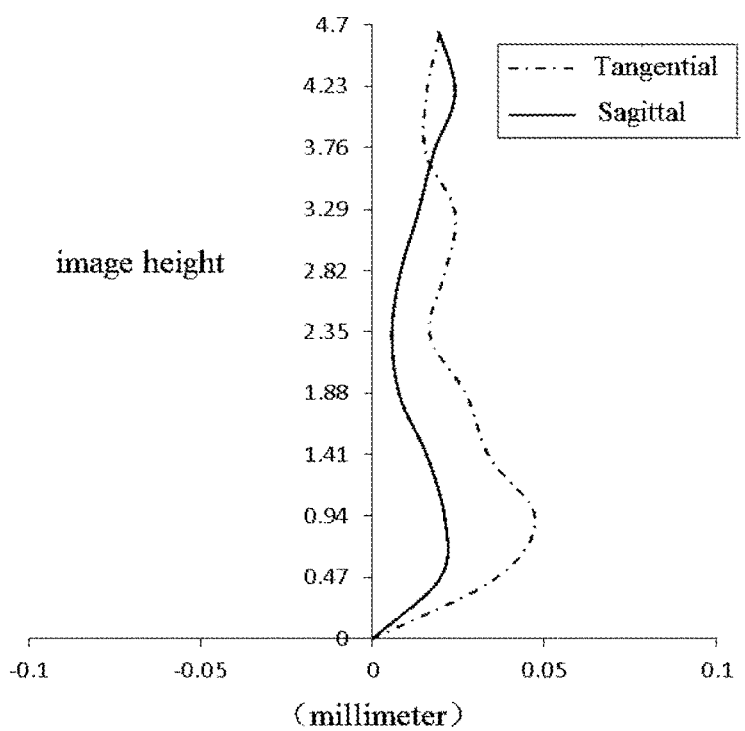
Figure 4C:
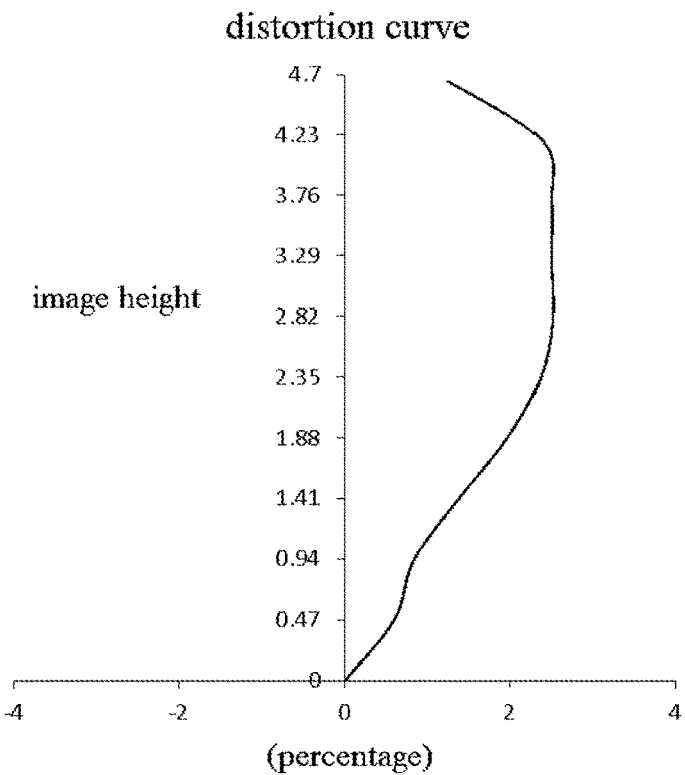
Figure 4D:
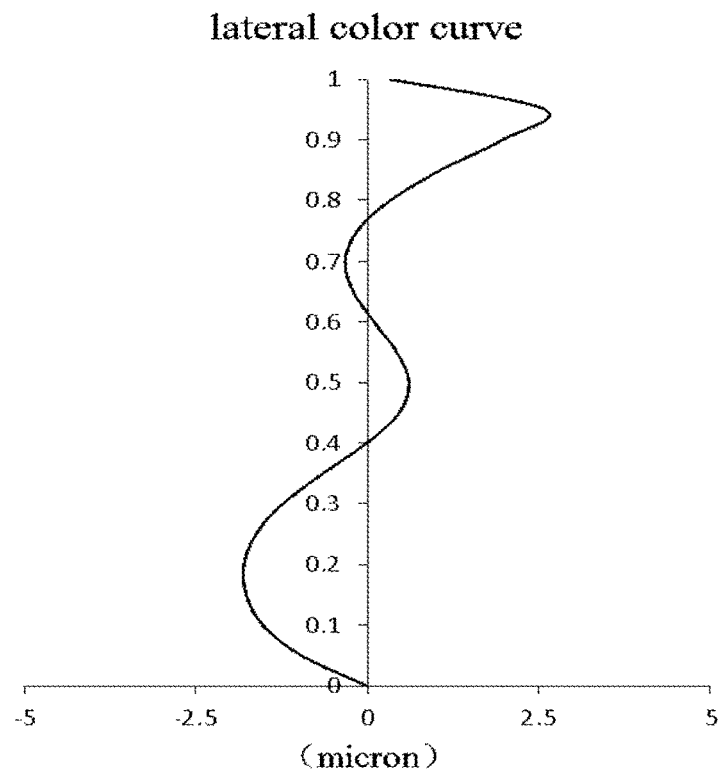

FIG. 4A shows a longitudinal aberration curve of the optical imaging lens assembly according to Embodiment 2 to represent deviation of a convergence focal point after light with different wavelengths passes through the lens. FIG. 4B shows an astigmatism curve of the optical imaging lens assembly according to Embodiment 2 to represent a curvature of tangential image surface and a curvature of sagittal image surface. FIG. 4C shows a distortion curve of the optical imaging lens assembly according to Embodiment 2 to represent distortion values corresponding to different image heights. FIG. 4D shows a lateral color curve of the optical imaging lens assembly according to Embodiment 2 to represent deviation of different image heights on the imaging surface after the light passes through the lens. According to FIGS. 4A-4D, it can be seen that the optical imaging lens assembly provided in Embodiment 2 may achieve good imaging quality.

Embodiment 3

Figure 5:
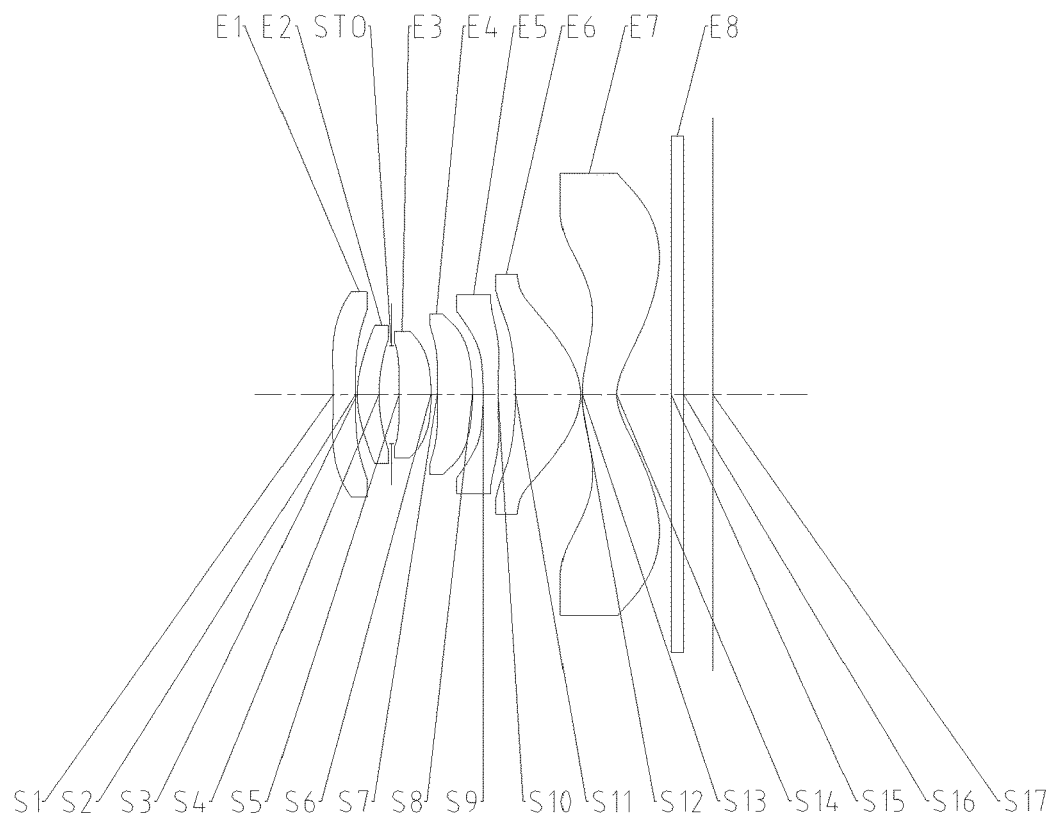
FIG. 5 shows a structural schematic diagram of an optical imaging lens assembly according to Embodiment 3 of the disclosure.

An optical imaging lens assembly according to Embodiment 3 of the disclosure is described below with reference to FIGS. 5-6D. FIG. 5 shows a structural schematic diagram of an optical imaging lens assembly according to Embodiment 3 of the disclosure.

As shown in FIG. 5, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, a seventh lens E7 and an optical filter E8.

The first lens E1 has a negative refractive power, an object-side surface S1 thereof is a concave surface, and an image-side surface S2 thereof is a convex surface. The second lens E2 has a positive refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In Embodiment 3, a value of a total effective focal length f of the optical imaging lens assembly is 3.24 mm, a value of an on-axis distance TTL from the object-side surface S1 of the first lens E1 to the imaging surface S17 is 6.40 mm, ImgH is a half the diagonal length of an effective pixel region on the imaging surface S17, and a value of ImgH is 4.65 mm, and a value of a maximum field of view FOV is 109.2°.

Table 5 shows a basic parameter table of the optical imaging lens assembly of Embodiment 3, and the units of the curvature radius, the thickness/distance and the focal length are all millimeters (mm). Table 6 shows high-order coefficients applied to each aspheric mirror surface in Embodiment 3. A surface type of each aspheric surface may be defined by the formula (1) given in Embodiment 1.

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −6.3227 | 0.3737 | 1.55 | 56.1 | −11.66 | −54.6991 |
| S2 | Aspheric | −1000.0000 | 0.0300 | | | | −99.0000 |
| S3 | Aspheric | 1.7335 | 0.3651 | 1.55 | 56.1 | 8.81 | −4.1210 |
| S4 | Aspheric | 2.5092 | 0.2100 | | | | −14.7807 |
| STO | Spherical | Infinite | 0.1331 | | | | |
| S5 | Aspheric | −23.8393 | 0.5382 | 1.55 | 56.1 | 9.73 | 99.0000 |
| S6 | Aspheric | −4.3801 | 0.1046 | | | | 0.0000 |
| S7 | Aspheric | 17.7508 | 0.5963 | 1.55 | 56.1 | 5.53 | 0.0000 |
| S8 | Aspheric | −3.5941 | 0.1798 | | | | 3.2743 |
| S9 | Aspheric | −6.4519 | 0.2500 | 1.67 | 19.2 | −5.28 | −93.2080 |
| S10 | Aspheric | 8.1488 | 0.2986 | | | | −97.4390 |
| S11 | Aspheric | −4.7533 | 1.0878 | 1.55 | 56.1 | 1.95 | −39.1453 |
| S12 | Aspheric | −0.9415 | 0.0300 | | | | −4.4313 |
| S13 | Aspheric | 2.0876 | 0.5800 | 1.54 | 55.9 | −2.47 | −8.4610 |
| S14 | Aspheric | 0.7315 | 0.9214 | | | | −3.6118 |
| S15 | Spherical | Infinite | 0.2100 | 1.52 | 64.2 | | |
| S16 | Spherical | Infinite | 0.4913 | | | | |
| S17 | Spherical | Infinite | | | | | |

TABLE 6

| Surface number | A4 | A6 | A8 | A10 | A12 | A14 |
|---|---|---|---|---|---|---|
| S1 | 4.5545E−01 | −3.9135E−02 | 1.1917E−02 | −4.4754E−03 | 7.3095E−04 | −5.9670E−04 |
| S2 | 1.9889E−01 | −2.3820E−02 | 4.3651E−03 | −2.1129E−03 | 7.2693E−04 | −2.7641E−04 |
| S3 | −1.5584E−02 | 4.4187E−04 | 2.8687E−03 | 9.4529E−05 | 3.8129E−04 | −3.5122E−05 |
| S4 | 2.8450E−02 | 4.0453E−04 | 1.1176E−03 | 2.2020E−04 | 9.3073E−05 | 3.9843E−05 |
| S5 | −4.7733E−02 | −3.6332E−03 | −2.0705E−04 | 4.3360E−05 | 1.8458E−05 | 6.9911E−07 |
| S6 | −2.0583E−01 | 2.3584E−03 | 1.7752E−04 | 1.7112E−05 | 3.0031E−05 | −7.2508E−05 |
| S7 | −1.9311E−01 | 2.1280E−02 | 5.1020E−03 | 4.0775E−04 | 6.2347E−04 | −2.7466E−04 |
| S8 | −1.4631E−01 | −3.5202E−02 | 1.1558E−02 | −6.7170E−04 | 2.7514E−03 | 2.9502E−04 |
| S9 | −3.6186E−01 | 3.1100E−02 | 9.6447E−03 | −6.5465E−03 | 2.3029E−03 | −2.4944E−04 |
| S10 | −2.9108E−01 | 6.2492E−02 | 5.9488E−03 | −6.9299E−03 | 2.2201E−03 | −5.1035E−04 |
| S11 | −1.7504E−01 | 1.7670E−02 | 1.6533E−02 | −2.6433E−03 | −3.4758E−03 | 9.1543E−04 |
| S12 | −4.1744E−01 | 2.1674E−01 | −1.5710E−02 | −5.5429E−04 | −1.1930E−02 | 2.9522E−03 |
| S13 | −1.5748E+00 | 3.7277E−01 | −1.0143E−02 | −1.3654E−02 | −1.2778E−03 | −1.1977E−03 |
| S14 | −2.1665E+00 | 2.2482E−01 | −6.3816E−02 | 3.4128E−02 | −2.3638E−03 | 7.7252E−04 |

| Surface number | A16 | A18 | A20 | A22 | A24 |
|---|---|---|---|---|---|
| S1 | 5.1270E−06 | −9.8361E−05 | −2.6163E−06 | 0.0000E+00 | 0.0000E+00 |
| S2 | 5.6517E−05 | −5.3844E−05 | 2.1275E−05 | 0.0000E+00 | 0.0000E+00 |
| S3 | −8.6649E−06 | −1.9921E−05 | 5.0540E−07 | 0.0000E+00 | 0.0000E+00 |
| S4 | 5.0754E−06 | −7.0753E−07 | −1.6757E−06 | 0.0000E+00 | 0.0000E+00 |
| S5 | −7.0739E−06 | −2.7878E−06 | −2.6299E−06 | 0.0000E+00 | 0.0000E+00 |
| S6 | −2.7671E−05 | −4.5726E−05 | −5.6939E−06 | −9.3010E−06 | 2.3135E−06 |
| S7 | −8.6982E−05 | −1.9001E−05 | 2.5130E−05 | 0.0000E+00 | 0.0000E+00 |
| S8 | −2.3760E−05 | −2.4181E−05 | 1.1076E−05 | 0.0000E+00 | 0.0000E+00 |
| S9 | −4.9988E−04 | 6.2353E−05 | 7.8270E−05 | 0.0000E+00 | 0.0000E+00 |
| S10 | −2.9078E−04 | 2.7565E−04 | 4.4313E−05 | 0.0000E+00 | 0.0000E+00 |
| S11 | −2.4180E−04 | 4.0760E−05 | 1.5680E−04 | 0.0000E+00 | 0.0000E+00 |
| S12 | 9.4405E−04 | 4.0096E−04 | −4.1779E−04 | 0.0000E+00 | 0.0000E+00 |
| S13 | 1.2445E−03 | 8.9413E−04 | −8.9770E−04 | 0.0000E+00 | 0.0000E+00 |
| S14 | −5.0554E−04 | −1.7915E−04 | −2.3282E−04 | 0.0000E+00 | 0.0000E+00 |

Figure 6A:
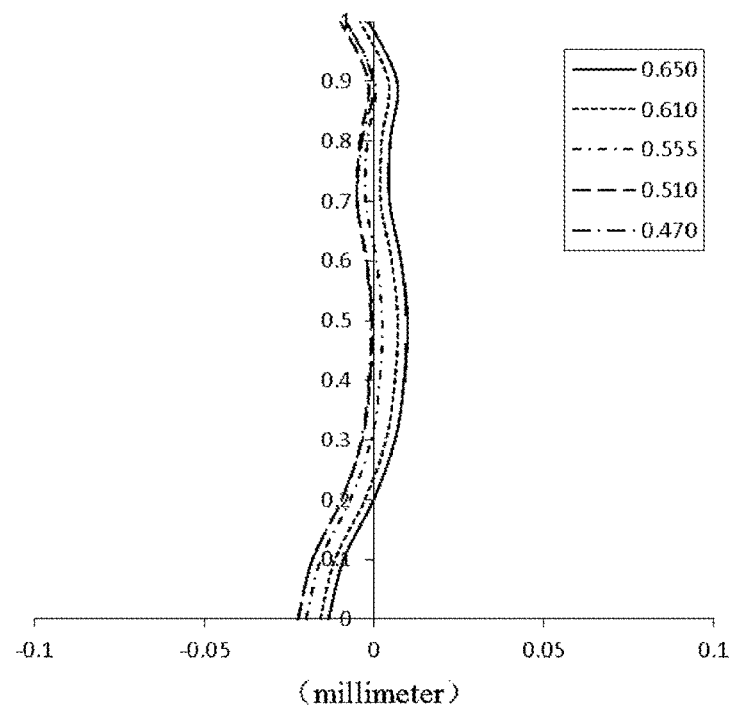
FIGS. 6A-6D show a longitudinal aberration curve, an astigmatism curve, a distortion curve and a lateral color curve of an optical imaging lens assembly according to Embodiment 3 respectively.
Figure 6B:
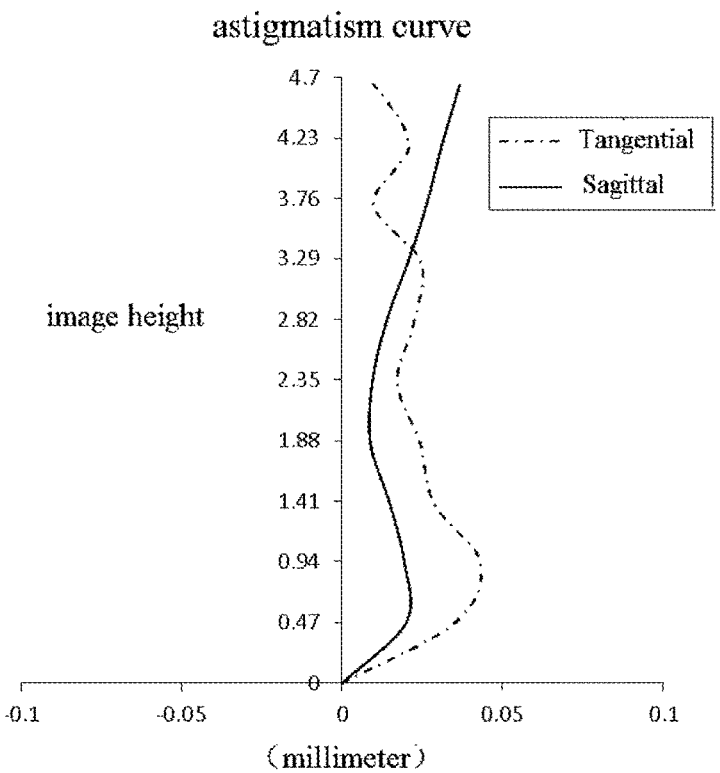
Figure 6C:
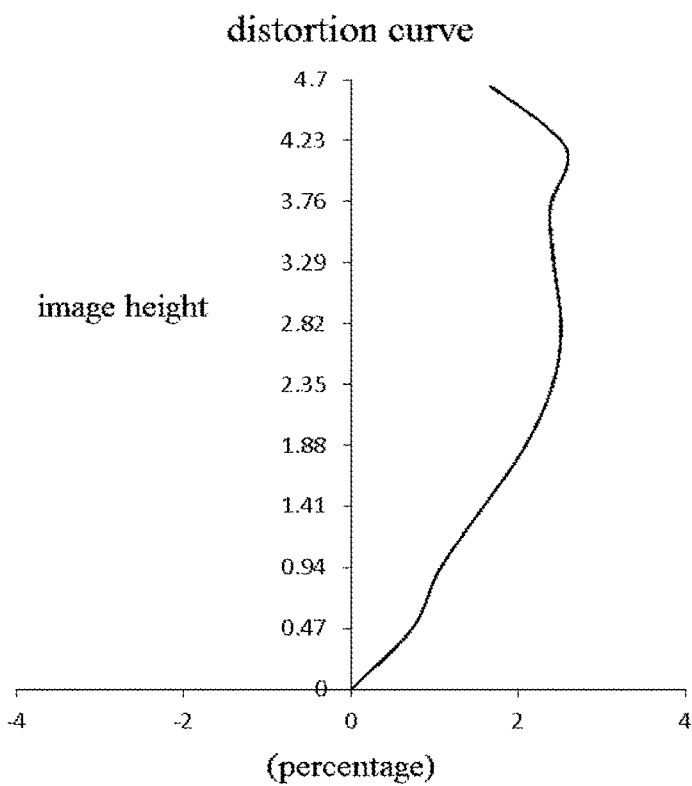
Figure 6D:
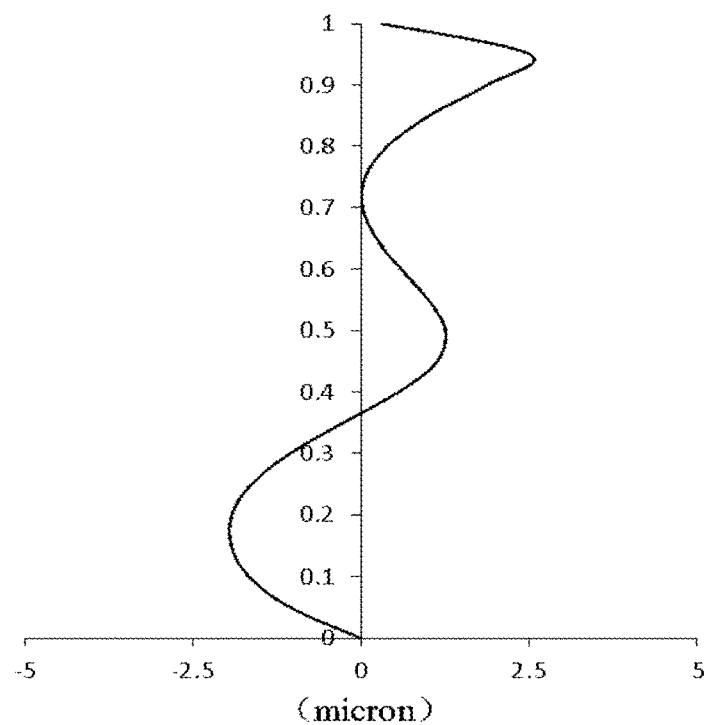

FIG. 6A shows a longitudinal aberration curve of the optical imaging lens assembly according to Embodiment 3 to represent deviation of a convergence focal point after light with different wavelengths passes through the lens. FIG. 6B shows an astigmatism curve of the optical imaging lens assembly according to Embodiment 3 to represent a curvature of tangential image surface and a curvature of sagittal image surface. FIG. 6C shows a distortion curve of the optical imaging lens assembly according to Embodiment 3 to represent distortion values corresponding to different image heights. FIG. 6D shows a lateral color curve of the optical imaging lens assembly according to Embodiment 3 to represent deviation of different image heights on the imaging surface after the light passes through the lens. According to FIGS. 6A-6D, it can be seen that the optical imaging lens assembly provided in Embodiment 3 may achieve good imaging quality.

Embodiment 4

Figure 7:
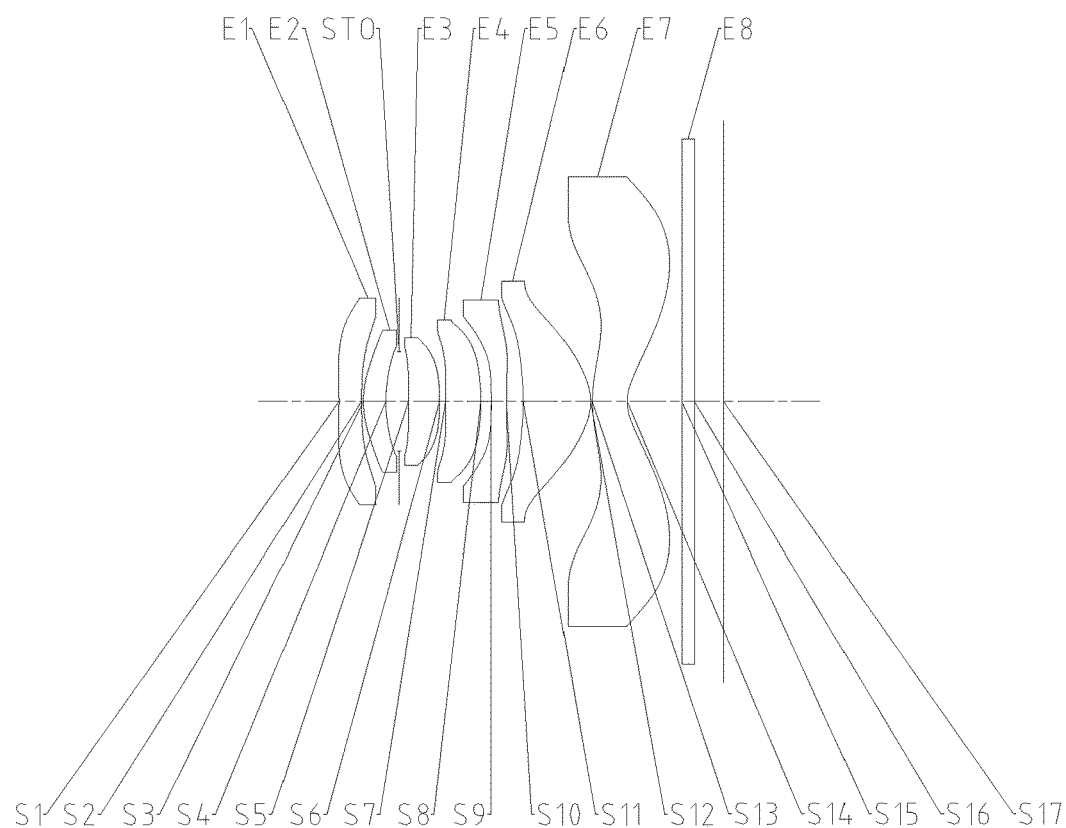
FIG. 7 shows a structural schematic diagram of an optical imaging lens assembly according to Embodiment 4 of the disclosure.

An optical imaging lens assembly according to Embodiment 4 of the disclosure is described below with reference to FIGS. 7-8D. FIG. 7 shows a structural schematic diagram of an optical imaging lens assembly according to Embodiment 4 of the disclosure.

As shown in FIG. 7, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, a seventh lens E7 and an optical filter E8.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In Embodiment 4, a value of a total effective focal length f of the optical imaging lens assembly is 3.24 mm, a value of an on-axis distance TTL from the object-side surface S1 of the first lens E1 to the imaging surface S17 is 6.40 mm, a value of ImgH is a half the diagonal length of an effective pixel region on the imaging surface S17, and a value of ImgH is 4.65 mm, and a value of a maximum field of view FOV is 109.2°.

Table 7 shows a basic parameter table of the optical imaging lens assembly of Embodiment 4, and the units of the curvature radius, the thickness/distance and the focal length are all millimeters (mm). Table 8 shows high-order coefficients applied to each aspheric mirror surface in Embodiment 4. A surface type of each aspheric surface may be defined by the formula (1) given in Embodiment 1.

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −6.9321 | 0.3750 | 1.55 | 56.1 | −7.30 | −89.9948 |
| S2 | Aspheric | 9.5519 | 0.0300 | | | | −36.4432 |
| S3 | Aspheric | 1.5183 | 0.3761 | 1.55 | 56.1 | 6.35 | −4.2640 |
| S4 | Aspheric | 2.4662 | 0.2242 | | | | −12.8396 |
| STO | Spherical | Infinite | 0.1533 | | | | |
| S5 | Aspheric | 800.0000 | 0.5175 | 1.55 | 56.1 | 8.63 | 99.0000 |
| S6 | Aspheric | −4.7356 | 0.1027 | | | | 0.0000 |
| S7 | Aspheric | 26.0756 | 0.5856 | 1.55 | 56.1 | 5.65 | 0.0000 |
| S8 | Aspheric | −3.4714 | 0.1742 | | | | 3.1221 |
| S9 | Aspheric | −6.8487 | 0.2500 | 1.67 | 19.2 | −5.32 | −83.2714 |
| S10 | Aspheric | 7.7293 | 0.2800 | | | | −97.4390 |
| S11 | Aspheric | −5.1751 | 1.1141 | 1.55 | 56.1 | 1.82 | −39.6104 |
| S12 | Aspheric | −0.8981 | 0.0300 | | | | −4.2988 |
| S13 | Aspheric | 2.3857 | 0.5800 | 1.54 | 55.9 | −2.18 | −9.5361 |
| S14 | Aspheric | 0.7194 | 0.9137 | | | | −3.7709 |
| S15 | Spherical | Infinite | 0.2100 | 1.52 | 64.2 | | |
| S16 | Spherical | Infinite | 0.4836 | | | | |
| S17 | Spherical | Infinite | | | | | |

TABLE 8

| Surface number | A4 | A6 | A8 | A10 | A12 | A14 |
|---|---|---|---|---|---|---|
| S1 | 4.8415E−01 | −4.4497E−02 | 1.0312E−02 | −5.6257E−03 | 5.5987E−04 | −6.0520E−04 |
| S2 | 1.6891E−01 | −2.7168E−02 | 1.1546E−02 | −8.3857E−04 | 4.4867E−04 | −8.4363E−06 |
| S3 | −1.9296E−02 | −7.9675E−04 | 2.8503E−03 | 1.0031E−03 | 1.3401E−04 | 8.5801E−05 |
| S4 | 3.5228E−02 | 1.6747E−03 | 1.6957E−03 | 4.6455E−04 | 1.6750E−04 | 7.1101E−05 |
| S5 | −5.1100E−02 | −3.9206E−03 | −5.2530E−06 | 1.7092E−04 | 6.9974E−05 | 2.0080E−05 |
| S6 | −2.1758E−01 | 3.0443E−04 | 6.6675E−04 | 1.4002E−04 | 4.9880E−04 | 3.5841E−05 |
| S7 | −1.9619E−01 | 2.3669E−02 | 6.4470E−03 | 7.0846E−05 | 6.5823E−04 | −3.1808E−04 |
| S8 | −1.4371E−01 | −3.4856E−02 | 1.2460E−02 | 4.7045E−06 | 3.0255E−03 | 3.0005E−04 |
| S9 | −3.7978E−01 | 3.1006E−02 | 9.0988E−03 | −6.6078E−03 | 2.3704E−03 | −5.4785E−04 |
| S10 | −2.9966E−01 | 6.3774E−02 | 3.2759E−03 | −6.9805E−03 | 2.4271E−03 | −6.7680E−04 |
| S11 | −1.9486E−01 | 3.5341E−03 | 1.5488E−02 | −3.0126E−04 | −2.2563E−03 | 9.7347E−04 |
| S12 | −4.3050E−01 | 1.9885E−01 | −9.7773E−03 | 2.7949E−03 | −1.0344E−02 | 2.1059E−03 |
| S13 | −1.5438E+00 | 3.8377E−01 | −2.0551E−02 | −1.2818E−02 | 1.0687E−03 | −1.3888E−03 |
| S14 | −2.1901E+00 | 2.3031E−01 | −6.1779E−02 | 3.4491E−02 | −3.2280E−03 | 8.8035E−04 |

TABLE 8-continued

| Surface number | A16 | A18 | A20 | A22 | A24 |
|---|---|---|---|---|---|
| S1 | 1.2730E−04 | −4.0641E−05 | 3.9332E−05 | 0.0000E+00 | 0.0000E+00 |
| S2 | −2.9701E−05 | 1.3338E−05 | 3.6390E−06 | 0.0000E+00 | 0.0000E+00 |
| S3 | −2.7923E−05 | 9.1057E−06 | 3.1222E−06 | 0.0000E+00 | 0.0000E+00 |
| S4 | 2.2496E−05 | 7.6657E−06 | 2.5880E−06 | 0.0000E+00 | 0.0000E+00 |
| S5 | −1.8987E−06 | 1.0194E−07 | −9.6094E−07 | 0.0000E+00 | 0.0000E+00 |
| S6 | 2.2492E−05 | −2.8951E−05 | −1.7801E−06 | −7.8590E−06 | 2.0543E−06 |
| S7 | −9.7653E−05 | −1.4995E−05 | 2.6716E−05 | 0.0000E+00 | 0.0000E+00 |
| S8 | −3.8187E−05 | −3.0355E−06 | 9.9578E−06 | 0.0000E+00 | 0.0000E+00 |
| S9 | −5.2504E−04 | 1.7791E−04 | 9.2398E−05 | 0.0000E+00 | 0.0000E+00 |
| S10 | −2.6454E−04 | 3.4993E−04 | −7.2177E−06 | 0.0000E+00 | 0.0000E+00 |
| S11 | −4.9970E−04 | −1.4271E−05 | 9.6073E−05 | 0.0000E+00 | 0.0000E+00 |
| S12 | 5.1459E−04 | 3.0801E−04 | −3.8606E−04 | 0.0000E+00 | 0.0000E+00 |
| S13 | 6.8186E−04 | 8.2148E−04 | −6.0961E−04 | 0.0000E+00 | 0.0000E+00 |
| S14 | −6.5435E−04 | −2.0803E−04 | −1.3101E−04 | 0.0000E+00 | 0.0000E+00 |

Figure 8A:
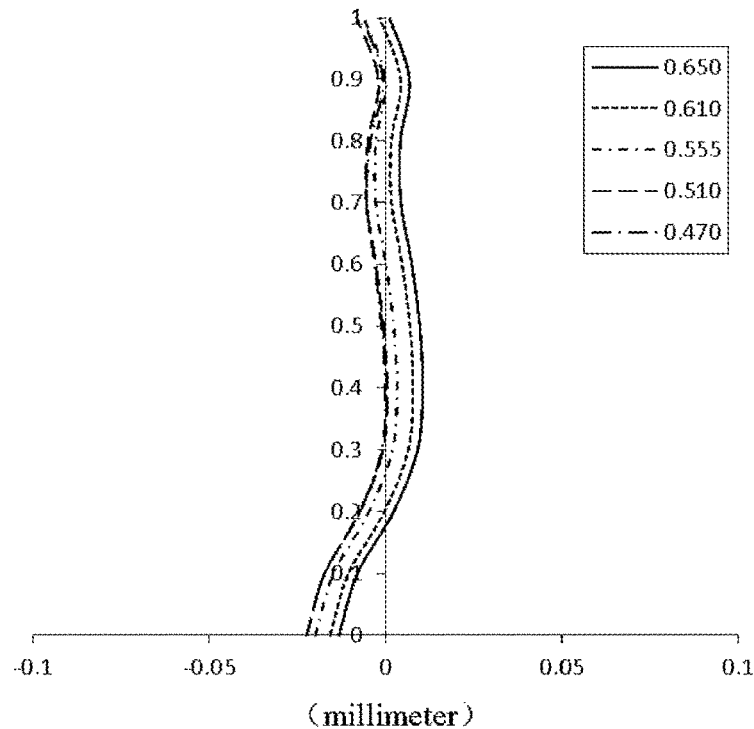
FIGS. 8A-8D show a longitudinal aberration curve, an astigmatism curve, a distortion curve and a lateral color curve of an optical imaging lens assembly according to Embodiment 4 respectively.
Figure 8B:
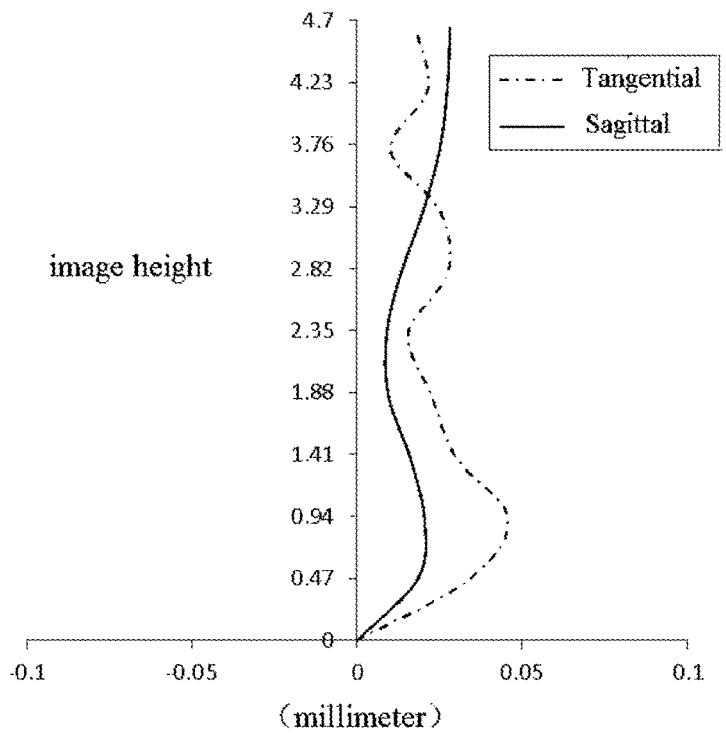
Figure 8C:
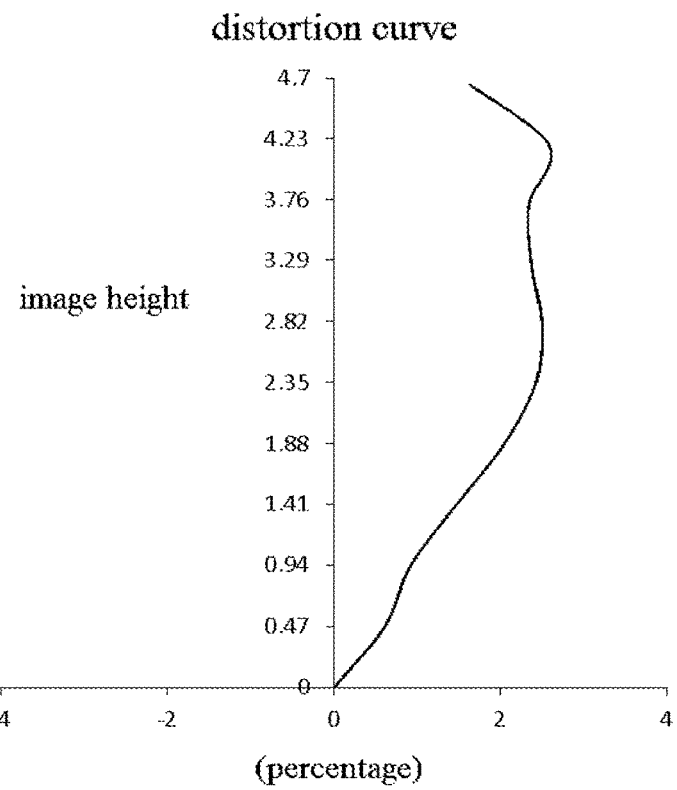
Figure 8D:
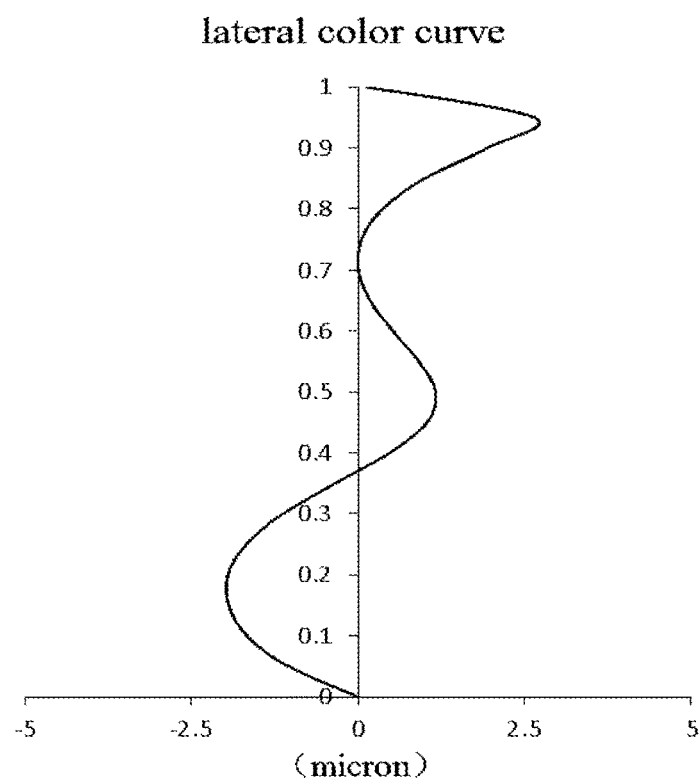

FIG. 8A shows a longitudinal aberration curve of the optical imaging lens assembly according to Embodiment 4 to represent deviation of a convergence focal point after light with different wavelengths passes through the lens. FIG. 8B shows an astigmatism curve of the optical imaging lens assembly according to Embodiment 4 to represent a curvature of tangential image surface and a curvature of sagittal image surface. FIG. 8C shows a distortion curve of the optical imaging lens assembly according to Embodiment 4 to represent distortion values corresponding to different image heights. FIG. 8D shows a lateral color curve of the optical imaging lens assembly according to Embodiment 4 to represent deviation of different image heights on the imaging surface after the light passes through the lens. According to FIGS. 8A-8D, it can be seen that the optical imaging lens assembly provided in Embodiment 4 may achieve good imaging quality.

Embodiment 5

Figure 9:
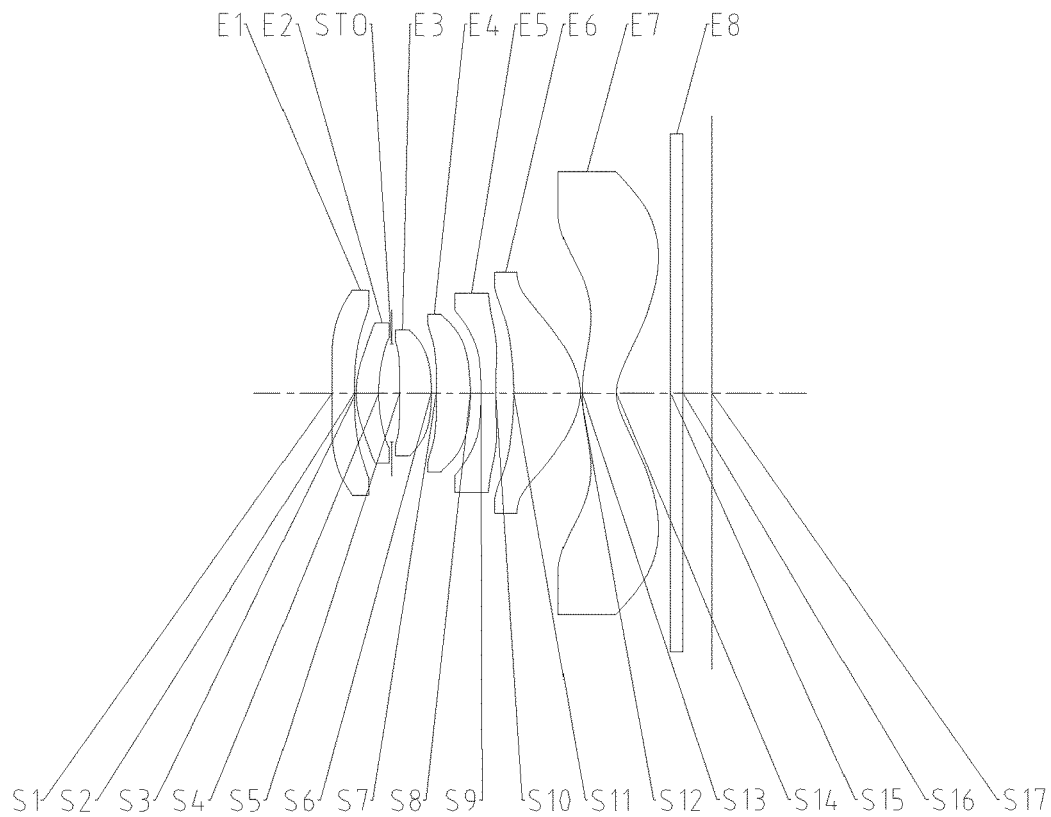
FIG. 9 shows a structural schematic diagram of an optical imaging lens assembly according to Embodiment 5 of the disclosure.

An optical imaging lens assembly according to Embodiment 5 of the disclosure is described below with reference to FIGS. 9-10D. FIG. 9 shows a structural schematic diagram of an optical imaging lens assembly according to Embodiment 5 of the disclosure.

As shown in FIG. 9, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, a seventh lens E7 and an optical filter E8.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In Embodiment 5, a value of a total effective focal length f of the optical imaging lens assembly is 3.24 mm, a value of an on-axis distance TTL from the object-side surface S1 of the first lens E1 to the imaging surface S17 is 6.40 mm, ImgH is a half the diagonal length of an effective pixel region on the imaging surface S17, and a value of ImgH is 4.65 mm, and a value of a maximum field of view FOV is 109.2°.

Table 9 shows a basic parameter table of the optical imaging lens assembly of Embodiment 5, and the units of the curvature radius, the thickness/distance and the focal length are all millimeters (mm). Table 10 shows high-order coefficients applied to each aspheric mirror surface in Embodiment 5. A surface type of each aspheric surface may be defined by the formula (1) given in Embodiment 1.

TABLE 9

| Surface number | Surface type | Curvature radius | Thickness/ distance | Material | | Focal length | Conic coefficient |
|---|---|---|---|---|---|---|---|
| | | | | Refractive index | Abbe number | | |
| OBJ | Spherical | Infinite | Infinite | | | | |
| S1 | Aspheric | −7.2012 | 0.3746 | 1.55 | 56.1 | −7.65 | −85.4685 |
| S2 | Aspheric | 10.1260 | 0.0300 | | | | −41.7312 |
| S3 | Aspheric | 1.5606 | 0.3788 | 1.55 | 56.1 | 6.41 | −4.2865 |
| S4 | Aspheric | 2.5761 | 0.2163 | | | | −13.6520 |
| STO | Spherical | Infinite | 0.1398 | | | | |
| S5 | Aspheric | −34.8455 | 0.5313 | 1.55 | 56.1 | 8.31 | 99.0000 |
| S6 | Aspheric | −4.0363 | 0.0875 | | | | 0.0000 |

TABLE 9-continued

| Surface number | Surface type | Curvature radius | Thickness/ distance | Material Refractive index | Abbe number | Focal length | Conic coefficient |
|---|---|---|---|---|---|---|---|
| S7 | Aspheric | −721.3540 | 0.5719 | 1.55 | 56.1 | 5.99 | 0.0000 |
| S8 | Aspheric | −3.2553 | 0.1798 | | | | 2.8377 |
| S9 | Aspheric | −7.1170 | 0.2500 | 1.67 | 19.2 | −5.37 | −94.7580 |
| S10 | Aspheric | 7.5547 | 0.3038 | | | | −97.4390 |
| S11 | Aspheric | −5.5087 | 1.1133 | 1.55 | 56.1 | 1.91 | −50.8570 |
| S12 | Aspheric | −0.9410 | 0.0300 | | | | −4.4035 |
| S13 | Aspheric | 2.1824 | 0.5805 | 1.54 | 55.9 | −2.34 | −9.7172 |
| S14 | Aspheric | 0.7228 | 0.9162 | | | | −3.6263 |
| S15 | Spherical | Infinite | 0.2100 | 1.52 | 64.2 | | |
| S16 | Spherical | Infinite | 0.4861 | | | | |
| S17 | Spherical | Infinite | | | | | |

TABLE 10

| Surface number | A4 | A6 | A8 | A10 | A12 | A14 |
|---|---|---|---|---|---|---|
| S1 | 4.7436E−01 | −4.3995E−02 | 1.1286E−02 | −5.2243E−03 | 6.2486E−04 | −6.3789E−04 |
| S2 | 1.6349E−01 | −2.4507E−02 | 2.3530E−03 | −1.2169E−03 | 4.3099E−04 | −7.0242E−05 |
| S3 | −1.9233E−02 | −2.6487E−04 | 2.9152E−03 | 7.5122E−04 | 1.8835E−04 | 9.3262E−05 |
| S4 | 3.2318E−02 | 1.0159E−03 | 1.3731E−03 | 3.4643E−04 | 1.2902E−04 | 6.1269E−05 |
| S5 | −4.5790E−02 | −3.7815E−03 | −2.2448E−04 | 5.2806E−05 | 3.3663E−05 | 9.6952E−06 |
| S6 | −2.0557E−01 | 8.6556E−04 | 5.0566E−04 | 1.4974E−04 | 4.8242E−04 | −3.9735E−05 |
| S7 | −1.7505E−01 | 2.2137E−02 | 6.1897E−03 | 5.5199E−04 | 6.5357E−04 | −3.8230E−04 |
| S8 | −1.3152E−01 | −3.2137E−02 | 1.1618E−02 | 2.8993E−04 | 2.9683E−03 | 3.6262E−04 |
| S9 | −3.6632E−01 | 2.7790E−02 | 8.2754E−03 | −6.8416E−03 | 1.9134E−03 | −5.7129E−04 |
| S10 | −2.8882E−01 | 6.1361E−02 | 3.7913E−03 | −6.9229E−03 | 1.9944E−03 | −6.8963E−04 |
| S11 | −1.7770E−01 | 1.2789E−02 | 1.5899E−02 | −9.7794E−04 | −2.8127E−03 | 6.0162E−04 |
| S12 | −4.0223E−01 | 2.1005E−01 | −1.4743E−02 | 1.3869E−03 | −1.0785E−02 | 2.6103E−03 |
| S13 | −1.5943E+00 | 4.1750E−01 | −2.7103E−02 | −1.4032E−02 | −3.7127E−04 | −5.6934E−04 |
| S14 | −2.2663E+00 | 2.4921E−01 | −6.7971E−02 | 3.9703E−02 | −5.0357E−03 | 1.4470E−03 |

| Surface number | A16 | A18 | A20 | A22 | A24 |
|---|---|---|---|---|---|
| S1 | 8.2496E−05 | −6.2545E−05 | 2.8825E−05 | 0.0000E+00 | 0.0000E+00 |
| S2 | 2.6459E−06 | 4.0769E−06 | 6.0016E−06 | 0.0000E+00 | 0.0000E+00 |
| S3 | −8.8690E−06 | 7.3386E−06 | −5.5129E−07 | 0.0000E+00 | 0.0000E+00 |
| S4 | 1.9473E−05 | 6.5620E−06 | 1.5197E−06 | 0.0000E+00 | 0.0000E+00 |
| S5 | −2.0444E−06 | −1.1612E−06 | −1.2083E−06 | 0.0000E+00 | 0.0000E+00 |
| S6 | −8.9640E−06 | −4.6115E−05 | −9.3485E−06 | −1.1494E−05 | 2.7282E−07 |
| S7 | −7.8447E−05 | −1.1617E−05 | 2.4722E−05 | 0.0000E+00 | 0.0000E+00 |
| S8 | 6.1835E−05 | 2.9857E−05 | 2.3212E−05 | 0.0000E+00 | 0.0000E+00 |
| S9 | −4.3048E−04 | 1.4701E−04 | 9.6155E−05 | 0.0000E+00 | 0.0000E+00 |
| S10 | −1.4188E−04 | 3.2104E−04 | 3.4734E−05 | 0.0000E+00 | 0.0000E+00 |
| S11 | −3.0973E−04 | 5.1756E−05 | 1.5424E−04 | 0.0000E+00 | 0.0000E+00 |
| S12 | 7.1778E−04 | 3.6175E−04 | −3.8679E−04 | 0.0000E+00 | 0.0000E+00 |
| S13 | 8.0894E−04 | 6.9943E−04 | −9.1593E−04 | 0.0000E+00 | 0.0000E+00 |
| S14 | −1.2648E−03 | −4.7650E−05 | −2.8925E−04 | 0.0000E+00 | 0.0000E+00 |

Figure 10A:
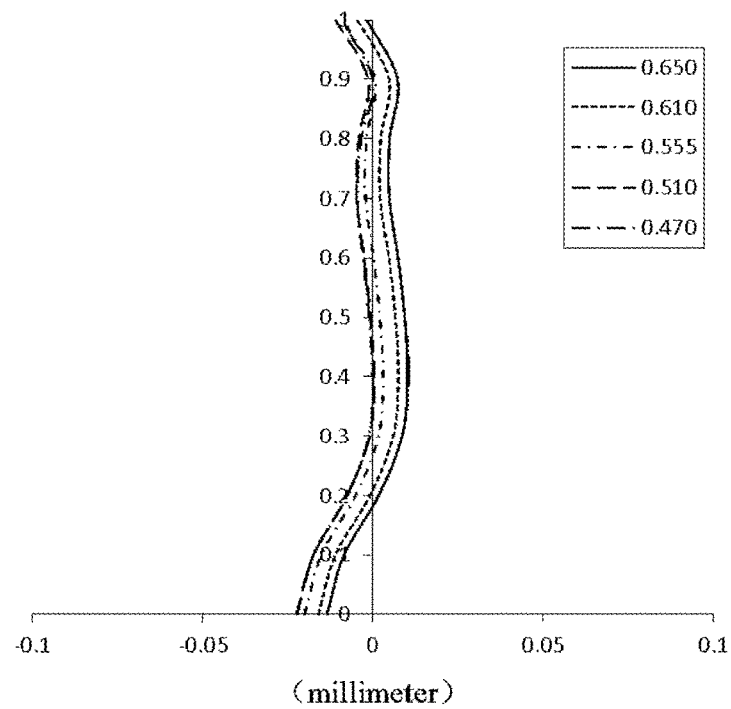
FIGS. 10A-10D show a longitudinal aberration curve, an astigmatism curve, a distortion curve and a lateral color curve of an optical imaging lens assembly according to Embodiment 5 respectively.
Figure 10B:
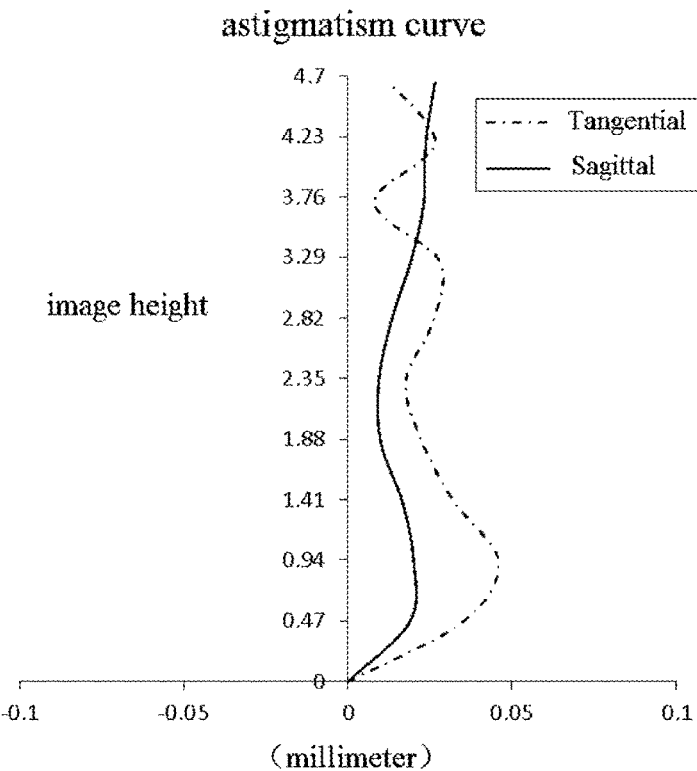
Figure 10C:
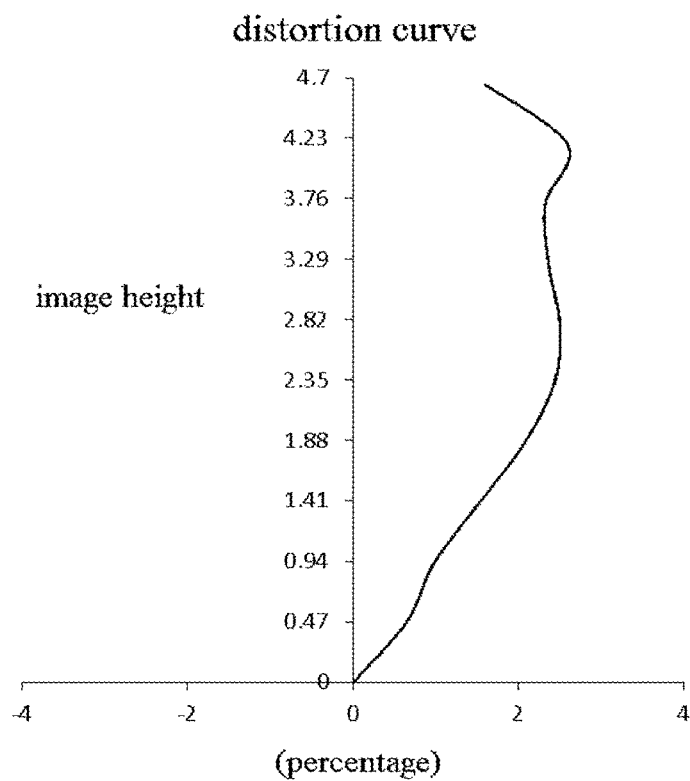
Figure 10D:
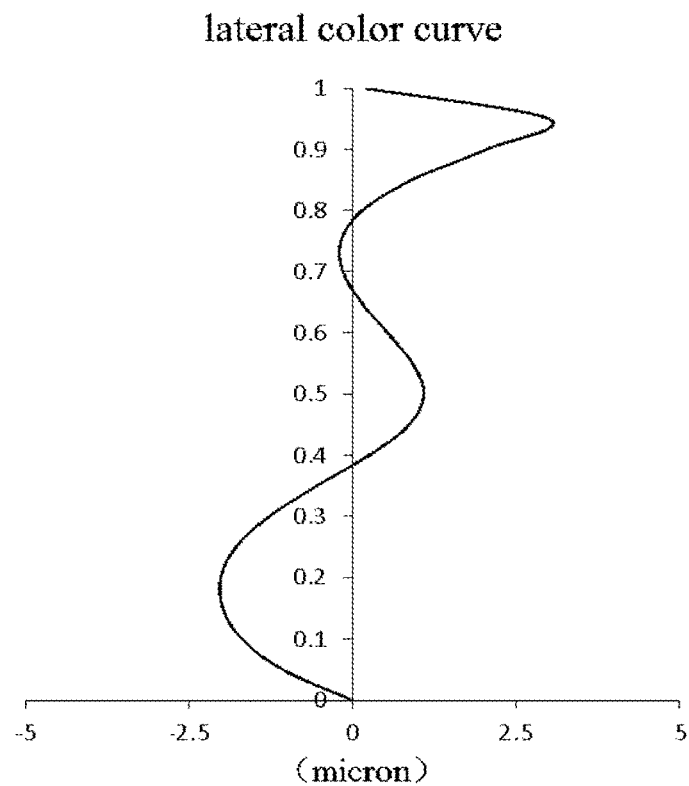

FIG. 10A shows a longitudinal aberration curve of the optical imaging lens assembly according to Embodiment 5 to represent deviation of a convergence focal point after light with different wavelengths passes through the lens. FIG. 10B shows an astigmatism curve of the optical imaging lens assembly according to Embodiment 5 to represent a curvature of tangential image surface and a curvature of sagittal image surface. FIG. 10C shows a distortion curve of the optical imaging lens assembly according to Embodiment 5 to represent distortion values corresponding to different image heights. FIG. 10D shows a lateral color curve of the optical imaging lens assembly according to Embodiment 5 to represent deviation of different image heights on the imaging surface after the light passes through the lens. According to FIGS. 10A-10D, it can be seen that the optical imaging lens assembly provided in Embodiment 5 may achieve good imaging quality.

Embodiment 6

Figure 11:
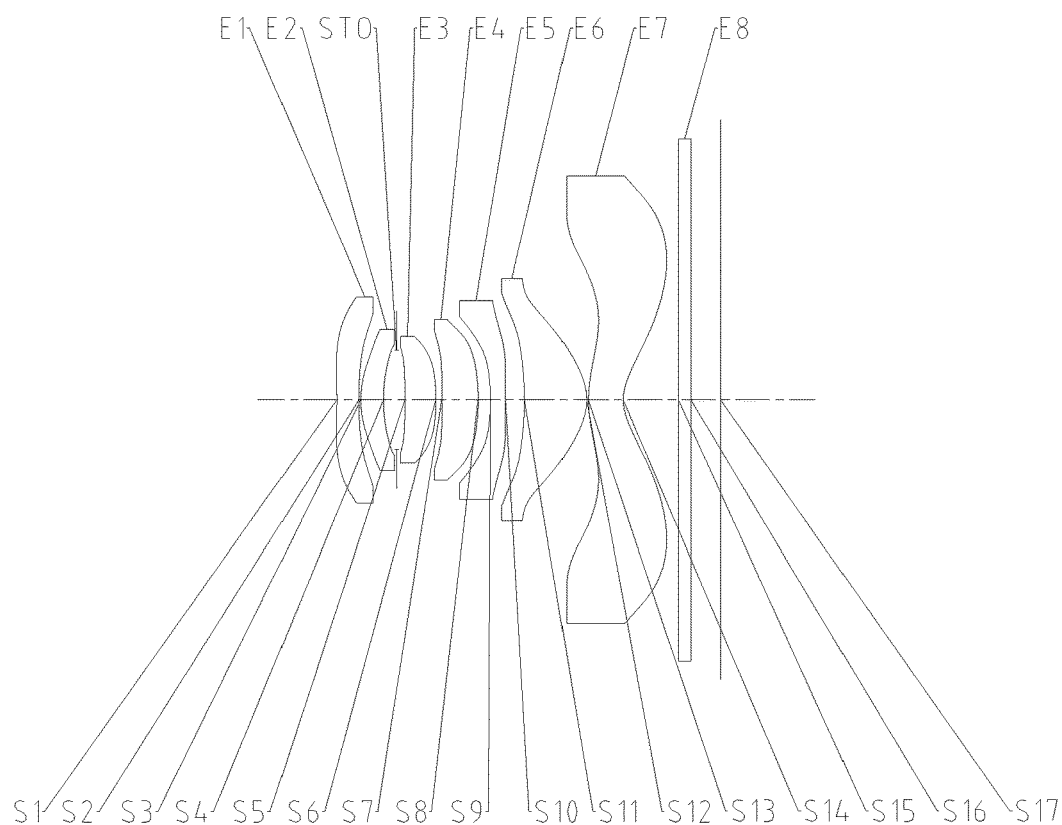
FIG. 11 shows a structural schematic diagram of an optical imaging lens assembly according to Embodiment 6 of the disclosure.

An optical imaging lens assembly according to Embodiment 6 of the disclosure is described below with reference to FIGS. 11-12D. FIG. 11 is a structural schematic diagram of an optical imaging lens assembly according to Embodiment 6 of the disclosure.

As shown in FIG. 11, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, a seventh lens E7 and an optical filter E8.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a convex surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In Embodiment 6, a value of a total effective focal length f of the optical imaging lens assembly is 3.24 mm, a value of an on-axis distance TTL from the object-side surface S1 of the first lens E1 to the imaging surface S17 is 6.40 mm, ImgH is a half the diagonal length of an effective pixel region on the imaging surface S17, and a value of ImgH is 4.65 mm, and a value of a maximum field of view FOV is 109.2°.

Table 11 shows a basic parameter table of the optical imaging lens assembly of Embodiment 6, and the units of the curvature radius, the thickness/distance and the focal length are all millimeters (mm). Table 12 shows high-order coefficients applied to each aspheric mirror surface in Embodiment 6. A surface type of each aspheric surface may be defined by the formula (1) given in Embodiment 1.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −6.9304 | 0.3706 | 1.55 | 56.1 | −7.74 | −84.8984 |
| S2 | Aspheric | 11.0459 | 0.0300 | | | | −41.4745 |
| S3 | Aspheric | 1.5594 | 0.3770 | 1.55 | 56.1 | 6.55 | −4.2157 |
| S4 | Aspheric | 2.5292 | 0.2199 | | | | −13.0120 |
| STO | Spherical | Infinite | 0.1359 | | | | |
| S5 | Aspheric | −33.8520 | 0.5179 | 1.55 | 56.1 | 9.77 | 99.0000 |
| S6 | Aspheric | −4.6336 | 0.0993 | | | | 0.0000 |
| S7 | Aspheric | 19.0306 | 0.6097 | 1.55 | 56.1 | 5.21 | 0.0000 |
| S8 | Aspheric | −3.3058 | 0.2052 | | | | 2.9405 |
| S9 | Aspheric | −3.4439 | 0.2500 | 1.67 | 19.2 | −5.14 | −40.4444 |
| S10 | Aspheric | −317.8036 | 0.3162 | | | | −97.4390 |
| S11 | Aspheric | −5.1974 | 1.0287 | 1.55 | 56.1 | 1.95 | −41.9891 |
| S12 | Aspheric | −0.9470 | 0.0300 | | | | −4.3475 |
| S13 | Aspheric | 2.1132 | 0.5802 | 1.54 | 55.9 | −2.43 | −9.2826 |
| S14 | Aspheric | 0.7287 | 0.9243 | | | | −3.5877 |
| S15 | Spherical | Infinite | 0.2100 | 1.52 | 64.2 | | |
| S16 | Spherical | Infinite | 0.4950 | | | | |
| S17 | Spherical | Infinite | | | | | |

TABLE 12

| Surface number | A4 | A6 | A8 | A10 | A12 | A14 |
|---|---|---|---|---|---|---|
| S1 | 4.7200E−01 | −4.4118E−02 | 1.1502E−02 | −4.9592E−03 | 7.3753E−04 | −6.2198E−04 |
| S2 | 1.6368E−01 | −2.4257E−02 | 2.4259E−03 | −1.0947E−03 | 3.4114E−04 | −1.0924E−04 |
| S3 | −1.7036E−02 | 5.6288E−04 | 2.6786E−04 | 7.6212E−04 | 1.2182E−04 | 5.8090E−05 |
| S4 | 3.3776E−02 | 1.4784E−03 | 1.4000E−03 | 3.6013E−04 | 1.2377E−04 | 5.3984E−05 |
| S5 | −4.4655E−02 | −3.3163E−03 | −1.2749E−04 | 7.7510E−05 | 3.6357E−05 | 1.0465E−05 |
| S6 | −2.0793E−01 | 1.4199E−03 | 3.3792E−05 | 7.7237E−05 | 3.2661E−04 | −4.5189E−05 |
| S7 | −1.8679E−01 | 2.1156E−02 | 4.5677E−03 | 4.7971E−04 | 5.5495E−04 | −2.4102E−04 |
| S8 | −1.4357E−01 | −2.8759E−02 | 1.1110E−02 | −1.7190E−02 | 2.5945E−03 | 3.5023E−04 |
| S9 | −3.6937E−01 | 3.1613E−02 | 9.3852E−03 | −6.4804E−03 | 2.0835E−03 | −1.1105E−04 |
| S10 | −2.6946E−01 | 5.8035E−02 | 7.5263E−03 | −9.7713E−03 | 3.8705E−03 | −5.4078E−04 |
| S11 | −2.0847E−01 | 6.1447E−03 | 1.7806E−02 | −1.2307E−03 | −3.6298E−03 | 1.0095E−03 |
| S12 | −3.9957E−01 | 2.0827E−01 | −1.2442E−01 | −4.9971E−05 | −1.2649E−02 | 3.3725E−03 |
| S13 | −1.6116E+00 | 4.1506E−01 | −2.2585E−02 | −1.8773E−02 | −2.4025E−03 | −2.7414E−03 |
| S14 | −2.2206E+00 | 2.3102E−01 | −6.5886E−02 | 3.8932E−02 | −2.6190E−03 | 6.2867E−04 |

| Surface number | A16 | A18 | A20 | A22 | A24 |
|---|---|---|---|---|---|
| S1 | 6.4630E−05 | −7.7441E−05 | 2.6593E−05 | 0.0000E+00 | 0.0000E+00 |
| S2 | −2.5735E−05 | 9.9568E−06 | 1.5158E−05 | 0.0000E+00 | 0.0000E+00 |
| S3 | −2.9232E−05 | 2.2003E−06 | 5.3478E−06 | 0.0000E+00 | 0.0000E+00 |
| S4 | 1.3690E−05 | 3.5091E−06 | 3.5167E−07 | 0.0000E+00 | 0.0000E+00 |
| S5 | −2.6728E−06 | −1.7619E−07 | −1.0821E−06 | 0.0000E+00 | 0.0000E+00 |
| S6 | −1.7309E−05 | −4.0103E−05 | −4.2704E−06 | −8.5836E−06 | 3.0843E−06 |
| S7 | −8.3551E−05 | −1.8142E−05 | 2.1279E−05 | 0.0000E+00 | 0.0000E+00 |
| S8 | −6.4543E−05 | −1.9380E−05 | 2.3397E−06 | 0.0000E+00 | 0.0000E+00 |

TABLE 12-continued

| | | | | |
|---|---|---|---|---|
| S9  | −6.0300E−04 | 9.7210E−05  | 8.0317E−05  | 0.0000E+00 | 0.0000E+00 |
| S10 | 9.5085E−05  | 5.9314E−04  | 2.6871E−05  | 0.0000E+00 | 0.0000E+00 |
| S11 | −2.8872E−04 | 3.3789E−05  | 1.0528E−04  | 0.0000E+00 | 0.0000E+00 |
| S12 | 1.1631E−03  | 2.0636E−04  | −4.5538E−04 | 0.0000E+00 | 0.0000E+00 |
| S13 | 1.4181E−03  | −2.2406E−04 | −1.8228E−03 | 0.0000E+00 | 0.0000E+00 |
| S14 | −1.0351E−03 | −2.3798E−04 | −2.6849E−04 | 0.0000E+00 | 0.0000E+00 |

Figure 12A:
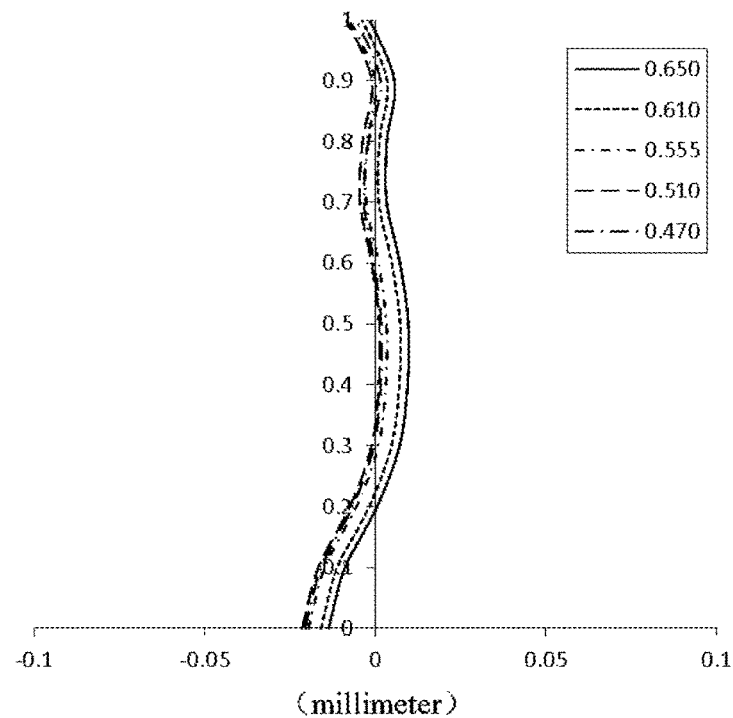
FIGS. 12A-12D show a longitudinal aberration curve, an astigmatism curve, a distortion curve and a lateral color curve of an optical imaging lens assembly according to Embodiment 6 respectively.
Figure 12B:
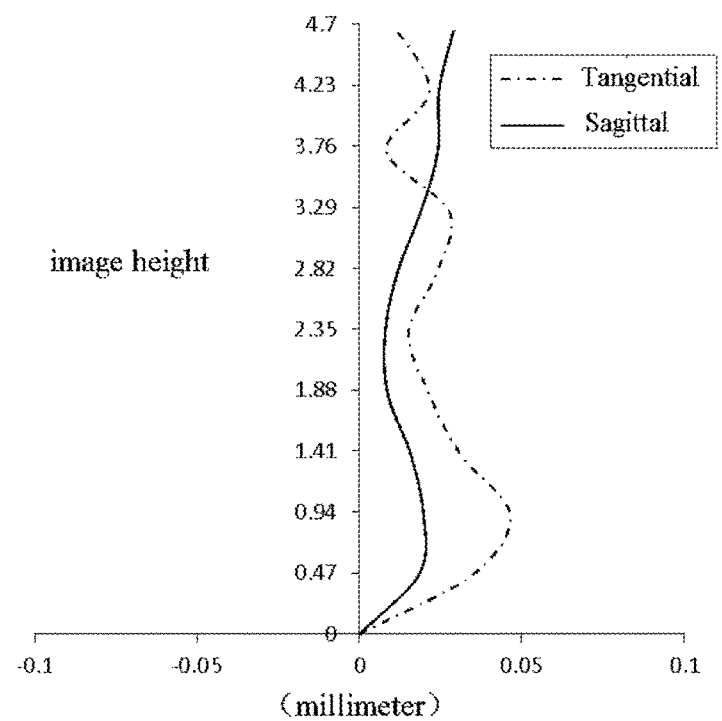
Figure 12C:
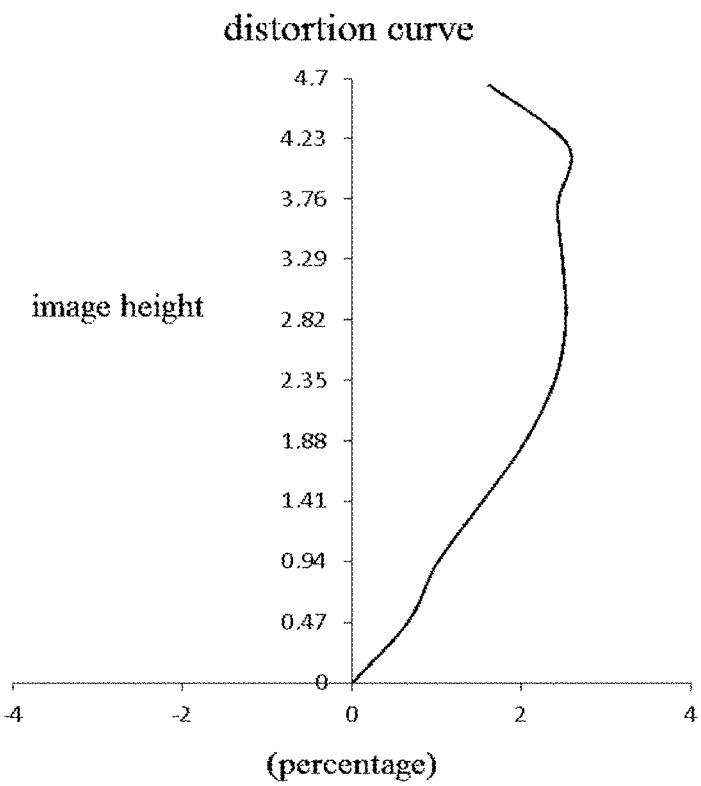
Figure 12D:
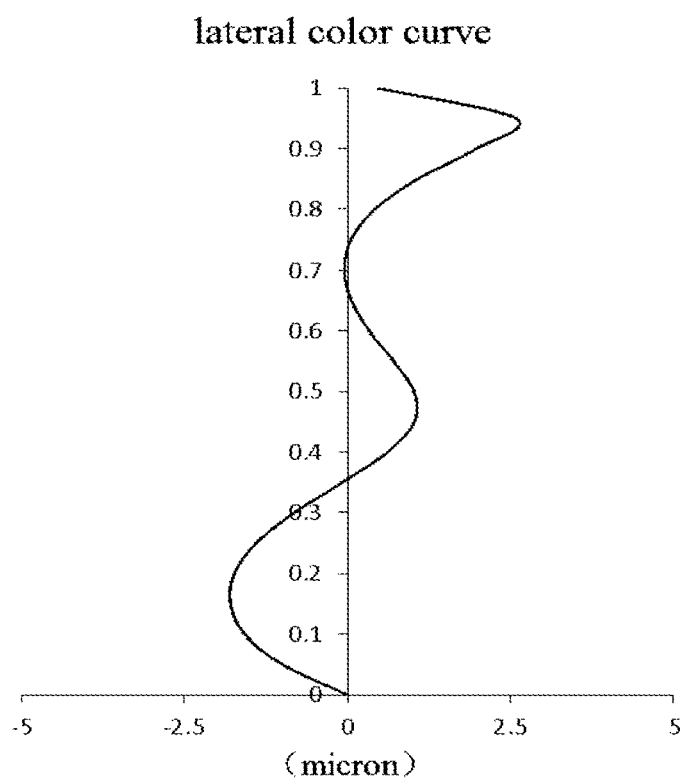

FIG. 12A shows a longitudinal aberration curve of the optical imaging lens assembly according to Embodiment 6 to represent deviation of a convergence focal point after light with different wavelengths passes through the lens. FIG. 12B shows an astigmatism curve of the optical imaging lens assembly according to Embodiment 6 to represent a curvature of tangential image surface and a curvature of sagittal image surface. FIG. 12C shows a distortion curve of the optical imaging lens assembly according to Embodiment 6 to represent distortion values corresponding to different image heights. FIG. 12D shows a lateral color curve of the optical imaging lens assembly according to Embodiment 6 to represent deviation of different image heights on the imaging surface after the light passes through the lens. According to FIGS. 12A-12D, it can be seen that the optical imaging lens assembly provided in Embodiment 6 may achieve good imaging quality.

Embodiment 7

Figure 13:
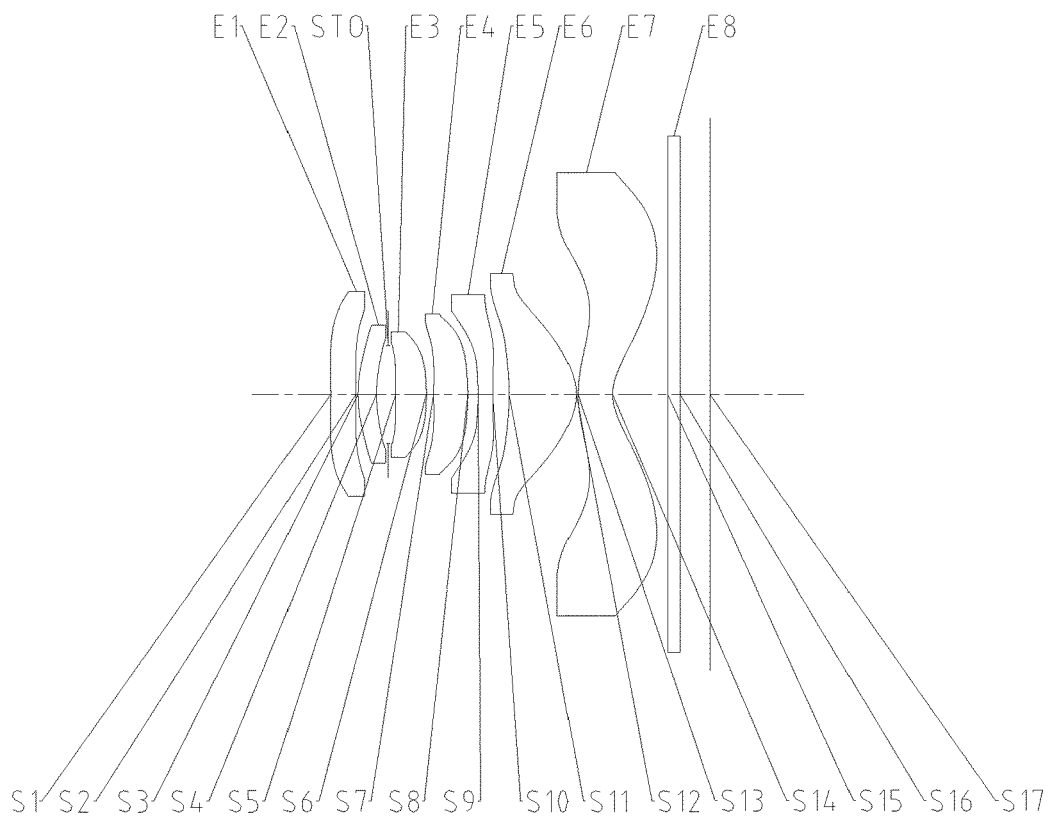
FIG. 13 shows a structural schematic diagram of an optical imaging lens assembly according to Embodiment 7 of the disclosure.

An optical imaging lens assembly according to Embodiment 7 of the disclosure is described below with reference to FIGS. 13-14D. FIG. 13 shows a structural schematic diagram of an optical imaging lens assembly according to Embodiment 7 of the disclosure.

As shown in FIG. 13, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, a seventh lens E7 and an optical filter E8.

The first lens E1 has a positive refractive power, an object-side surface S1 thereof is a concave surface, and an image-side surface S2 thereof is a convex surface. The second lens E2 has a positive refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In Embodiment 7, a value of a total effective focal length f of the optical imaging lens assembly is 3.25 mm, a value of an on-axis distance TTL from the object-side surface S1 of the first lens E1 to the imaging surface S17 is 6.40 mm, ImgH is a half the diagonal length of an effective pixel region on the imaging surface S17, and a value of ImgH is 4.65 mm, and a value of a maximum field of view FOV is 109.2°.

Table 13 shows a basic parameter table of the optical imaging lens assembly of Embodiment 7, and the units of the curvature radius, the thickness/distance and the focal length are all millimeters (mm). Table 14 shows high-order coefficients applied to each aspheric mirror surface in Embodiment 7. A surface type of each aspheric surface may be defined by the formula (1) given in Embodiment 1.

TABLE 13

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1  | Aspheric | −11.1986 | 0.4249 | 1.55 | 56.1 | 210.86 | −13.8576 |
| S2  | Aspheric | −10.3425 | 0.0360 | | | | −97.5103 |
| S3  | Aspheric | 2.3197 | 0.3116 | 1.55 | 56.1 | 46.34 | −4.4341 |
| S4  | Aspheric | 2.4328 | 0.2003 | | | | −18.4202 |
| STO | Spherical | Infinite | 0.1275 | | | | |
| S5  | Aspheric | −28.0522 | 0.5148 | 1.55 | 56.1 | 9.42 | 99.0000 |
| S6  | Aspheric | −4.3736 | 0.1240 | | | | 0.0000 |
| S7  | Aspheric | 18.8073 | 0.5779 | 1.55 | 56.1 | 5.83 | 0.0000 |
| S8  | Aspheric | −3.7897 | 0.1695 | | | | 3.5799 |
| S9  | Aspheric | −5.9267 | 0.2500 | 1.67 | 19.2 | −5.10 | −93.2089 |
| S10 | Aspheric | 8.4134 | 0.2780 | | | | −97.4390 |
| S11 | Aspheric | −4.8362 | 1.1255 | 1.55 | 56.1 | 1.89 | −44.4065 |
| S12 | Aspheric | −0.9201 | 0.0300 | | | | −4.4865 |
| S13 | Aspheric | 2.0887 | 0.5803 | 1.54 | 55.9 | −2.42 | −7.4434 |
| S14 | Aspheric | 0.7236 | 0.9350 | | | | −3.6375 |
| S15 | Spherical | Infinite | 0.2100 | 1.52 | 64.2 | | |
| S16 | Spherical | Infinite | 0.5049 | | | | |
| S17 | Spherical | Infinite | | | | | |

TABLE 14

| Surface number | A4 | A6 | A8 | A10 | A12 | A14 |
|---|---|---|---|---|---|---|
| S1 | 4.2491E−01 | −2.5291E−02 | 8.7183E−03 | −2.9223E−03 | 2.6215E−05 | −4.4792E−04 |
| S2 | 2.2708E−01 | −2.6014E−01 | 6.7701E−03 | −3.4273E−03 | 1.0558E−03 | −5.8356E−04 |
| S3 | −2.1232E−02 | −1.3608E−04 | 4.0119E−03 | −8.3064E−04 | 5.8263E−04 | −1.4240E−04 |
| S4 | 2.0118E−02 | 1.4213E−04 | 1.3387E−03 | 1.0441E−04 | 1.0371E−04 | 2.4963E−05 |
| S5 | −5.0094E−02 | −3.6872E−03 | −3.0858E−04 | −1.2872E−05 | −3.1580E−06 | −3.6594E−06 |
| S6 | −1.9845E−01 | 6.3578E−04 | −1.3532E−04 | −1.2946E−04 | 2.4929E−04 | −3.0121E−05 |
| S7 | −2.0218E−01 | 2.0693E−02 | 5.9790E−03 | 7.0711E−04 | 8.7669E−04 | −1.7954E−04 |
| S8 | −1.5873E−01 | −3.7880E−02 | 1.3546E−02 | −4.7330E−04 | 3.4587E−03 | 6.6324E−04 |
| S9 | −3.7287E−01 | 3.6601E−02 | 1.1153E−02 | −6.6028E−03 | 2.6331E−03 | −3.1082E−04 |
| S10 | −3.0372E−01 | 6.4887E−02 | 6.3760E−03 | −7.0423E−03 | 2.4893E−03 | −4.7505E−04 |
| S11 | −1.6630E−01 | 2.6808E−02 | 1.5608E−02 | −5.5586E−03 | −3.6220E−03 | 1.5455E−03 |
| S12 | −4.2421E−01 | 2.3670E−01 | −1.7661E−02 | −4.3065E−03 | −1.3712E−02 | 4.1280E−03 |
| S13 | −1.5781E+00 | 3.4091E−01 | 1.0473E−02 | −1.8928E−02 | −1.0007E−03 | −2.1315E−03 |
| S14 | −2.1744E+00 | 2.0401E−01 | −4.6434E−02 | 3.0294E−02 | 1.3865E−03 | −2.4772E−03 |

| Surface number | A16 | A18 | A20 | A22 | A24 |
|---|---|---|---|---|---|
| S1 | −1.8117E−04 | −1.0407E−04 | −4.8962E−05 | 0.0000E+00 | 0.0000E+00 |
| S2 | 1.1877E−04 | −1.0122E−04 | 4.1404E−05 | 0.0000E+00 | 0.0000E+00 |
| S3 | 1.1242E−05 | −2.8560E−05 | −1.6792E−06 | 0.0000E+00 | 0.0000E+00 |
| S4 | −9.0692E−06 | −8.0075E−06 | −7.2411E−06 | 0.0000E+00 | 0.0000E+00 |
| S5 | −6.6228E−06 | −2.7321E−06 | −1.2824E−06 | 0.0000E+00 | 0.0000E+00 |
| S6 | −1.0748E−07 | −2.5029E−05 | 2.6334E−06 | −6.6294E−06 | 4.1188E−06 |
| S7 | −1.1635E−04 | −4.0300E−05 | 2.2604E−05 | 0.0000E+00 | 0.0000E+00 |
| S8 | 1.2542E−04 | −7.2647E−06 | 1.9222E−05 | 0.0000E+00 | 0.0000E+00 |
| S9 | −5.3609E−04 | 5.3095E−05 | 7.7832E−05 | 0.0000E+00 | 0.0000E+00 |
| S10 | −3.1956E−04 | 2.7190E−04 | 3.8787E−05 | 0.0000E+00 | 0.0000E+00 |
| S11 | −3.3080E−04 | 1.3550E−04 | 1.6057E−04 | 0.0000E+00 | 0.0000E+00 |
| S12 | 1.2846E−03 | 4.5079E−04 | −5.5134E−04 | 0.0000E+00 | 0.0000E+00 |
| S13 | 1.8423E−03 | 1.1469E−03 | −1.0490E−03 | 0.0000E+00 | 0.0000E+00 |
| S14 | 1.3069E−04 | −1.0275E−03 | −2.5593E−04 | 0.0000E+00 | 0.0000E+00 |

Figure 14A:
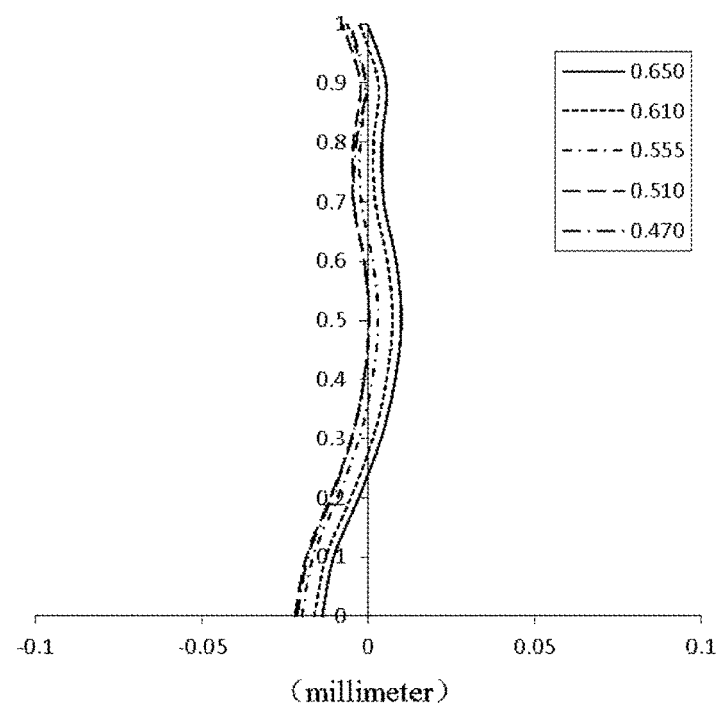
FIGS. 14A-14D show a longitudinal aberration curve, an astigmatism curve, a distortion curve and a lateral color curve of an optical imaging lens assembly according to Embodiment 7 respectively.
Figure 14B:
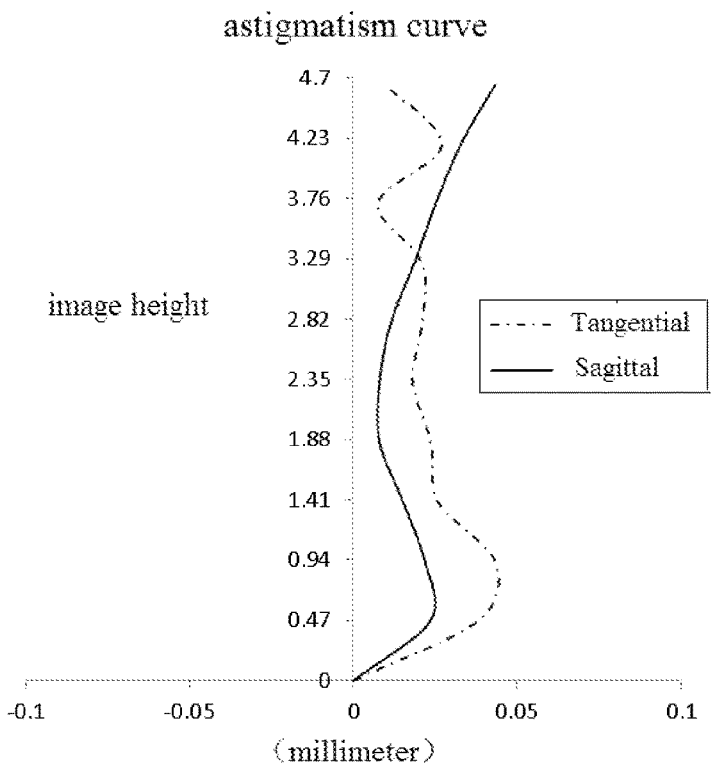
Figure 14C:
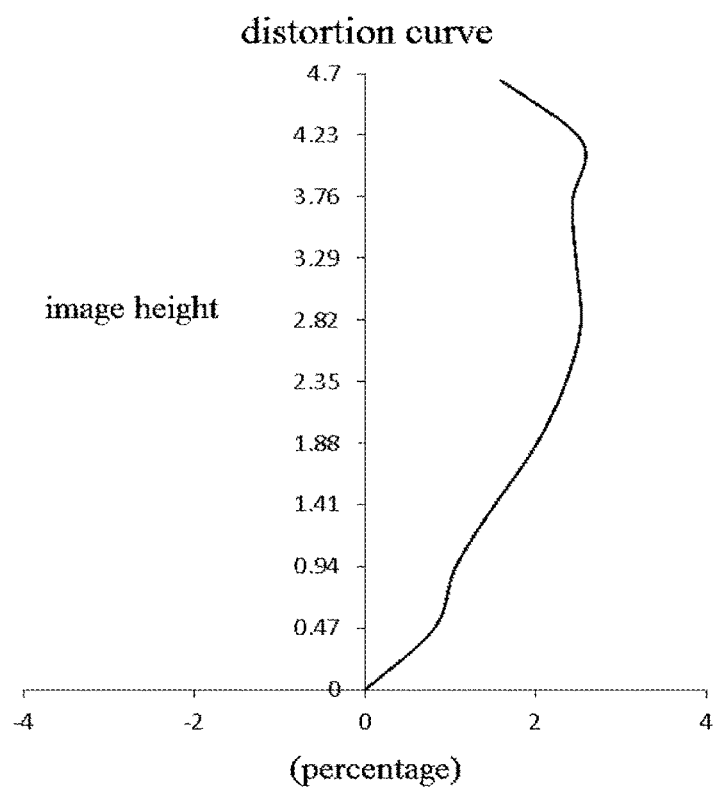
Figure 14D:
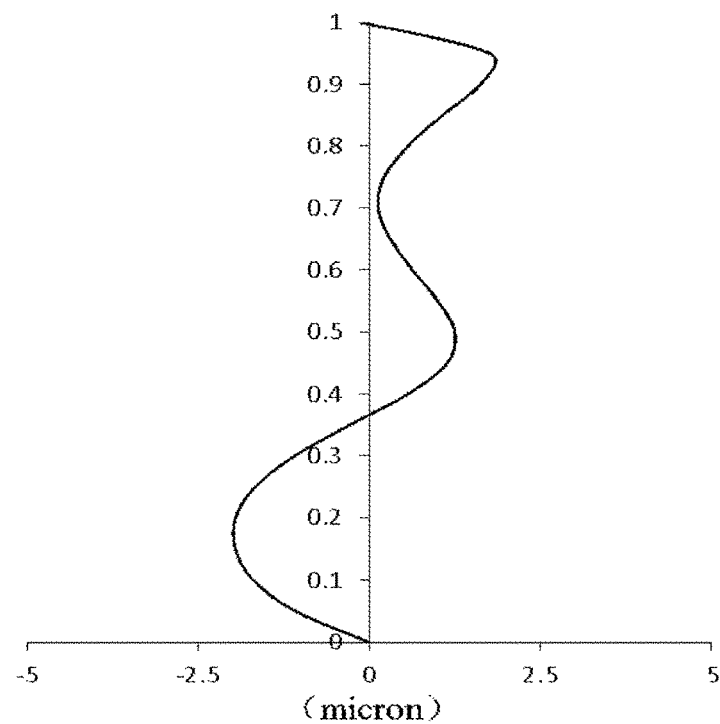

FIG. 14A shows a longitudinal aberration curve of the optical imaging lens assembly according to Embodiment 7 to represent deviation of a convergence focal point after light with different wavelengths passes through the lens. FIG. 14B shows an astigmatism curve of the optical imaging lens assembly according to Embodiment 7 to represent a curvature of tangential image surface and a curvature of sagittal image surface. FIG. 14C shows a distortion curve of the optical imaging lens assembly according to Embodiment 7 to represent distortion values corresponding to different image heights. FIG. 14D shows a lateral color curve of the optical imaging lens assembly according to Embodiment 7 to represent deviation of different image heights on the imaging surface after the light passes through the lens. According to FIGS. 14A-14D, it can be seen that the optical imaging lens assembly provided in Embodiment 7 may achieve good imaging quality.

Embodiment 8

Figure 15:
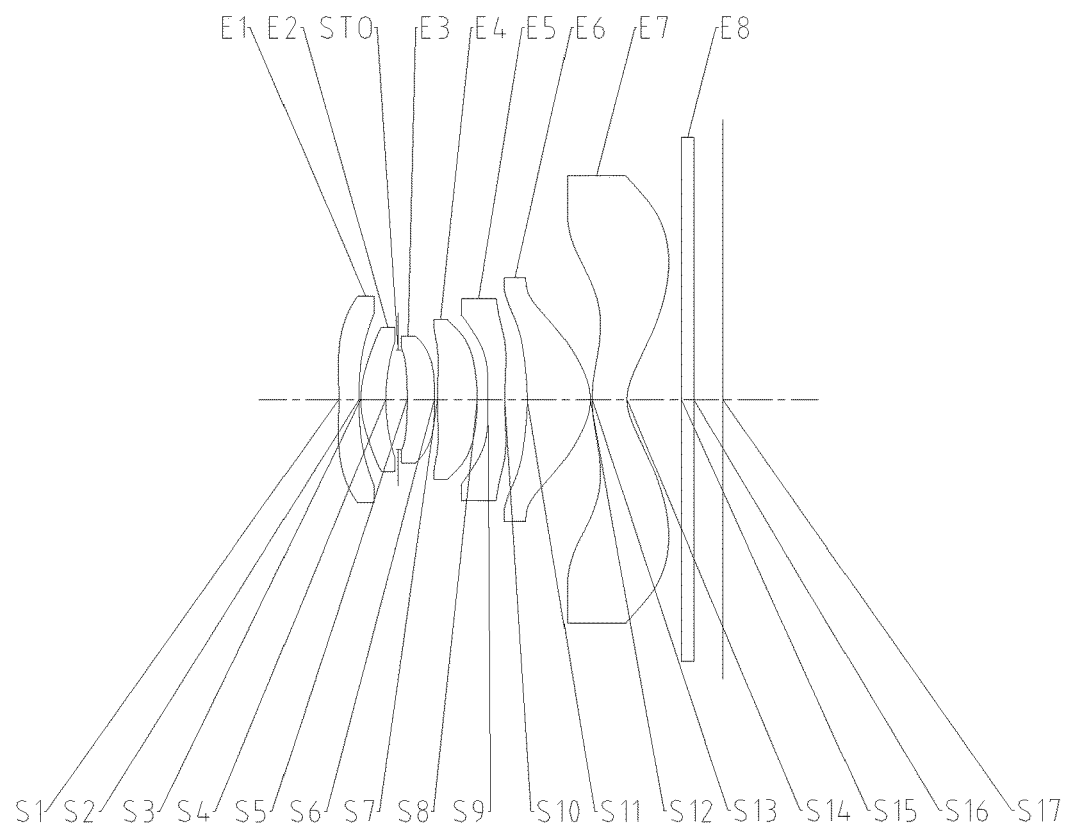
FIG. 15 shows a structural schematic diagram of an optical imaging lens assembly according to Embodiment 8 of the disclosure.

An optical imaging lens assembly according to Embodiment 8 of the disclosure is described below with reference to FIGS. 15-16D. FIG. 15 shows a structural schematic diagram of an optical imaging lens assembly according to Embodiment 8 of the disclosure.

As shown in FIG. 15, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, a seventh lens E7 and an optical filter E8.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a negative refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In Embodiment 8, a value of a total effective focal length f of the optical imaging lens assembly is 3.26 mm, a value of an on-axis distance TTL from the object-side surface S1 of the first lens E1 to the imaging surface S17 is 6.40 mm, ImgH is a half the diagonal length of an effective pixel region on the imaging surface S17, and a value of ImgH is 4.65 mm, and a value of a maximum field of view FOV is 109.0°.

Table 15 shows a basic parameter table of the optical imaging lens assembly of Embodiment 8, and the units of the curvature radius, the thickness/distance and the focal length are all millimeters (mm). Table 16 shows high-order coefficients applied to each aspheric mirror surface in Embodiment 8. A surface type of each aspheric surface may be defined by the formula (1) given in Embodiment 1.

TABLE 15

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −6.5014 | 0.3372 | 1.55 | 56.1 | −6.97 | −99.0000 |
| S2 | Aspheric | 9.3584 | 0.0300 | | | | −41.1278 |
| S3 | Aspheric | 1.5908 | 0.4185 | 1.55 | 56.1 | 5.48 | −4.0029 |
| S4 | Aspheric | 3.0805 | 0.2033 | | | | −16.7267 |
| STO | Spherical | Infinite | 0.1520 | | | | |
| S5 | Aspheric | −11.4936 | 0.4542 | 1.55 | 56.1 | −62.94 | 99.0000 |
| S6 | Aspheric | −17.5113 | 0.0485 | | | | 0.0000 |
| S7 | Aspheric | 5.0480 | 0.6675 | 1.55 | 56.1 | 3.67 | 0.0000 |
| S8 | Aspheric | −3.1603 | 0.1813 | | | | 2.4791 |
| S9 | Aspheric | −12.9491 | 0.2771 | 1.67 | 19.2 | −6.08 | −27.5705 |
| S10 | Aspheric | 6.0991 | 0.3748 | | | | −97.4390 |
| S11 | Aspheric | −4.4864 | 1.0431 | 1.55 | 56.1 | 1.96 | −37.6566 |
| S12 | Aspheric | −0.9332 | 0.0300 | | | | −4.3030 |
| S13 | Aspheric | 2.2046 | 0.5812 | 1.54 | 55.9 | −2.35 | −10.8471 |
| S14 | Aspheric | 0.7282 | 0.9107 | | | | −3.6730 |
| S15 | Spherical | Infinite | 0.2100 | 1.52 | 64.2 | | |
| S16 | Spherical | Infinite | 0.4806 | | | | |
| S17 | Spherical | Infinite | | | | | |

TABLE 16

| Surface number | A4 | A6 | A8 | A10 | A12 | A14 |
|---|---|---|---|---|---|---|
| S1 | 4.4866E−01 | −4.7093E−02 | 1.2954E−02 | −3.8798E−03 | 1.3362E−03 | −5.6832E−04 |
| S2 | 1.6729E−01 | −2.4025E−02 | 4.9722E−03 | −8.9668E−04 | 3.9417E−04 | −3.8330E−04 |
| S3 | −1.0419E−02 | 3.6720E−03 | 1.7064E−03 | 3.9082E−04 | −3.6749E−05 | −8.8259E−05 |
| S4 | 2.7782E−02 | 2.6858E−04 | 3.7268E−04 | −5.2511E−05 | −4.1510E−05 | −2.0002E−05 |
| S5 | −4.8566E−02 | −3.4491E−03 | −4.6635E−04 | −6.0239E−05 | −2.8365E−05 | −7.0098E−06 |
| S6 | −2.5571E−01 | 8.9537E−03 | −1.1052E−03 | −2.9496E−04 | 2.1410E−04 | −1.7808E−04 |
| S7 | −2.2382E−01 | 2.5355E−02 | 1.8179E−03 | 8.8419E−04 | 5.8811E−04 | −3.7451E−04 |
| S8 | −1.2169E−01 | −3.0537E−02 | 1.1423E−02 | 6.2249E−04 | 2.4872E−03 | 2.7216E−04 |
| S9 | −3.9136E−01 | 3.8783E−02 | 1.1398E−02 | −7.7227E−03 | 1.1910E−03 | −2.9848E−04 |
| S10 | −3.1777E−01 | 6.3204E−02 | 6.9779E−03 | −9.1834E−03 | 1.4166E−03 | −3.4358E−04 |
| S11 | −2.0323E−01 | 1.4047E−02 | 1.9905E−02 | −8.5712E−04 | −5.4135E−03 | 5.3441E−04 |
| S12 | −4.0915E−01 | 2.2879E−01 | −1.5736E−02 | −1.3150E−04 | −1.3055E−02 | 2.8236E−03 |
| S13 | −1.5303E+00 | 3.9572E−01 | −2.4158E−02 | −1.2827E−02 | −2.6552E−04 | −1.0441E−03 |
| S14 | −2.2613E+00 | 2.4975E−01 | −7.1101E−02 | 4.0669E−02 | −4.4921E−03 | 2.0006E−03 |

| Surface number | A16 | A18 | A20 | A22 | A24 |
|---|---|---|---|---|---|
| S1 | 2.9872E−05 | −1.0677E−04 | 2.1714E−05 | 0.0000E+00 | 0.0000E+00 |
| S2 | −9.5534E−05 | 7.3562E−06 | 3.2300E−05 | 0.0000E+00 | 0.0000E+00 |
| S3 | −1.1096E−04 | −1.5608E−05 | 8.1215E−06 | 0.0000E+00 | 0.0000E+00 |
| S4 | −2.2568E−05 | −6.8388E−06 | −2.0314E−06 | 0.0000E+00 | 0.0000E+00 |
| S5 | −1.5831E−05 | −1.8915E−06 | −3.6171E−06 | 0.0000E+00 | 0.0000E+00 |
| S6 | −6.3058E−05 | −5.9905E−05 | 6.7589E−07 | −5.9301E−06 | 3.0752E−06 |
| S7 | −9.0786E−05 | −1.0776E−05 | 3.0121E−05 | 0.0000E+00 | 0.0000E+00 |
| S8 | −1.8098E−04 | −8.1302E−05 | −2.0856E−05 | 0.0000E+00 | 0.0000E+00 |
| S9 | −5.4633E−04 | 7.7020E−05 | 1.0681E−04 | 0.0000E+00 | 0.0000E+00 |
| S10 | −5.7333E−05 | 3.4631E−04 | 6.8231E−05 | 0.0000E+00 | 0.0000E+00 |
| S11 | 6.0022E−05 | 1.8964E−04 | 2.3043E−04 | 0.0000E+00 | 0.0000E+00 |
| S12 | 1.2050E−03 | 3.8564E−04 | −5.1348E−04 | 0.0000E+00 | 0.0000E+00 |
| S13 | 1.0726E−03 | 9.1518E−04 | −8.7369E−04 | 0.0000E+00 | 0.0000E+00 |
| S14 | −1.2366E−03 | −3.1599E−04 | −5.1476E−04 | 0.0000E+00 | 0.0000E+00 |

Figure 16A:
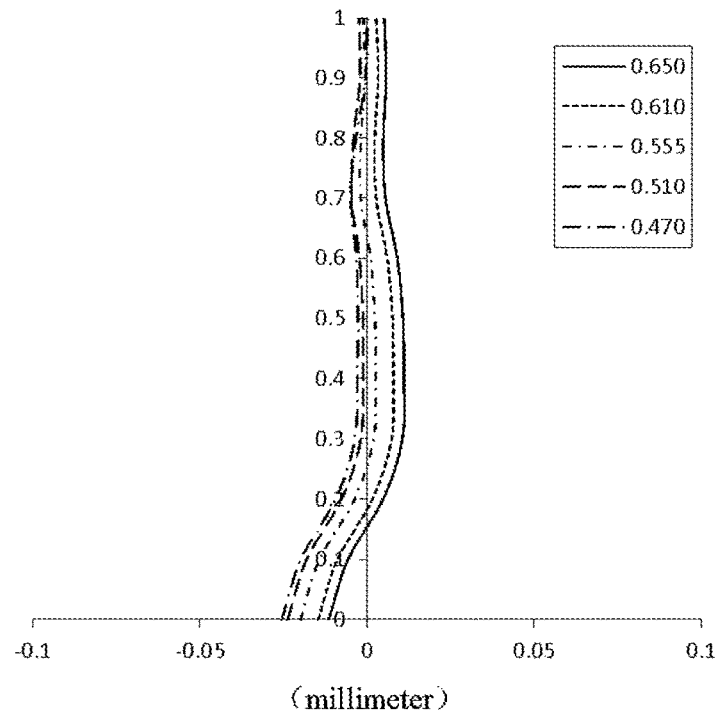
FIGS. 16A-16D show a longitudinal aberration curve, an astigmatism curve, a distortion curve and a lateral color curve of an optical imaging lens assembly according to Embodiment 8 respectively.
Figure 16B:
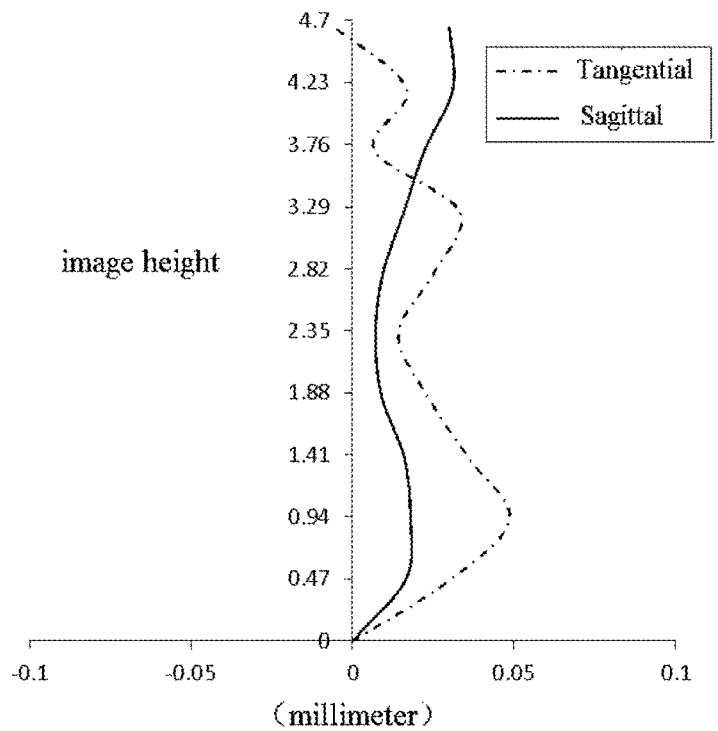
Figure 16C:
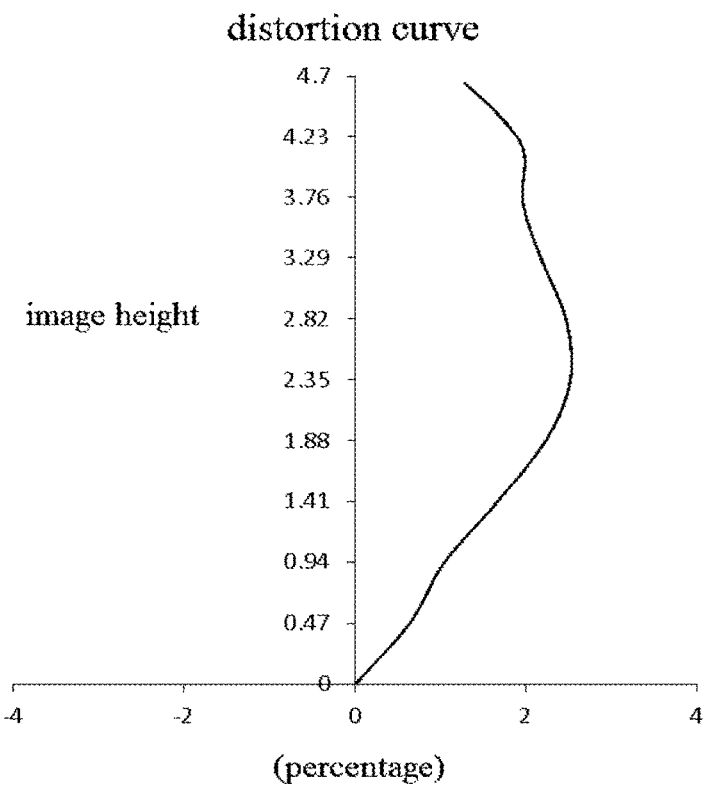
Figure 16D:
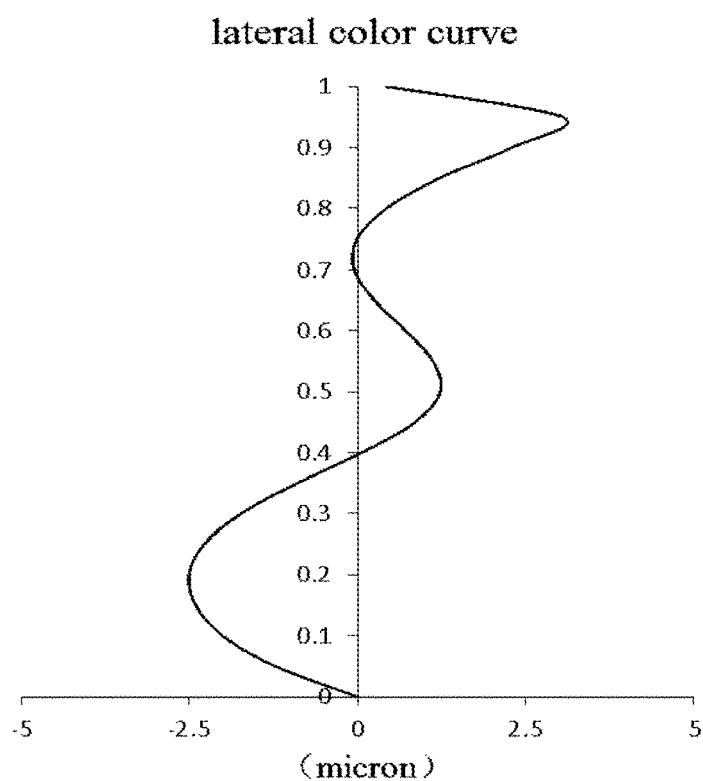

FIG. 16A shows a longitudinal aberration curve of the optical imaging lens assembly according to Embodiment 8 to represent deviation of a convergence focal point after light with different wavelengths passes through the lens. FIG. 16B shows an astigmatism curve of the optical imaging lens assembly according to Embodiment 8 to represent a curvature of tangential image surface and a curvature of sagittal image surface. FIG. 16C shows a distortion curve of the optical imaging lens assembly according to Embodiment 8 to represent distortion values corresponding to different image heights. FIG. 16D shows a lateral color curve of the optical imaging lens assembly according to Embodiment 8 to represent deviation of different image heights on the imaging surface after the light passes through the lens. According to FIGS. 16A-16D, it can be seen that the optical imaging lens assembly provided in Embodiment 8 may achieve good imaging quality.

Embodiment 9

Figure 17:
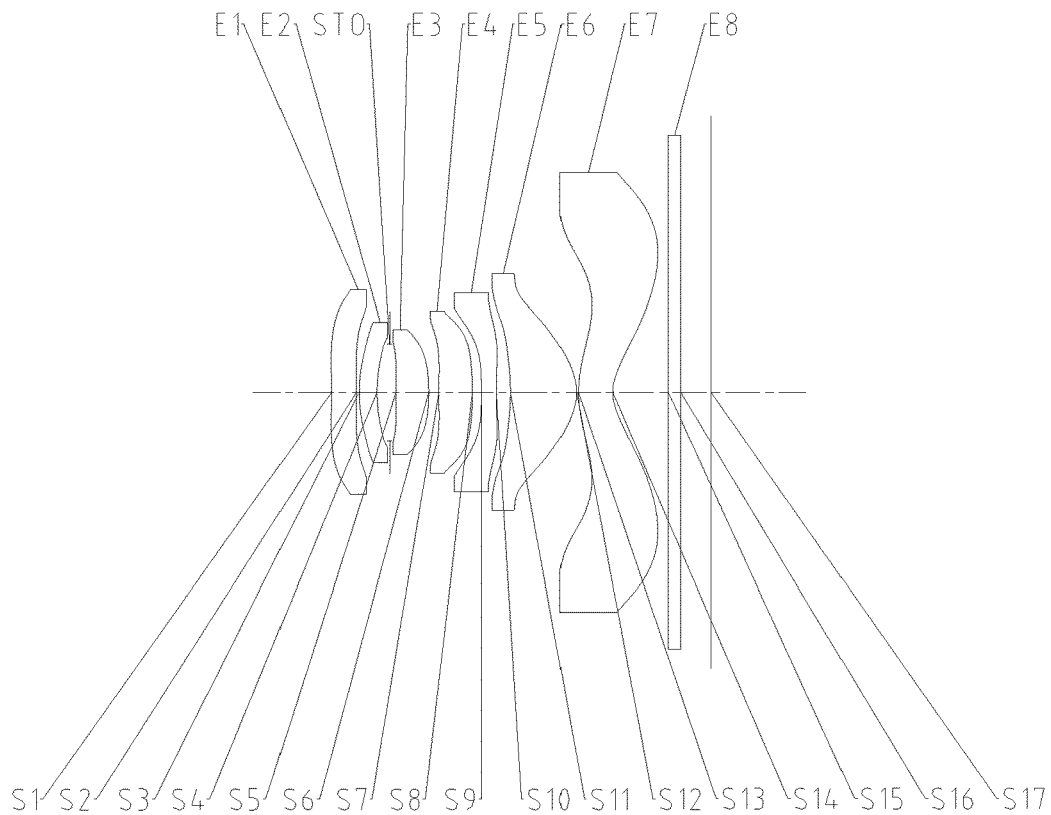
FIG. 17 shows a structural schematic diagram of an optical imaging lens assembly according to Embodiment 9 of the disclosure.

An optical imaging lens assembly according to Embodiment 9 of the disclosure is described below with reference to FIGS. 17-18D. FIG. 17 shows a structural schematic diagram of an optical imaging lens assembly according to Embodiment 9 of the disclosure.

As shown in FIG. 17, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, a seventh lens E7 and an optical filter E8.

The first lens E1 has a positive refractive power, an object-side surface S1 thereof is a concave surface, and an image-side surface S2 thereof is a convex surface. The second lens E2 has a negative refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a concave surface, and an image-side surface S10 thereof is a concave surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In Embodiment 9, a value of a total effective focal length f of the optical imaging lens assembly is 3.17 mm, a value of an on-axis distance TTL from the object-side surface S1 of the first lens E1 to the imaging surface S17 is 6.40 mm, ImgH is a half the diagonal length of an effective pixel region on the imaging surface S17, and a value of ImgH is 4.65 mm, and a value of a maximum field of view FOV is 110.80.

Table 17 shows a basic parameter table of the optical imaging lens assembly of Embodiment 9, and the units of the curvature radius, the thickness/distance and the focal length are all millimeters (mm). Table 18 shows high-order coefficients applied to each aspheric mirror surface in Embodiment 9. A surface type of each aspheric surface may be defined by the formula (1) given in Embodiment 1.

TABLE 17

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −9.4161 | 0.4210 | 1.55 | 56.1 | 102.23 | −20.3125 |
| S2 | Aspheric | −8.1840 | 0.0463 | | | | −99.0000 |
| S3 | Aspheric | 2.4676 | 0.3000 | 1.55 | 56.1 | −300.00 | −4.2380 |
| S4 | Aspheric | 2.3266 | 0.2132 | | | | −17.3216 |
| STO | Spherical | Infinite | 0.1102 | | | | |
| S5 | Aspheric | −182.8128 | 0.5474 | 1.55 | 56.1 | 7.06 | 99.0000 |
| S6 | Aspheric | −3.7767 | 0.1758 | | | | 0.0000 |
| S7 | Aspheric | 17.8403 | 0.5660 | 1.55 | 56.1 | 6.41 | 0.0000 |
| S8 | Aspheric | −4.3061 | 0.1518 | | | | 4.3589 |
| S9 | Aspheric | −5.8833 | 0.2500 | 1.67 | 19.2 | −5.02 | −73.1779 |
| S10 | Aspheric | 8.2169 | 0.2391 | | | | −97.4390 |
| S11 | Aspheric | −3.9391 | 1.1073 | 1.55 | 56.1 | 1.87 | −42.8074 |
| S12 | Aspheric | −0.8895 | 0.0300 | | | | −4.4758 |
| S13 | Aspheric | 2.0345 | 0.5800 | 1.54 | 55.9 | −2.47 | −7.3857 |
| S14 | Aspheric | 0.7232 | 0.9410 | | | | −3.7861 |
| S15 | Spherical | Infinite | 0.2100 | 1.52 | 64.2 | | |
| S16 | Spherical | Infinite | 0.5109 | | | | |
| S17 | Spherical | Infinite | | | | | |

TABLE 18

| Surface number | A4 | A6 | A8 | A10 | A12 | A14 |
|---|---|---|---|---|---|---|
| S1 | 4.7200E−01 | −2.8743E−02 | 5.9984E−03 | −5.5055E−03 | −1.0555E−03 | −1.0169E−03 |
| S2 | 1.9486E−01 | −2.0679E−02 | 5.3941E−03 | −2.4884E−03 | 7.8113E−04 | −2.6684E−04 |
| S3 | −1.9748E−02 | 1.1062E−03 | 4.7396E−03 | −6.9156E−04 | 6.5319E−04 | −1.4988E−04 |
| S4 | 2.6728E−02 | 3.4688E−03 | 2.6162E−03 | 6.3551E−04 | 3.3166E−04 | 1.0762E−04 |
| S5 | −4.5957E−02 | −2.8801E−03 | −3.9590E−06 | 1.0089E−04 | 3.7781E−05 | 1.2583E−05 |
| S6 | −2.0016E−01 | −2.3059E−03 | 2.7256E−04 | 3.4923E−04 | 4.3584E−04 | 1.4668E−04 |
| S7 | −2.0149E−01 | 1.3290E−02 | 6.4761E−03 | 4.0046E−04 | 5.9374E−04 | 3.0532E−05 |
| S8 | −1.6115E−01 | −3.9863E−02 | 1.2614E−02 | −2.1938E−03 | 1.6085E−03 | 2.5022E−04 |
| S9 | −3.5828E−01 | 3.4343E−02 | 1.1503E−02 | −6.5100E−03 | 2.3707E−03 | −1.0183E−04 |
| S10 | −3.0173E−01 | 6.3721E−02 | 6.6787E−03 | −7.3805E−03 | 3.0224E−03 | −4.2994E−04 |
| S11 | −1.4493E−01 | 2.1562E−02 | 1.6444E−02 | −4.4882E−03 | −3.6609E−03 | 1.9197E−03 |
| S12 | −4.1821E−01 | 2.3037E−01 | −1.7537E−02 | −2.4192E−03 | −1.4199E−02 | 3.9828E−03 |
| S13 | −1.6901E+00 | 3.8207E−01 | 1.0473E−02 | −5.9000E−02 | −4.9141E−03 | −8.7507E−03 |
| S14 | −2.3420E+00 | 2.0160E−01 | −1.2977E−02 | 2.5461E−02 | 3.1677E−03 | −7.3047E−03 |

TABLE 18-continued

| Surface number | A16 | A18 | A20 | A22 | A24 |
|---|---|---|---|---|---|
| S1 | −3.9618E−04 | −1.8812E−04 | −6.1375E−05 | 0.0000E+00 | 0.0000E+00 |
| S2 | 1.1708E−04 | −4.9842E−05 | 8.0548E−06 | 0.0000E+00 | 0.0000E+00 |
| S3 | 2.2373E−05 | −3.0911E−05 | 4.8666E−06 | 0.0000E+00 | 0.0000E+00 |
| S4 | 2.7373E−05 | 2.3249E−06 | −2.5408E−07 | 0.0000E+00 | 0.0000E+00 |
| S5 | 6.8509E−08 | 1.1006E−06 | −7.5866E−07 | 0.0000E+00 | 0.0000E+00 |
| S6 | 8.6096E−05 | 2.1347E−05 | 1.8697E−05 | 1.9630E−06 | 7.6159E−06 |
| S7 | −3.4822E−05 | −4.5448E−05 | 7.8109E−06 | 0.0000E+00 | 0.0000E+00 |
| S8 | 1.5368E−04 | −1.0202E−05 | 1.2323E−05 | 0.0000E+00 | 0.0000E+00 |
| S9 | −3.0365E−04 | 1.7048E−05 | 2.3865E−05 | 0.0000E+00 | 0.0000E+00 |
| S10 | −4.6328E−04 | 2.3304E−04 | 2.8185E−05 | 0.0000E+00 | 0.0000E+00 |
| S11 | −7.1397E−04 | 1.0983E−04 | 1.0087E−04 | 0.0000E+00 | 0.0000E+00 |
| S12 | 1.1368E−03 | 5.7846E−04 | −5.3551E−04 | 0.0000E+00 | 0.0000E+00 |
| S13 | −1.4288E−03 | −4.9528E−03 | −3.4737E−03 | 0.0000E+00 | 0.0000E+00 |
| S14 | 3.0314E−03 | −1.3219E−03 | 6.7179E−04 | 0.0000E+00 | 0.0000E+00 |

Figure 18A:
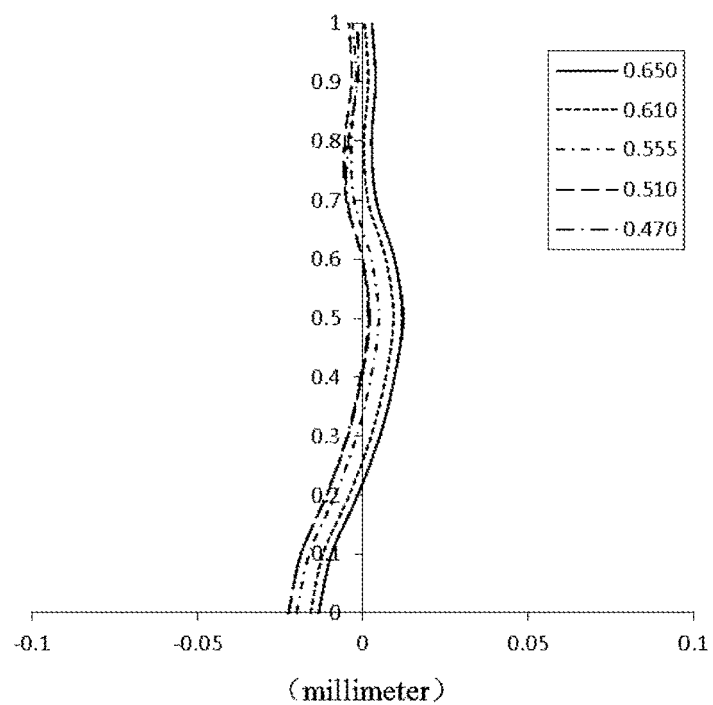
FIGS. 18A-18D show a longitudinal aberration curve, an astigmatism curve, a distortion curve and a lateral color curve of an optical imaging lens assembly according to Embodiment 9 respectively.
Figure 18B:
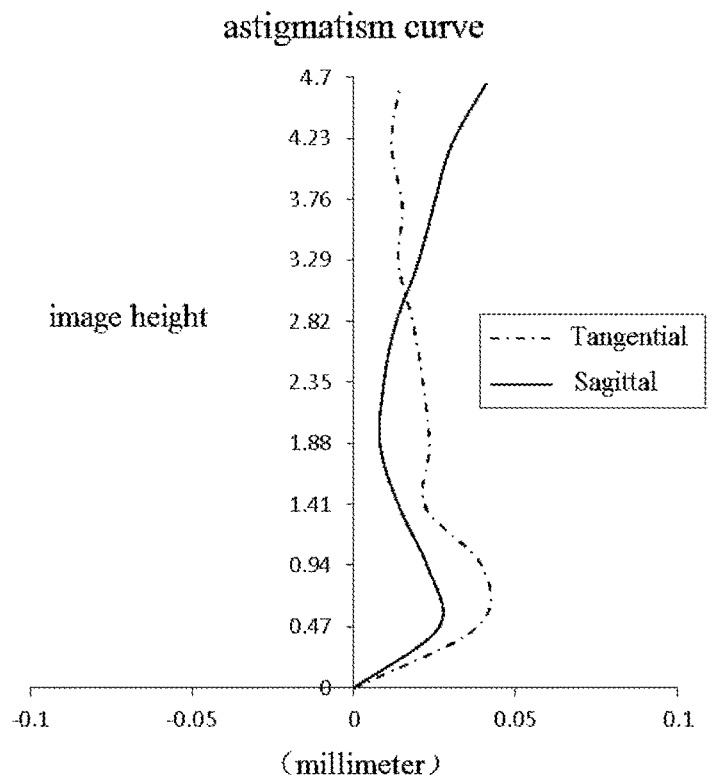
Figure 18C:
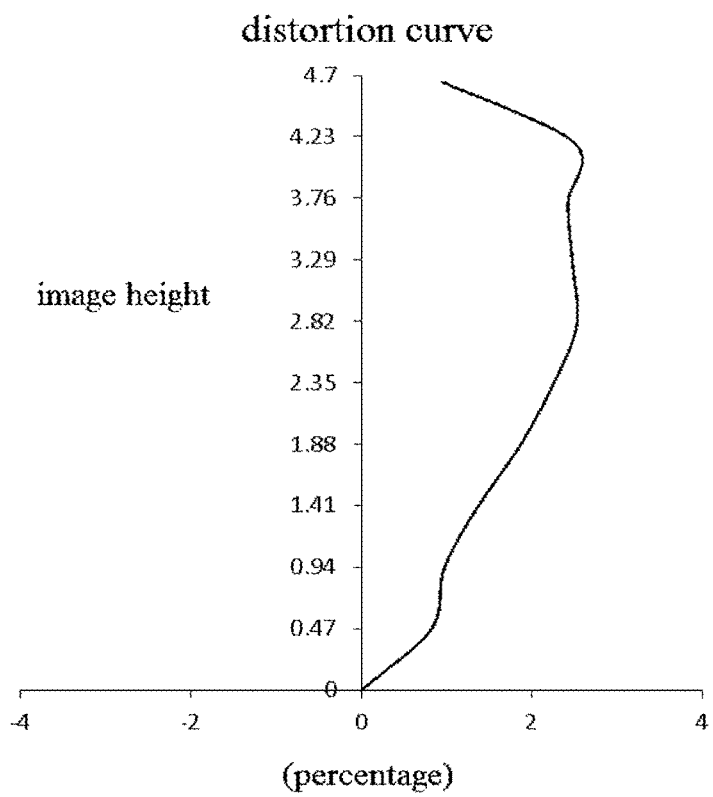
Figure 18D:
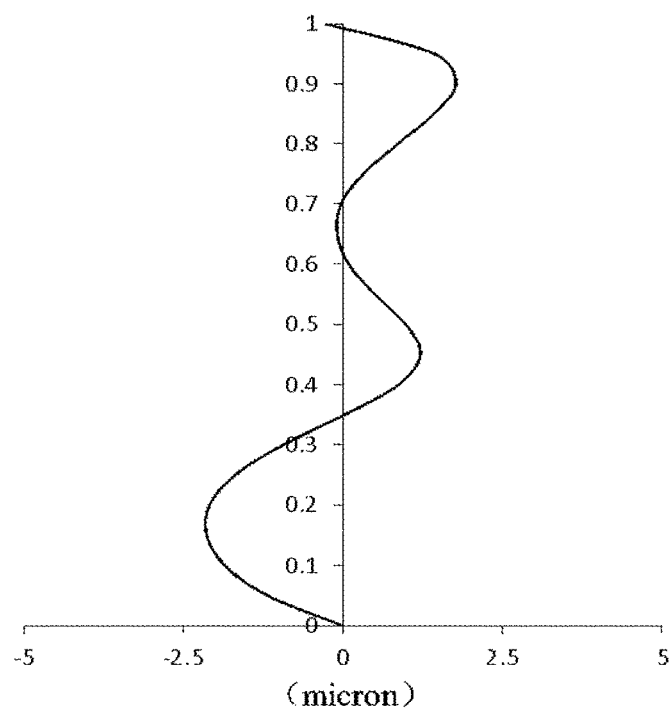

FIG. 18A shows a longitudinal aberration curve of the optical imaging lens assembly according to Embodiment 9 to represent deviation of a convergence focal point after light with different wavelengths passes through the lens. FIG. 18B shows an astigmatism curve of the optical imaging lens assembly according to Embodiment 9 to represent a curvature of tangential image surface and a curvature of sagittal image surface. FIG. 18C shows a distortion curve of the optical imaging lens assembly according to Embodiment 9 to represent distortion values corresponding to different image heights. FIG. 18D shows a lateral color curve of the optical imaging lens assembly according to Embodiment 9 to represent deviation of different image heights on the imaging surface after the light passes through the lens. According to FIGS. 18A-18D, it can be seen that the optical imaging lens assembly provided in Embodiment 9 may achieve good imaging quality.

Embodiment 10

Figure 19:
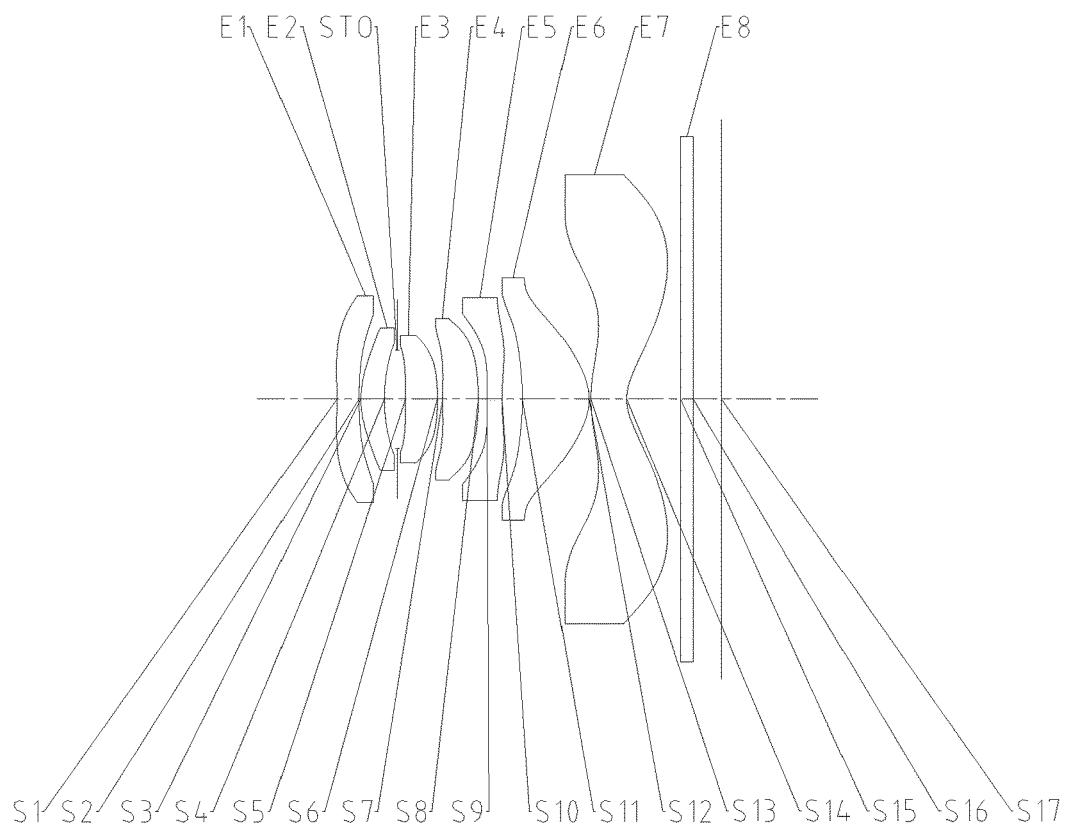
FIG. 19 shows a structural schematic diagram of an optical imaging lens assembly according to Embodiment 10 of the disclosure.

An optical imaging lens assembly according to Embodiment 10 of the disclosure is described below with reference to FIGS. 19-20D. FIG. 19 shows a structural schematic diagram of an optical imaging lens assembly according to Embodiment 10 of the disclosure.

As shown in FIG. 19, the optical imaging lens assembly sequentially includes from an object side to an image side along an optical axis: a first lens E1, a second lens E2, a diaphragm STO, a third lens E3, a fourth lens E4, a fifth lens E5, a sixth lens E6, a seventh lens E7 and an optical filter E8.

The first lens E1 has a negative refractive power, an object-side surface S1 thereof is a concave surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a convex surface, and an image-side surface S14 thereof is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In Embodiment 10, a value of a total effective focal length f of the optical imaging lens assembly is 3.24 mm, a value of an on-axis distance TTL from the object-side surface S1 of the first lens E1 to the imaging surface S17 is 6.40 mm, ImgH is a half the diagonal length of an effective pixel region on the imaging surface S17, and a value of ImgH is 4.65 mm, and a value of a maximum field of view FOV is 109.2°.

Table 19 shows a basic parameter table of the optical imaging lens assembly of Embodiment 10, and the units of the curvature radius, the thickness/distance and the focal length are all millimeters (mm). Table 20 shows high-order coefficients applied to each aspheric mirror surface in Embodiment 1-0. A surface type of each aspheric surface may be defined by the formula (1) given in Embodiment 6.

TABLE 19

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| S1 | Aspheric | −7.3492 | 0.3693 | 1.55 | 56.1 | −7.49 | −89.9680 |
| S2 | Aspheric | 9.3783 | 0.0300 | | | | −38.5639 |
| S3 | Aspheric | 1.5669 | 0.3914 | 1.55 | 56.1 | 6.17 | −4.1752 |
| S4 | Aspheric | 2.6720 | 0.2106 | | | | −14.4286 |
| STO | Spherical | Infinite | 0.1400 | | | | |
| S5 | Aspheric | −23.6775 | 0.5313 | 1.55 | 56.1 | 11.21 | 99.0000 |
| S6 | Aspheric | −4.9013 | 0.0884 | | | | 0.0000 |
| S7 | Aspheric | 17.6837 | 0.5971 | 1.55 | 56.1 | 5.50 | 0.0000 |

TABLE 19-continued

| Surface number | Surface type | Curvature radius | Thickness/ distance | Material Refractive index | Material Abbe number | Focal length | Conic coefficient |
|---|---|---|---|---|---|---|---|
| S8 | Aspheric | −3.5723 | 0.1431 | | | | 3.2361 |
| S9 | Aspheric | 500.0000 | 0.2500 | 1.67 | 19.2 | −6.02 | −99.0000 |
| S10 | Aspheric | 4.0469 | 0.3380 | | | | −97.4390 |
| S11 | Aspheric | −4.9620 | 1.1015 | 1.55 | 56.1 | 1.89 | −41.4088 |
| S12 | Aspheric | −0.9193 | 0.0300 | | | | −4.3029 |
| S13 | Aspheric | 2.4103 | 0.5948 | 1.54 | 55.9 | −2.25 | −10.3900 |
| S14 | Aspheric | 0.7348 | 0.9023 | | | | −3.7807 |
| S15 | Spherical | Infinite | 0.2100 | 1.52 | 64.2 | | |
| S16 | Spherical | Infinite | 0.4722 | | | | |
| S17 | Spherical | Infinite | | | | | |

TABLE 20

| Surface number | A4 | A6 | A8 | A10 | A12 | A14 |
|---|---|---|---|---|---|---|
| S1 | 4.7398E−01 | −4.4704E−02 | 1.1215E−02 | −5.1221E−03 | 7.4980E−04 | −6.0355E−04 |
| S2 | 1.6470E−01 | −2.4242E−02 | 2.1413E−03 | −1.0850E−03 | 4.3926E−04 | −1.2343E−04 |
| S3 | −1.6069E−02 | 7.2569E−04 | 2.3387E−03 | 6.8556E−04 | 1.5560E−04 | 4.7921E−05 |
| S4 | 3.0799E−02 | 6.2703E−04 | 1.1252E−03 | 2.2908E−04 | 7.7864E−05 | 3.0036E−05 |
| S5 | −4.7533E−02 | −3.5694E−03 | −2.5683E−04 | 2.4574E−05 | 1.6276E−05 | 4.6090E−06 |
| S6 | −2.1049E−01 | 2.4893E−03 | 2.8465E−04 | −1.4329E−04 | 3.6859E−04 | −5.9664E−05 |
| S7 | −1.8177E−01 | 2.0396E−02 | 4.9681E−03 | 2.0963E−04 | 7.0062E−04 | −3.1240E−04 |
| S8 | −1.3849E−01 | −3.5460E−02 | 1.0389E−02 | −4.6896E−04 | 2.4290E−03 | 1.8807E−04 |
| S9 | −3.7777E−01 | 3.0798E−02 | 7.2980E−03 | −4.7379E−03 | 1.1640E−03 | −6.5942E−05 |
| S10 | −2.7241E−01 | 5.8100E−02 | 6.6958E−03 | −9.0487E−05 | 2.2006E−03 | −9.6368E−04 |
| S11 | −1.8206E−01 | 1.2535E−02 | 1.5887E−02 | 7.7008E−04 | −3.4579E−03 | 4.3600E−04 |
| S12 | −4.0354E−01 | 2.1274E−01 | −1.4666E−02 | 1.3636E−03 | −1.0569E−02 | 2.4873E−03 |
| S13 | −1.5584E+00 | 4.1444E−01 | −3.1340E−02 | −1.3580E−02 | 7.7834E−04 | 5.9812E−04 |
| S14 | −2.2308E+00 | 2.4993E−01 | −6.9963E−02 | 3.5826E−02 | −6.0266E−03 | 3.3760E−03 |

| Surface number | A16 | A18 | A20 | A22 | A24 |
|---|---|---|---|---|---|
| S1 | 8.4174E−05 | −7.1134E−05 | 2.3989E−05 | 0.0000E+00 | 0.0000E+00 |
| S2 | −1.8731E−05 | 1.6479E−06 | 1.3097E−05 | 0.0000E+00 | 0.0000E+00 |
| S3 | −3.1947E−05 | 3.1617E−06 | 2.1993E−06 | 0.0000E+00 | 0.0000E+00 |
| S4 | 3.5545E−06 | 8.7712E−07 | 3.0943E−08 | 0.0000E+00 | 0.0000E+00 |
| S5 | −4.9702E−06 | −7.7819E−07 | −1.6257E−06 | 0.0000E+00 | 0.0000E+00 |
| S6 | 1.5007E−06 | −3.9064E−05 | −4.3276E−07 | −7.8415E−06 | 2.2557E−06 |
| S7 | −6.1998E−05 | −1.8513E−05 | 2.2418E−05 | 0.0000E+00 | 0.0000E+00 |
| S8 | 9.4937E−06 | 2.1420E−05 | 1.7200E−06 | 0.0000E+00 | 0.0000E+00 |
| S9 | −4.0748E−04 | 8.5061E−05 | 1.5413E−05 | 0.0000E+00 | 0.0000E+00 |
| S10 | 2.0748E−04 | 3.0869E−04 | −4.5758E−06 | 0.0000E+00 | 0.0000E+00 |
| S11 | −3.4389E−04 | 1.2918E−04 | 1.5930E−04 | 0.0000E+00 | 0.0000E+00 |
| S12 | 6.6278E−04 | 2.9709E−04 | −3.8603E−04 | 0.0000E+00 | 0.0000E+00 |
| S13 | −8.6044E−05 | 7.4911E−04 | −5.2519E−04 | 0.0000E+00 | 0.0000E+00 |
| S14 | −8.7753E−04 | 1.4825E−04 | −3.5369E−04 | 0.0000E+00 | 0.0000E+00 |

Figure 20A:
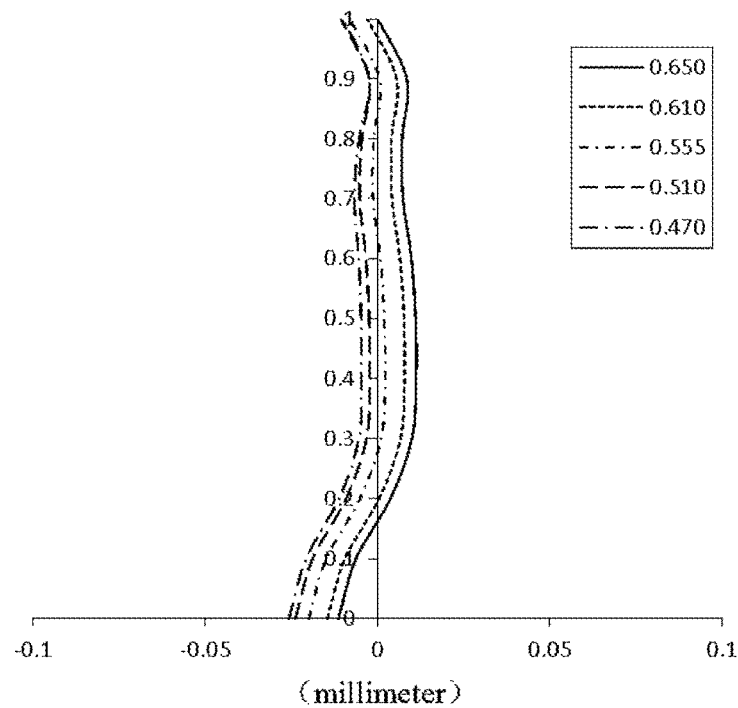
FIGS. 20A-20D show a longitudinal aberration curve, an astigmatism curve, a distortion curve and a lateral color curve of an optical imaging lens assembly according to Embodiment 10 respectively.
Figure 20B:
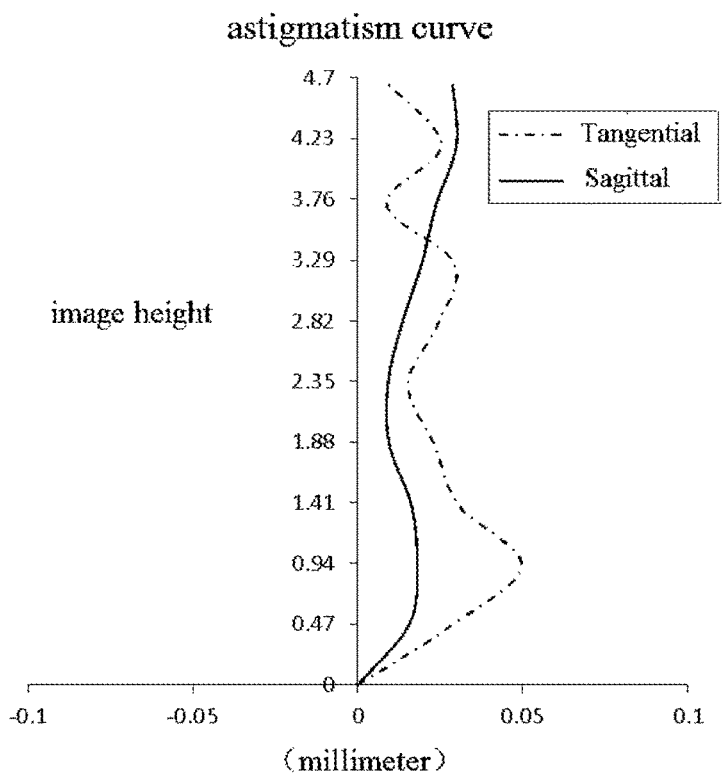
Figure 20C:
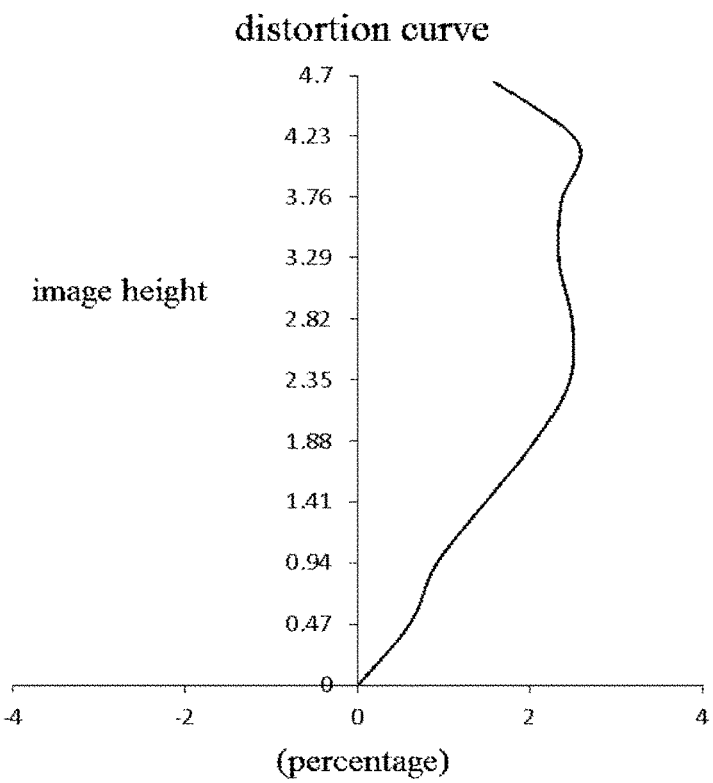
Figure 20D:
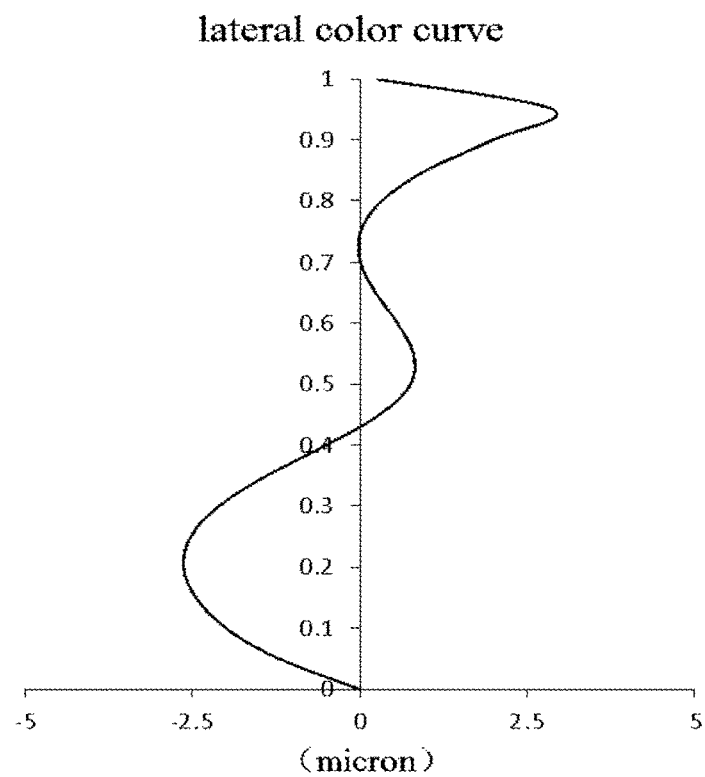

FIG. 20A shows a longitudinal aberration curve of the optical imaging lens assembly according to Embodiment 10 to represent deviation of a convergence focal point after light with different wavelengths passes through the lens. FIG. 20B shows an astigmatism curve of the optical imaging lens assembly according to Embodiment 10 to represent a curvature of tangential image surface and a curvature of sagittal image surface. FIG. 20C shows a distortion curve of the optical imaging lens assembly according to Embodiment 10 to represent distortion values corresponding to different image heights. FIG. 20D illustrates a lateral color curve of the optical imaging lens assembly according to Embodiment 10 to represent deviation of different image heights on the imaging surface after the light passes through the lens. According to FIGS. 20A-20D, it can be seen that the optical imaging lens assembly provided in Embodiment 10 may achieve good imaging quality.

From the above, Embodiment 1 to Embodiment 10 satisfy a relationship shown in Table 21 respectively.

TABLE 21

| Conditional expression/Embodiment | 1 | 2 | 3 | 4 | 5 | 6 | 7 | 8 | 9 | 10 |
|---|---|---|---|---|---|---|---|---|---|---|
| f/EPD | 1.95 | 1.95 | 1.95 | 1.95 | 1.95 | 1.95 | 1.95 | 1.95 | 1.95 | 1.95 |
| f7/f | −0.73 | −0.68 | −0.76 | −0.67 | −0.72 | −0.75 | −0.75 | −0.72 | −0.78 | −0.69 |
| f/f4 | 0.61 | 0.61 | 0.59 | 0.57 | 0.54 | 0.62 | 0.56 | 0.89 | 0.49 | 0.59 |
| (f5 + f6)/(f5 − f6) | 0.46 | 0.46 | 0.46 | 0.49 | 0.47 | 0.45 | 0.46 | 0.51 | 0.46 | 0.52 |

TABLE 21-continued

| Conditional expression/Embodiment | 1 | 2 | 3 | 4 | 5 | 6 | 7 | 8 | 9 | 10 |
|---|---|---|---|---|---|---|---|---|---|---|
| f67/f123 | 0.51 | 0.40 | 0.56 | 0.59 | 0.63 | 0.54 | 0.54 | 0.10 | 0.58 | 0.53 |
| ET3/CT3 | 0.52 | 0.53 | 0.51 | 0.46 | 0.49 | 0.50 | 0.51 | 0.58 | 0.49 | 0.52 |
| CT5/ET5 | 0.46 | 0.48 | 0.45 | 0.45 | 0.46 | 0.47 | 0.46 | 0.50 | 0.45 | 0.46 |
| (ET2 + ET6)/ET7 | 0.60 | 0.59 | 0.60 | 0.60 | 0.60 | 0.58 | 0.61 | 0.58 | 0.62 | 0.59 |
| DT12/DT61 | 0.80 | 0.76 | 0.81 | 0.82 | 0.80 | 0.79 | 0.81 | 0.79 | 0.82 | 0.80 |
| (SAG41 + SAG71)/SAG62 | 0.50 | 0.48 | 0.46 | 0.49 | 0.51 | 0.45 | 0.45 | 0.43 | 0.43 | 0.51 |
| R3/R4 | 0.58 | 0.57 | 0.69 | 0.62 | 0.61 | 0.62 | 0.95 | 0.52 | 1.06 | 0.59 |
| R6/(R6 + R8) | 0.58 | 0.60 | 0.55 | 0.58 | 0.55 | 0.58 | 0.54 | 0.85 | 0.47 | 0.58 |
| (R11 − R12)/(R11 + R12) | 0.73 | 0.80 | 0.67 | 0.70 | 0.71 | 0.69 | 0.68 | 0.66 | 0.63 | 0.69 |
| (R13 − R14)/(R13 + R14) | 0.50 | 0.53 | 0.48 | 0.54 | 0.50 | 0.49 | 0.49 | 0.50 | 0.48 | 0.53 |
| (CT1 + CT4)/CT6 | 0.86 | 0.88 | 0.89 | 0.86 | 0.85 | 0.95 | 0.89 | 0.96 | 0.89 | 0.88 |
| CT7/ΣAT | 0.61 | 0.63 | 0.59 | 0.58 | 0.59 | 0.56 | 0.60 | 0.57 | 0.60 | 0.61 |

The disclosure also provides an imaging device, which is provided with an electronic photosensitive element for imaging. The electronic photosensitive element may be a Charge Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned optical imaging lens assembly.

The above description is only description about the preferred embodiments of the disclosure and adopted technical principles. It is understood by those skilled in the art that the scope of protection involved in the disclosure is not limited to the technical solutions formed by specifically combining the technical characteristics and should also cover other technical solutions formed by freely combining the technical characteristics or equivalent characteristics thereof without departing from the concept of the disclosure, for example, technical solutions formed by mutually replacing the characteristics and (but not limited to) the technical characteristics with similar functions disclosed in the disclosure.

What is claimed is:

1. An optical imaging lens assembly, sequentially comprising from an object side to an image side along an optical axis: a first lens, a second lens, a third lens, a fourth lens, a fifth lens, a sixth lens and a seventh lens;
    wherein the fifth lens has a negative refractive power; and an object-side surface of the sixth lens is a concave surface, and an image-side surface of the sixth lens is a convex surface;
    wherein a maximum field of view FOV of the optical imaging lens assembly satisfies 100°<FOV<120°;
    ImgH is a half the diagonal length of an effective pixel region on an imaging surface of the optical imaging lens assembly, and imgH satisfies ImgH>4.5mm; and
    a total effective focal length f of the optical imaging lens assembly and an Entrance Pupil Diameter (EPD) of the optical imaging lens assembly satisfy f/EPD<2;
    an effective focal length f4 of the fourth lens and the total effective focal length f of the optical imaging lens assembly satisfy 0.3<f/f4<1.3.

2. The optical imaging lens assembly according to claim 1, wherein the total effective focal length f of the optical imaging lens assembly and an effective focal length f7 of the seventh lens satisfy −1<f7/f<0.

3. The optical imaging lens assembly according to claim 1, wherein an effective focal length f5 of the fifth lens and an effective focal length f6 of the sixth lens satisfy 0.3<(f5+f6)/(f5−f6)<0.8.

4. The optical imaging lens assembly according to claim 1, wherein a combined focal length f123 of the first lens, the second lens and the third lens and a combined focal length f67 of the sixth lens and the seventh lens satisfy 0<f67/f123<1.0.

5. The optical imaging lens assembly according to claim 1, wherein an edge thickness ET3 of the third lens and a center thickness CT3 of the third lens on the optical axis satisfy 0.3<ET3/CT3<0.8.

6. The optical imaging lens assembly according to claim 1, wherein an edge thickness ET5 of the fifth lens and a center thickness CT5 of the fifth lens on the optical axis satisfy 0.3<CT5/ET5<0.8.

7. The optical imaging lens assembly according to claim 1, wherein an edge thickness ET2 of the second lens, an edge thickness ET6 of the sixth lens and an edge thickness ET7 of the seventh lens satisfy 0.3<(ET2+ET6)/ET7<0.8.

8. The optical imaging lens assembly according to claim 1, wherein a maximum effective radius DT12 of an image-side surface of the first lens and a maximum effective radius DT61 of the object-side surface of the sixth lens satisfy 0.5<DT12/DT61<1.0.

9. The optical imaging lens assembly according to claim 1, wherein an on-axis distance SAG41 from an intersection point of an object-side surface of the fourth lens and the optical axis to an effective radius vertex of the object-side surface of the fourth lens, an on-axis distance SAG62 from an intersection point of the image-side surface of the sixth lens and the optical axis to an effective radius vertex of the image-side surface of the sixth lens and an on-axis distance SAG71 from an intersection point of an object-side surface of the seventh lens and the optical axis to an effective radius vertex of the object-side surface of the seventh lens satisfy 0.3<(SAG41+SAG71)/SAG62<0.8.

10. The optical imaging lens assembly according to claim 1, wherein a curvature radius R3 of an object-side surface of the second lens and a curvature radius R4 of an image-side surface of the second lens satisfy 0.3<R3/R4<1.3.

11. The optical imaging lens assembly according to claim 10, wherein the object-side surface of the second lens is a convex surface, and the image-side surface of the second lens is a concave surface.

12. The optical imaging lens assembly according to claim 1, wherein a curvature radius R6 of an image-side surface of the third lens and a curvature radius R8 of an image-side surface of the fourth lens satisfy 0.3<R6/(R6+R8)<1.0.

13. The optical imaging lens assembly according to claim 12, wherein
    the image-side surface of the third lens is a convex surface; and the image-side surface of the fourth lens is a convex surface.

14. The optical imaging lens assembly according to claim 1, wherein a curvature radius R11 of the object-side surface of the sixth lens and a curvature radius R12 of the image-side surface of the sixth lens satisfy $0.5<(R11-R12)/(R11+R12)<1.0$.

15. The optical imaging lens assembly according to claim 14, wherein the sixth lens has a positive refractive power.

16. The optical imaging lens assembly according to claim 1, wherein a curvature radius R13 of an object-side surface of the seventh lens and a curvature radius R14 of an image-side surface of the seventh lens satisfy $0.3<(R13-R14)/(R13+R14)<0.8$.

17. The optical imaging lens assembly according to claim 16, wherein the seventh lens has a negative refractive power, the object-side surface of the seventh lens is a convex surface, and the image-side surface of the seventh lens is a concave surface.

18. The optical imaging lens assembly according to claim 1, wherein a center thickness CT1 of the first lens on the optical axis, a center thickness CT4 of the fourth lens on the optical axis and a center thickness CT6 of the sixth lens on the optical axis satisfy $0.7<(CT1+CT4)/CT6<1.2$.

19. The optical imaging lens assembly according to claim 1, wherein a center thickness CT7 of the seventh lens on the optical axis and a sum $\Sigma AT$ of spacing distances of any two adjacent lenses in the first lens to the seventh lens on the optical axis satisfy $0.3<CT7/\Sigma AT<0.8$.

* * * * *